US008949102B2

(12) United States Patent
Dai et al.

(10) Patent No.: US 8,949,102 B2
(45) Date of Patent: Feb. 3, 2015

(54) METHOD AND SYSTEM FOR POWER DELIVERY NETWORK ANALYSIS

(75) Inventors: Wenliang Dai, Shanghai (CN); Lanbing Chen, Shanghai (CN); Guoying Feng, Shanghai (CN); Ping Liu, Shanghai (CN); Dennis Nagle, Peabody, MA (US); Jilin Tan, Nashua, NH (US); Wenjian Zhang, Shanghai (CN); Qi Zhao, Shanghai (CN); ZhongYong Zhou, Shanghai (CN)

(73) Assignee: Cadence Design Systems, Inc., San Jose, CA (US)

(*) Notice: Subject to any disclaimer, the term of this patent is extended or adjusted under 35 U.S.C. 154(b) by 323 days.

(21) Appl. No.: 13/404,738

(22) Filed: Feb. 24, 2012

(65) Prior Publication Data
US 2012/0221312 A1  Aug. 30, 2012

(30) Foreign Application Priority Data

Feb. 24, 2011 (CN) .......................... 2011 1 0048078
Feb. 24, 2011 (CN) .......................... 2011 1 0048087
Feb. 24, 2011 (CN) .......................... 2011 1 0049844

(51) Int. Cl.
*G06F 17/50* (2006.01)

(52) U.S. Cl.
CPC ........ *G06F 17/5045* (2013.01); *G06F 17/5018* (2013.01); *G06F 17/5036* (2013.01); *G06F 17/509* (2013.01); *G06F 2217/78* (2013.01)
USPC ....................................................... 703/14

(58) Field of Classification Search
USPC ........................................................ 703/14
See application file for complete search history.

(56) References Cited

U.S. PATENT DOCUMENTS

| 5,566,083 | A  | 10/1996 | Fang |
| 6,766,261 | B2 | 7/2004 | Nishino et al. |
| 7,240,310 | B2 | 7/2007 | Cook et al. |
| 7,689,949 | B1 | 3/2010 | Ling et al. |
| 7,707,020 | B2 | 4/2010 | Sagesaka |

(Continued)

FOREIGN PATENT DOCUMENTS

| CN | 101071449 A | 11/2007 |
| CN | 101375282 A | 2/2009 |

(Continued)

OTHER PUBLICATIONS

Burlacu: High Frequency Signal Integrity in High-Density Assemblies; PhD Thesis; Faculty of Electronics, Communications and Automation, Helsinki University of Technology; 2008; 157 pages.*

(Continued)

*Primary Examiner* — Hugh Jones
(74) *Attorney, Agent, or Firm* — Holland & Knight LLP; Mark H. Whittenberger, Esq.

(57) ABSTRACT

The subject application relates to a method and system for power delivery network analysis. The present disclosure is directed towards a computer-implemented method for analyzing a power delivery network (PDN) system. The method may include receiving at least one of a chip power model, a package power model and a board power model at the computing device and co-simulating at least two of the chip power model, the package power model, and the board power model. Numerous other features are also within the scope of the present disclosure.

18 Claims, 53 Drawing Sheets
(43 of 53 Drawing Sheet(s) Filed in Color)

(56) References Cited

U.S. PATENT DOCUMENTS

| | | | |
|---|---|---|---|
| 7,721,233 | B2 | 5/2010 | Kapur et al. |
| 8,448,117 | B2 | 5/2013 | Dai et al. |
| 8,539,422 | B2 * | 9/2013 | Dai et al. .................. 716/133 |
| 2003/0072130 | A1 | 4/2003 | Tsang et al. |
| 2006/0015306 | A1 | 1/2006 | Chow |
| 2006/0123364 | A1 | 6/2006 | Cook et al. |
| 2006/0224373 | A1 | 10/2006 | Jiao et al. |
| 2006/0271891 | A1 | 11/2006 | Rautio |
| 2007/0300191 | A1 | 12/2007 | Beattie et al. |
| 2008/0072182 | A1 | 3/2008 | He et al. |
| 2009/0228846 | A1 | 9/2009 | McConaghy et al. |
| 2010/0205572 | A1 | 8/2010 | Dai et al. |
| 2010/0217576 | A1 | 8/2010 | Bharath et al. |
| 2010/0218145 | A1 | 8/2010 | Engin et al. |
| 2010/0250224 | A1 | 9/2010 | Iguchi et al. |
| 2011/0246956 | A1 | 10/2011 | Tsubamoto |
| 2011/0270598 | A1 | 11/2011 | Zou et al. |
| 2012/0150523 | A1 | 6/2012 | Choi et al. |
| 2012/0221312 | A1 | 8/2012 | Dai et al. |
| 2012/0221988 | A1 | 8/2012 | Dai et al. |
| 2012/0221990 | A1 | 8/2012 | Dai et al. |
| 2012/0271602 | A1 | 10/2012 | Han et al. |

FOREIGN PATENT DOCUMENTS

| | | |
|---|---|---|
| CN | 100485695 C | 5/2009 |
| CN | 101799836 A | 8/2010 |
| JP | 2008523470 A | 7/2008 |
| JP | 4763716 B2 | 8/2011 |
| WO | 2006062827 A2 | 6/2006 |
| WO | 2006062827 A3 | 6/2006 |

OTHER PUBLICATIONS

Brooks et al.: Chip-Package-PC Board Co-Design:Applying a Chip Power Model inSystem Power Integrity Analysis (h##p://www.dac.com/ 46th/proceedings/ slides/ 09U_2.pdf; Aug 10, 2009; pp. 1-20.*

Ferzli et al.; Verification and Co-Design of the Package and Die Power Delivery System Using Wavelets; In proceeding of: Electrical Performance of Electronic Packaging, 2008 IEEE-EPEP; 2008; pp. 1-4.*

He et al.; Introduction to Chip-Package Co-design; ISQED05; 2005; pp. 1-46.*

Kollman: Constructing Your Power Supply—Layout Considerations; Texas Instruments seminar (SEM 1600); 2004; 24 pages.*

Mammano: Fueling the Megaprocessors—Empowering Dynamic Energy Management; Texas Instruments seminar (SEM 1100); 1996; pp. 1-22.*

Pant: Design and Analysis of Power Distribution Networks in VLSI Circuits; PhD Thesis; U. Michigan; 2008; 205 pages.*

Christ, et al, "Three-Dimensional Finite-Difference Method for the Analysis of Microwave-Device Embedding", IEEE Transaction on Microwave Theory and Techniques, vol. MTT-35, Iss. 8, pp. 688-696 (Aug. 1987).

Yuan, et al., "Coupling of Finite Element and Moment Methods for Electromagnetic Scattering from Inhomogeneous Objects", IEEE Transactions of Antennas and Propagation, vol. 38, Iss. 3, pp. 386-393 (Mar. 1990).

Kim, et al., "Modeling of Irregular Shaped Power Distribution Planes Using Transmission Matrix Method", IEEE Transactions on Advanced Packaging, vol. 24, No. 3, pp. 334-346 (Aug. 2001).

Lee, et al., "Analysis of Power Delivery Network Constructed by Irregular-Shaped Power/Ground Plane Including Densely Populated Via-Hole", IEEE Transactions on Advanced Packaging, vol. 28, No. 2, pp. 168-173 (May 2005).

Office Action from Chinese Patent Office in CN 201110048078.7 issued Mar. 26, 2014, 19 pp.

Office Action from Chinese Patent Office in CN 201110048087.6 issued May 7, 2014, 28 pp.

Sun, et al., "Characterizing Package/PCB PDN interactions from a Full-wave Finite-Difference Formulation," IEEE International Symposium on Electromagnetic Compatability, 2006 (Aug. 18, 2006), pp. 550-555.

"Modeling and Simulating of High-speed backboard," Wang chao, full-text database of PhD Dissertations of China, Engineering and Technology II, 2007 (Sep. 15, 2007) (No English translation), 131 pages total: (six sections, 15, 16, 25, 25, 25, 25, pages).

Office Action from Chinese Patent Office in CN 201110049844.1 issued May 15, 2014, 29 pages.

* cited by examiner

"PRIOR ART"

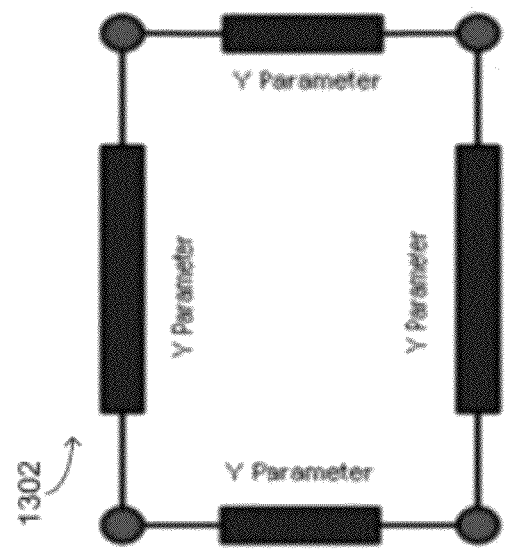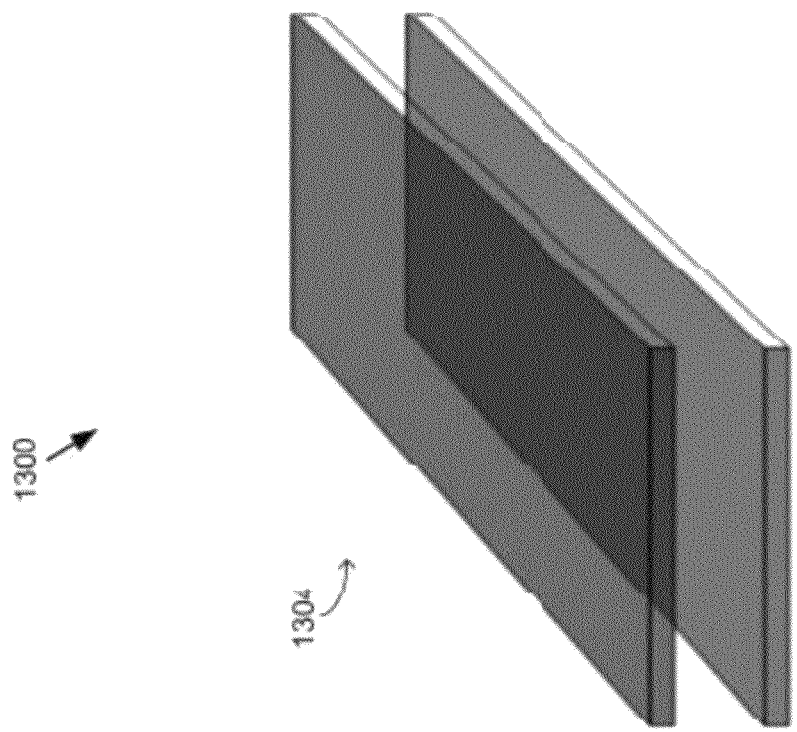
FIG. 13

| Name | Type | Voltage | | Impedance | | Voltage RDrop | | Current | | Density | | Temperature |
|---|---|---|---|---|---|---|---|---|---|---|---|---|
| | | Value | Ripple | Thresh | Max | Thresh | Max | Thresh | Max | Thresh | Max | Rate |
| 1.2V | Power | 1.2V | 5% | 24 mOhm | 6.00619 Ohm | 0 V | 0 V | 0 A | 0 A | 0 A/m2 | 0 A/m2 | 0 deg.C |
| GND | Ground | 0 V | | | | 0 V | 0 V | 0 A | 0 A | 0 A/m2 | 0 A/m2 | 0 deg.C |

Set Information — 4602
Stack up — 4604

FIG. 46

| Subclass | Type | Material | Thickness (mil) | Conductivity (mho/cm) | Dielectric Constant | Loss Target |
|---|---|---|---|---|---|---|
| 1 | Surface | AIR | 0 | | 1 | 0 |
| 2 TOP | Conductor | COPPER | 1.24 | 59590 | 4.5 | 0 |
| 3 | Dielectric | FR-4 | 2.7 | | 4 | 0.035 |
| 4 LXGNDPLN | Conductor | COPPER | 1.2 | 59590 | 4 | 0.035 |
| 5 | Dielectric | FR-4 | 4 | | 4 | 0.035 |
| 6 L3S0 | Conductor | COPPER | 0.6 | 59590 | 4 | 0.035 |
| 7 | Dielectric | FR-4 | 16 | | 4 | 0.035 |
| 8 L4S0 | Conductor | COPPER | 0.6 | 59590 | 4 | 0.035 |
| 9 | Dielectric | FR-4 | 4 | | 4 | 0.035 |
| 10 L5IPWRPLN | Conductor | COPPER | 1.2 | 59590 | 4 | 0.035 |
| 11 | Dielectric | FR-4 | 4 | | 4 | 0.035 |
| 12 | Conductor | COPPER | 0.6 | 59590 | 4 | 0.035 |

Net Information — 4702
Stack up — 4704

METHOD AND SYSTEM FOR POWER DELIVERY NETWORK ANALYSIS

RELATED APPLICATIONS

The subject application claims the priority of the following Chinese Applications: Chinese Application No. 201110049844.1, filed on Feb. 24, 2011, Chinese Application No. 201110048078.7, filed on Feb. 24, 2011, and Chinese Application No. 201110048087.6, filed on Feb. 24, 2011, the contents of which are herein incorporated by reference in their entirety.

FIELD OF THE INVENTION

The present disclosure relates to printed circuit board (PCB) design and analysis. More specifically, the present disclosure relates to power delivery network (PDN) analysis, which may occur prior to fabrication of an actual integrated circuit (IC).

DISCUSSION OF THE RELATED ART

PDN analysis including power integrity (PI) and IRDrop has become a focus of circuit designers. These tools allow the power distribution network to be simulated and modified in both the design and verification phases. When the PDN analysis is executed, a frequency response of the PDN may be analyzed. During the verification process, the designer may also perform the static and dynamic IRDrop analysis in the time domain. The use of PDN analysis tools may allow for modification of a design during the design phase and prior to the fabrication of an actual circuit. This may result in a considerable reduction in the time to market of a particular product.

For example, split plane power distribution is a common circuit configuration to distribute electrical power to functional components of a broader electrical circuit design. As illustrated in FIG. 1A, split plane power distribution is generally implemented by a power plane 110 and a ground plane 120, the combination of which will be referred to herein as a power/ground plane pair (PGPP) 100. Typically, the power plane 110 and the ground plane 120 are spaced apart in planar parallel alignment, and are separated by a dielectric medium.

Typically, split-plane power distribution networks must accommodate extremely rapid switching times of current across its domain. As these switching times are ever increasing from one generation of circuits to another, power integrity (PI) analysis has become a focus of circuit designers, whereby the power distribution network can be simulated and modified in the design phase. Due to the geometry of the PGPP and the switching times involved, transmission line modeling is typically employed to analyze the frequency dependent characteristics of the PGPP during the design stage so that prudent design measures can be taken. For example, as illustrated in FIG. 1B, a PGPP model 130 includes a plurality of transmission line segment models 140 each contained within a cell 135. When the PGPP model 130 is executed, a frequency response of the PGPP can be analyzed. Accordingly, when resonance is apparent in the impedance profile at some frequency, for example, the designer may add capacitive elements at certain points in the PGPP to favorably alter the resonant frequency components of the power distribution network. Since, through PI analysis, such modification can be achieved at the design phase and prior to the fabrication of an actual circuit, the time to market of a product using the circuit can be decreased considerably.

Whereas, it is not difficult to model a simple plane pair transmission line, the abstract shapes of typical PGPPs result in complex boundaries some of which may be internal to the exterior boundary of the PGPP. For example, as illustrated in FIG. 1B, many PGPP models, such as PGPP model 130, are implemented in a uniform mesh of cells 135 so that complex shapes can be accommodated. Consequently, an extremely large number of cells 135 may be needed to populate the entirety of the PGPP model 130. While several algorithms can be used to model the complex shapes of a PGPP, the computational overhead for these algorithms are prohibitive, especially where such PI analysis tools must share computational resources with other design tools.

Unfortunately, the designer is often confronted with shapes and configuration far more complex than the simple PGPP shown in FIG. 1A. For example, splits, voids, cutouts as well as stitched power, ground and signal vias provide additional problems for the designer of a particular circuit.

SUMMARY OF INVENTION

In a first embodiment of the present disclosure, a computer-implemented method for analyzing a power delivery network (PDN) system is provided. The method may include receiving at least one of a chip power model, a package power model and a board power model at the computing device. The method may further include co-simulating at least two of the chip power model, the package power model, and the board power model.

One or more of the following features may be included. In some embodiments, the method may further include performing an IRDrop analysis and performing a power integrity (PI) analysis.

In some embodiments, the board model may include at least one of a motherboard model and a daughter-card model. The method may further include generating at least one result set based upon, at least in part, the co-simulation. In some embodiments, the result set may include an impedance measurement and a voltage drop. The method may further include modifying stackup based upon, at least in part, the result set. The method may also include optimizing the PDN system by altering a presence of one or more decoupling capacitors. In some embodiments, co-simulating may include pin-mapping.

In another embodiment of the present disclosure, a computer program product residing on a computer readable storage medium having a plurality of instructions stored thereon is provided. The instructions, when executed by a processor, cause the processor to perform operations. Some operations may include receiving at least one of a chip power model, a package power model and a board power model at the computing device and co-simulating at least two of the chip power model, the package power model, and the board power model.

One or more of the following features may be included. In some embodiments, operations may further comprise performing an IRDrop analysis. Operations may further comprise performing a power integrity (PI) analysis. In some embodiments, the board model includes at least one of a motherboard model and a daughter-card model. Operations may further comprise generating at least one result set based upon, at least in part, the co-simulation. In some embodiments, the result set may include an impedance measurement and a voltage drop. Operations may further comprise modifying stackup based upon, at least in part, the result set. Operations may further comprise optimizing the PDN system by altering a presence of one or more decoupling capacitors. In some embodiments, co-simulating may include pin-mapping.

In yet another embodiment of the present disclosure, a computing system is provided. The computing system may include at least one processor and at least one memory architecture operatively connected with the at least one processor. The computing system may further include a first software module executed by the at least one processor, wherein the first software module is configured to receive at least one of a chip power model, a package power model and a board power model at the computing device. The computing system further including a second software module executed by the at least one processor, wherein the second software module is configured to co-simulate at least two of the chip power model, the package power model, and the board power model.

One or more of the following features may be included. The computing system may further include a third software module configured to perform an IRDrop analysis. The computing system may further include a fourth software module configured to perform a power integrity (PI) analysis. In some embodiments, the board model may include at least one of a motherboard model and a daughter-card model. The computing system may further include a fifth software module configured to generate at least one result set based upon, at least in part, the co-simulation. In some embodiments, the result set may include an impedance measurement and a voltage drop. The computing system may further include a sixth software module configured to modify stackup based upon, at least in part, the result set. The computing system may further include a seventh software module configured to optimize the PDN system by altering a presence of one or more decoupling capacitors. In some embodiments, co-simulating includes pin-mapping.

The details of one or more implementations are set forth in the accompanying drawings and the description below. Other features and advantages will become apparent from the description, the drawings, and the claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings, which are included to provide a further understanding of embodiments of the present disclosure and are incorporated in and constitute a part of this specification, illustrate embodiments of the present disclosure and together with the description serve to explain the principles of embodiments of the present disclosure.

FIG. 13 is a diagram depicting models used in the power delivery analysis process in accordance with an embodiment of the present disclosure;

FIG. 43 is a diagram depicting a screenshot consistent with an embodiment of the power delivery analysis process of the present disclosure;

FIG. 46 is a diagram depicting a screenshot consistent with an embodiment of the power delivery analysis process of the present disclosure;

FIG. 47 is a diagram depicting a screenshot consistent with an embodiment of the power delivery analysis process of the present disclosure;

FIG. 48 is a diagram depicting a screenshot consistent with an embodiment of the power delivery analysis process of the present disclosure;

DETAILED DESCRIPTION OF THE PREFERRED EMBODIMENTS

Figure 1A:
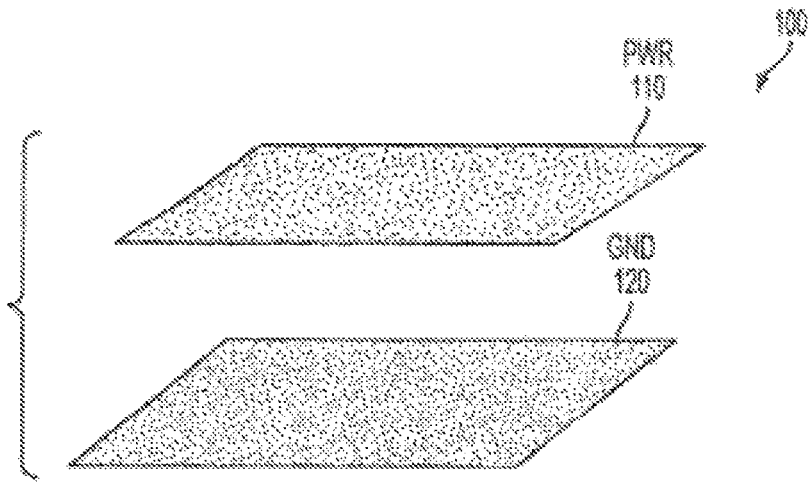
FIG. 1A is a diagram depicting an embodiment of a power plane/ground plane pair.
Figure 1B:
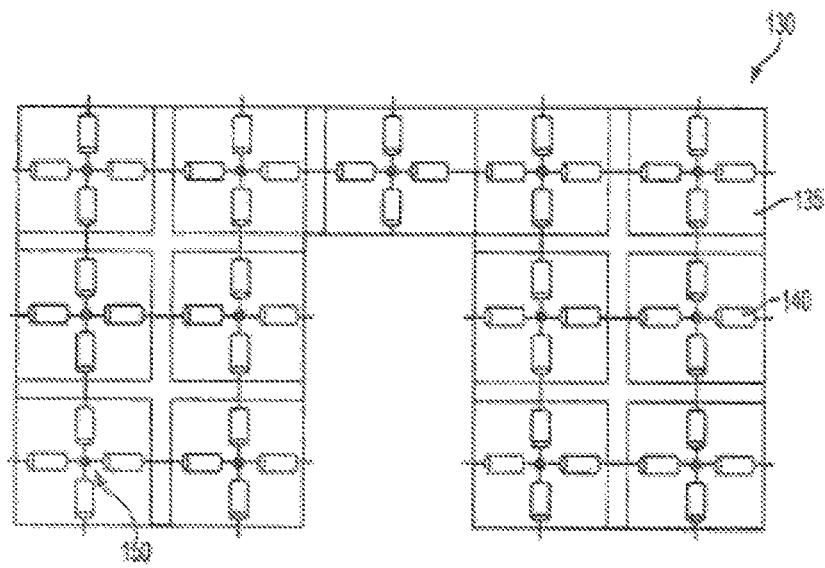
FIG. 1B is a diagram of a conventional mesh of transmission line equivalent circuits to model frequency characteristics of a power plane/ground plane pair according to conventional techniques.

Reference will now be made in detail to the embodiments of the present disclosure, examples of which are illustrated in the accompanying drawings. The present disclosure may, however, be embodied in many different forms and should not be construed as being limited to the embodiments set forth herein. Rather, these embodiments are provided so that this disclosure will be thorough and complete, and will fully convey the concept of the disclosure to those skilled in the art.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer readable medium may be a computer readable signal medium or a computer readable storage medium. A computer-usable, or computer-readable, storage medium (including a storage device associated with a computing device or client electronic device) may be, for example, but not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program coded embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. Additionally and/or alternatively operations of the present disclosure may be written using any number of hardware description languages (HDLs) including but not limited to, VHDL and Verilog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 2:
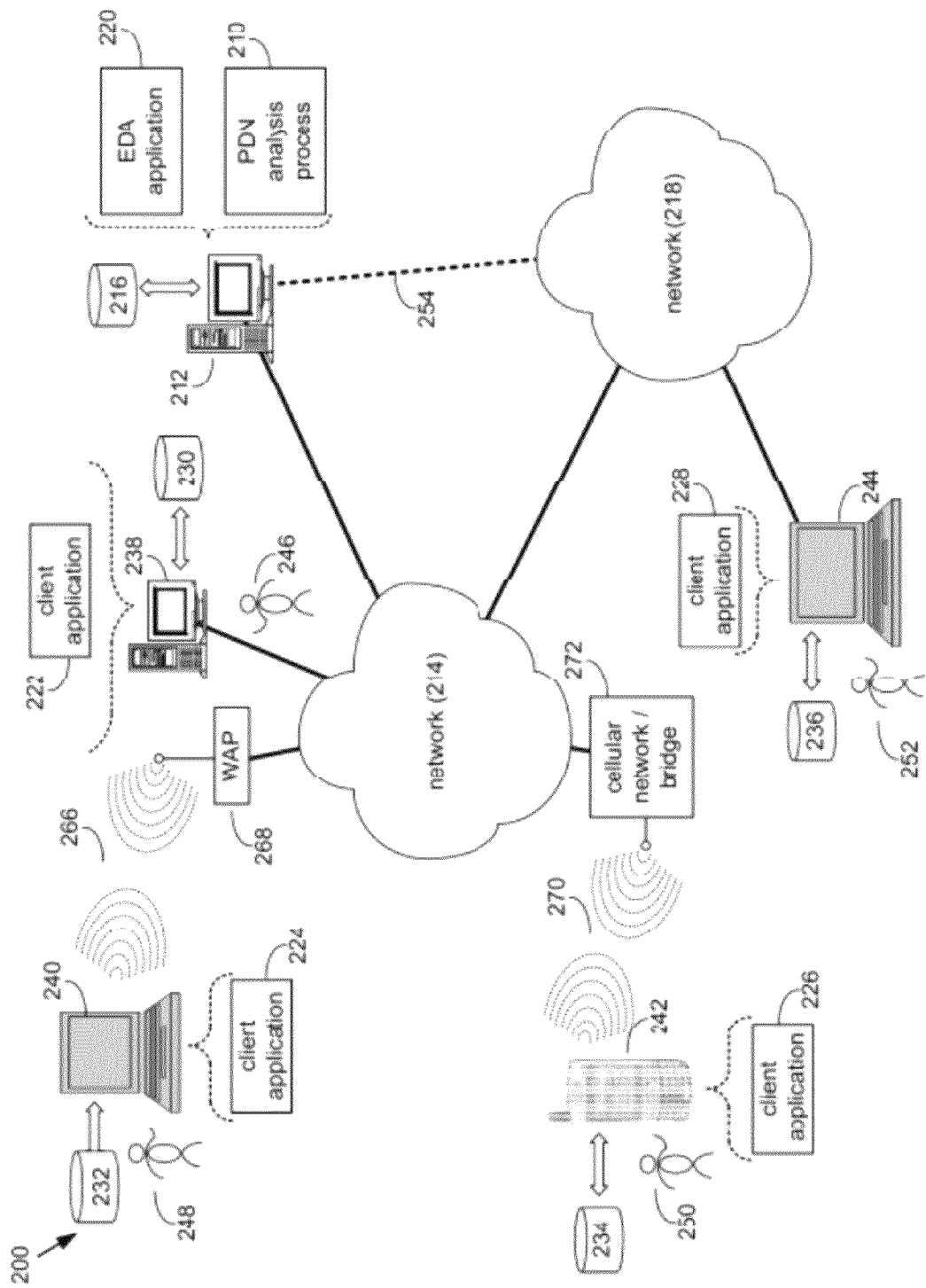
FIG. 2 is system diagram depicting a system in accordance with embodiments of the present disclosure.

Referring to FIG. 2, there is shown power delivery network (PDN) process 210 that may reside on and may be executed by server computer 212, which may be connected to network 214 (e.g., the Internet or a local area network). Examples of server computer 212 may include, but are not limited to: a personal computer, a server computer, a series of server computers, a mini computer, and a mainframe computer. Server computer 212 may be a web server (or a series of servers) running a network operating system, examples of which may include but are not limited to: Microsoft® Windows® Server; Novell® NetWare®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.) Additionally/alternatively, power delivery network (PDN) process 210 may reside on and be executed, in whole or in part, by a client electronic device, such as a personal computer, notebook computer, personal digital assistant, or the like.

As will be discussed below in greater detail, power delivery network (PDN) process 210 may be used to analyze a power delivery network associated with an electronic circuit design. PDN process 210 may include extracting, using at least one processor, an electromagnetic (EM) model for each of one or more discontinuity structures associated with the circuit design. Power delivery network (PDN) process 210 may then generate a three dimensional adaptive mesh model that is based upon, at least in part, the extracted EM model.

The instruction sets and subroutines of power delivery network (PDN) process 210, which may include one or more software modules, and which may be stored on storage device 216 coupled to server computer 212, may be executed by one or more processors (not shown) and one or more memory modules (not shown) incorporated into server computer 212. Storage device 216 may include but is not limited to: a hard disk drive; a solid state drive, a tape drive; an optical drive; a RAID array; a random access memory (RAM); and a read-only memory (ROM). Storage device 16 may include various types of files and file types including but not limited, to hardware description language (HDL) files, which may contain the port type descriptions and executable specifications of hardware blocks.

Server computer 212 may execute a web server application, examples of which may include but are not limited to: Microsoft IIS, Novell Webserver™, or Apache® Webserver, that allows for HTTP (i.e., HyperText Transfer Protocol) access to server computer 212 via network 214 (Webserver is a trademark of Novell Corporation in the United States, other countries, or both; and Apache is a registered trademark of Apache Software Foundation in the United States, other countries, or both). Network 14 may be connected to one or more secondary networks (e.g., network 218), examples of which may include but are not limited to: a local area network; a wide area network; or an intranet, for example.

Server computer 212 may execute an electronic design automation (EDA) application (e.g., EDA application 220), examples of which may include, but are not limited to those available from the assignee of the present application. EDA application 220 may interact with one or more EDA client applications (e.g., EDA client applications 222, 224, 226, 228) for electronic design optimization.

Power delivery network (PDN) process 210 may be a stand alone application, or may be an applet/application/script that may interact with and/or be executed within EDA application 220. In addition/as an alternative to being a server-side process, the PDN process may be a client-side process (not shown) that may reside on a client electronic device (described below) and may interact with an EDA client application (e.g., one or more of EDA client applications 222, 224, 226, 228). Further, the PDN process may be a hybrid server-side/client-side process that may interact with EDA application 220 and an EDA client application (e.g., one or more of client applications 222, 224, 226, 228). As such, the PDN process may reside, in whole, or in part, on server computer 212 and/or one or more client electronic devices.

The instruction sets and subroutines of EDA application 220, which may be stored on storage device 216 coupled to server computer 212 may be executed by one or more processors (not shown) and one or more memory modules (not shown) incorporated into server computer 212.

The instruction sets and subroutines of EDA client applications 222, 224, 226, 228, which may be stored on storage devices 230, 232, 234, 236 (respectively) coupled to client electronic devices 238, 240, 242, 244 (respectively), may be executed by one or more processors (not shown) and one or more memory modules (not shown) incorporated into client electronic devices 238, 240, 242, 244 (respectively). Storage devices 230, 232, 234, 236 may include but are not limited to: hard disk drives; solid state drives, tape drives; optical drives; RAID arrays; random access memories (RAM); read-only memories (ROM), compact flash (CF) storage devices, secure digital (SD) storage devices, and a memory stick storage devices. Examples of client electronic devices 238, 240, 242, 244 may include, but are not limited to, personal computer 238, laptop computer 240, mobile computing device 242 (such as a smart phone, netbook, or the like), notebook computer 244, for example. Using client applications 222, 224, 226, 228, users 246, 248, 250, 252 may access EDA application 220 and may allow users to e.g., utilize power delivery network (PDN) process 210.

Users 246, 248, 250, 252 may access EDA application 220 directly through the device on which the client application (e.g., client applications 222, 224, 226, 228) is executed, namely client electronic devices 238, 240, 242, 244, for example. Users 246, 248, 250, 252 may access EDA application 220 directly through network 214 or through secondary network 218. Further, server computer 212 (i.e., the computer that executes EDA application 220) may be connected to network 214 through secondary network 218, as illustrated with phantom link line 254.

The various client electronic devices may be directly or indirectly coupled to network 214 (or network 218). For example, personal computer 238 is shown directly coupled to network 214 via a hardwired network connection. Further, notebook computer 244 is shown directly coupled to network 218 via a hardwired network connection. Laptop computer 240 is shown wirelessly coupled to network 214 via wireless communication channel 266 established between laptop computer 240 and wireless access point (i.e., WAP) 268, which is shown directly coupled to network 214. WAP 268 may be, for example, an IEEE 802.11a, 802.11b, 802.11g, Wi-Fi, and/or Bluetooth device that is capable of establishing wireless communication channel 66 between laptop computer 240 and WAP 268. Mobile computing device 242 is shown wirelessly coupled to network 214 via wireless communication channel 270 established between mobile computing device 242 and cellular network/bridge 272, which is shown directly coupled to network 214.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 238, 240, 242, 244 may each execute an operating system, examples of which may include but are not limited to Microsoft Windows, Microsoft Windows CE®, Red Hat Linux, or other suitable operating system. (Windows CE is a registered trademark of Microsoft Corporation in the United States, other countries, or both).

Figure 3:
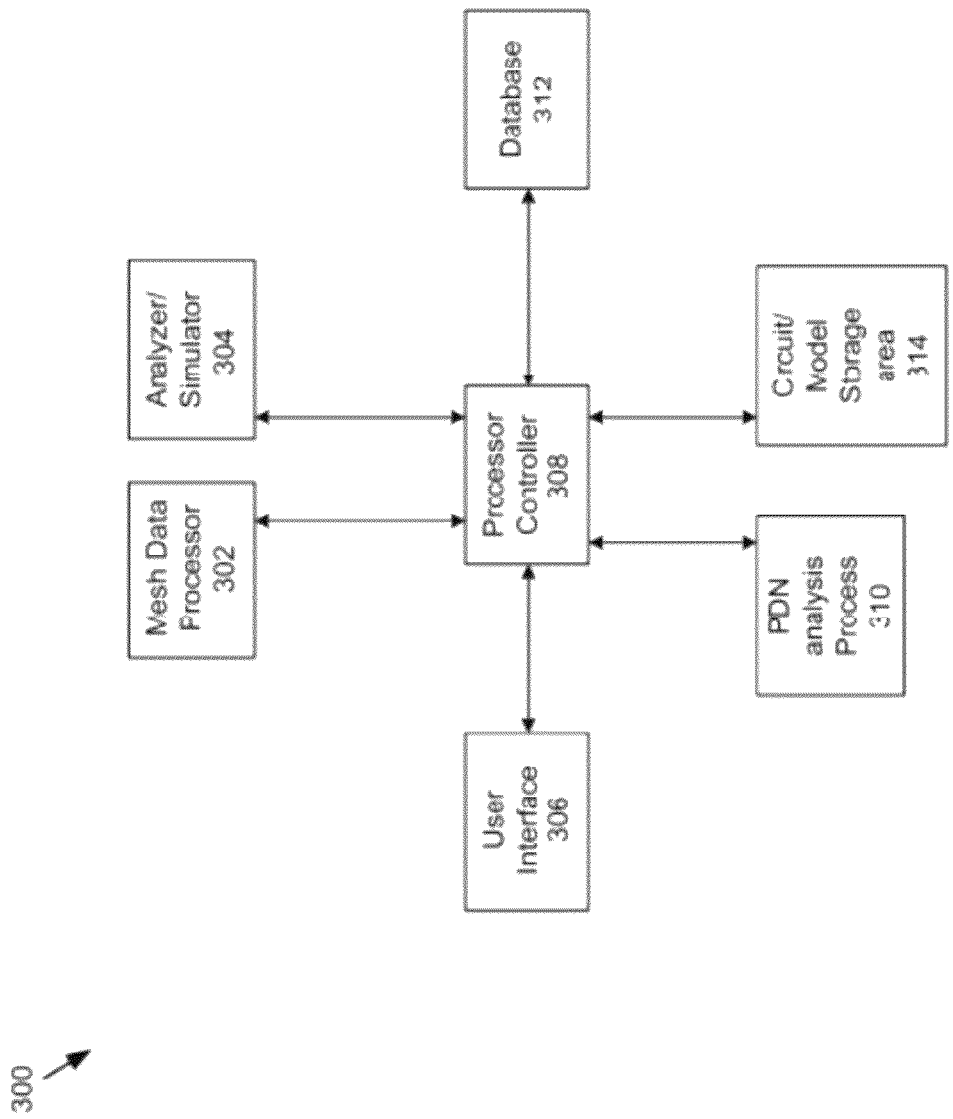
FIG. 3 is system diagram depicting a system in accordance with embodiments of the present disclosure.

Referring now to FIG. 3, an exemplary embodiment depicting system 300 in accordance with the present disclosure is provided. System 300 may include a variety of different components, which may be configured to perform some or all of the operations of PDN process 210. System 300 may include mesh data processor 302, analyzer/simulator 304, and user interface 306. System 300 may also include a processor controller 308, which may be configured to control some or all of the components of system 300, e.g., mesh data processor 302. System 300 may be configured to execute PDN analysis process 310, as is described in further detail below, and may include various databases 312 and circuit/model storage areas 314.

In some embodiments, the exemplary system illustrated in FIG. 3 may be implemented through data processing instructions to form power delivery network analysis system (PDNS) 300. System 300 may be operated by a circuit designer to analyze circuit designs so that appropriate design decisions can be made. In some embodiments, system 300 may be configured to operate on data, as opposed to on a physically fabricated circuit. That may include data formatted to physically fabricate the circuit on one or more circuit-bearing media. For example, data to construct component and interconnect mask patterns, component placement location data, packaging data, and any other data necessary in a fabrication process to produce the finished circuit product. The present general inventive concept is not limited by any particular fabrication process, and any suitable fabrication data format may be used with the present general inventive concept without deviating from the spirit and intended scope thereof.

In some embodiments, mesh data processor 302 may include any suitable processing circuitry, and any suitable function may be used with the present general inventive concept without deviating from spirit and intended scope thereof. In some embodiments, mesh data processor 302 may be configured to execute various operations. Mesh data processor 302 may construct a netlist to define a structure of the interconnected mesh components, such as transmission line segment equivalent circuit models and resistive equivalent circuit models. In some embodiments, mesh data processor 302 may execute one or more adaptive mesh refinement procedures whereby an initial mesh is further refined. The present general inventive concept is not limited by a particular implementation of any of the data processing functions of the mesh data processor 302, and any suitable function may be used with the present general inventive concept without deviating from spirit and intended scope thereof. The data processing functions to carry out the present general inventive concept will be described below as applicable; otherwise the implementation details thereof will be omitted for the sake of providing a concise description of the general inventive concept.

As used in any embodiment described herein, "circuitry" may include, for example, singly or in any combination, hardwired circuitry, programmable circuitry, state machine circuitry, and/or firmware that stores instructions executed by programmable circuitry. It should be understood at the outset that any of the operations and/or operative components described in any embodiment herein may be implemented in software, firmware, hardwired circuitry and/or any combination thereof.

System 300 may further include an analyzer 304 that produces analytical data obtained from simulations of the interconnected mesh components generated by the mesh data processor. Analyzer 304 may implement various analytical functions including, but not limited to, power integrity analysis. Portions of the system 300 may be implemented by a suitable Electronic Design Automation (EDA) system having similar features as those described above. The present general inventive concept may be practiced by an existing EDA system having the novel features as described herein incorporated therein. Such incorporation may be carried out by altering the program code of the EDA system, or may be incorporated as a functional module to interact with an existing EDA system through, for example, an Application Programming Interface (API), or other such mechanism.

In some embodiments, system 300 may include one or more graphical user interfaces 306. Some possible examples of user interfaces 306 are provided herein with reference to the Figures. However, the scope of the present disclosure is not intended to be limited to these examples. User interface 306 may be in communication with one or more peripheral devices (not shown). The peripheral devices may include a display unit and one or more input devices such as a mouse, a track ball, a stylus, a touch screen, and/or a touchpad, among others. The combination of hardware devices and suitably programmed processing instructions executed by the processor 302 form the user interface 306. The user interface 306 is used in certain embodiments of the present general inventive concept to present data to the user in a meaningful form on a display, such as through images of circuit schematics, circuit layout diagrams, circuit test bench interfaces, data management interfaces such as file directories, and other images recognized by the user.

In some embodiments, the user interface 306 may also interpret user manipulations of any input device into messages and instructions that can be recognized by the process controller 308. The user interface 306 may include a plurality of user controls to afford the user interactivity with and control over system 300. The user controls may include the input devices described above, and may also include software implemented controls on the display, such as buttons, menus of commands, text command entry blocks, and other suitable software controls. The foregoing description of the user interface 306 may be met by a suitably configured graphical user interface (GUI), the implementation details of such will be omitted for the sake of providing a concise description of the general inventive concept.

In some embodiments, system 300 may include a processor controller 308 to coordinate and control the interoperations of the functional components of system 300 so as to achieve a fully operational data processing system Process controller 308 may be configured to coordinate and control the interoperations of the functional components of system 300 so as to achieve a fully operational data processing system. For example, the process controller 308 may receive data corresponding to user manipulations of the user interface 306, may format the data into a command and/or data location in memory, and may convey such information to the applicable functional module of system 300. The process controller 308 may subsequently receive processed data from the applicable functional module and forward the data to another functional module, as well as to indicate such processing on the user interface 306. The process controller 360 may perform other coordination and control operations according to the implementation of the system 300, and such other operations, as well as the implementation of such, can be embodied by a wide range of well-known process control methods and devices. The present general inventive concept is intended to encompass all such alternatives of the process controller 308, including multi-threaded and distributed process control methodologies.

System 300 may include a database 312 of circuit objects that maintain all the data necessary to design, analyze, modify, and fabricate a circuit per the specifications of the designer. As used herein, a circuit object is a data structure that can be stored in a memory device to contain data of a circuit element so that the circuit element can be viewed, modified, interconnected with other circuit elements, and analyzed in one or more circuit design contexts selected by a user. Such may be achieved by a suitable data abstraction technique so that a particular circuit element may be, for example, presented as a schematic symbol in a schematic entry design context, presented as a footprint in a layout design context, presented as a routing component in a circuit routing design context, and provided as a component model in a circuit analysis and design verification context. A circuit object may also be hierarchical, whereby a circuit object contains other circuit objects of circuit elements interconnected to form a component that has a schematic symbol, layout footprint, and a terminal characteristics model used as a single element in a circuit. An example of such a circuit object is that of an operational amplifier. Similarly, an analysis object may be a data structure that can be stored in a memory device to contain data of a non-circuit element, such as cell data, so that the non-circuit element can be viewed, modified, interconnected with other non-circuit elements, and analyzed in one or more circuit design contexts selected by a user. It is to be understood that in the descriptions below, unless otherwise made clear to the contrary, operations described below as being performed on a circuit element or a non-circuit element implies the operation being performed on the containing circuit object or analysis object, respectively, by the components of system 300.

It is to be understood that interconnection and power distribution components, such as terminal pads, wires, conductive traces and segments thereof, inter-layer vias, power planes, and ground planes, among others, are considered circuit elements per the definition given above, and may be contained in a corresponding circuit object in memory. Virtual nodes may also be stored in circuit objects, as well as any equivalent circuit model connected between virtual nodes. Moreover, circuit-bearing media are also circuit components that may be contained in a circuit object. Accordingly, a circuit designer may construct a power distribution circuit on a circuit-bearing medium of, for example, silicon, which has a known electric permittivity that may be stored in the circuit object of the circuit-bearing medium. Such physical constants and circuit component dimensions can be obtained from the circuit objects of the components forming a power distribution circuit to construct equivalent circuit models described below.

In some embodiments, circuit storage area 314 may be a work space in memory, such as in data memory 312, in which to store circuit instances. As used herein, a circuit instance is a data structure in memory containing all of the circuit objects necessary to view, modify, analyze, and evaluate a circuit or sub-circuit. It is to be understood that although only a single circuit storage area is illustrated in FIG. 3, any number of such storage areas may be used to provide the intended purposes as described herein without deviating from the spirit and intended scope of the present general inventive concept. Additionally, the circuit storage area may be defined as a static memory structure, or may be dynamically allocated. The present general inventive concept is not limited to particular implementations of the circuit storage area.

Figure 4:
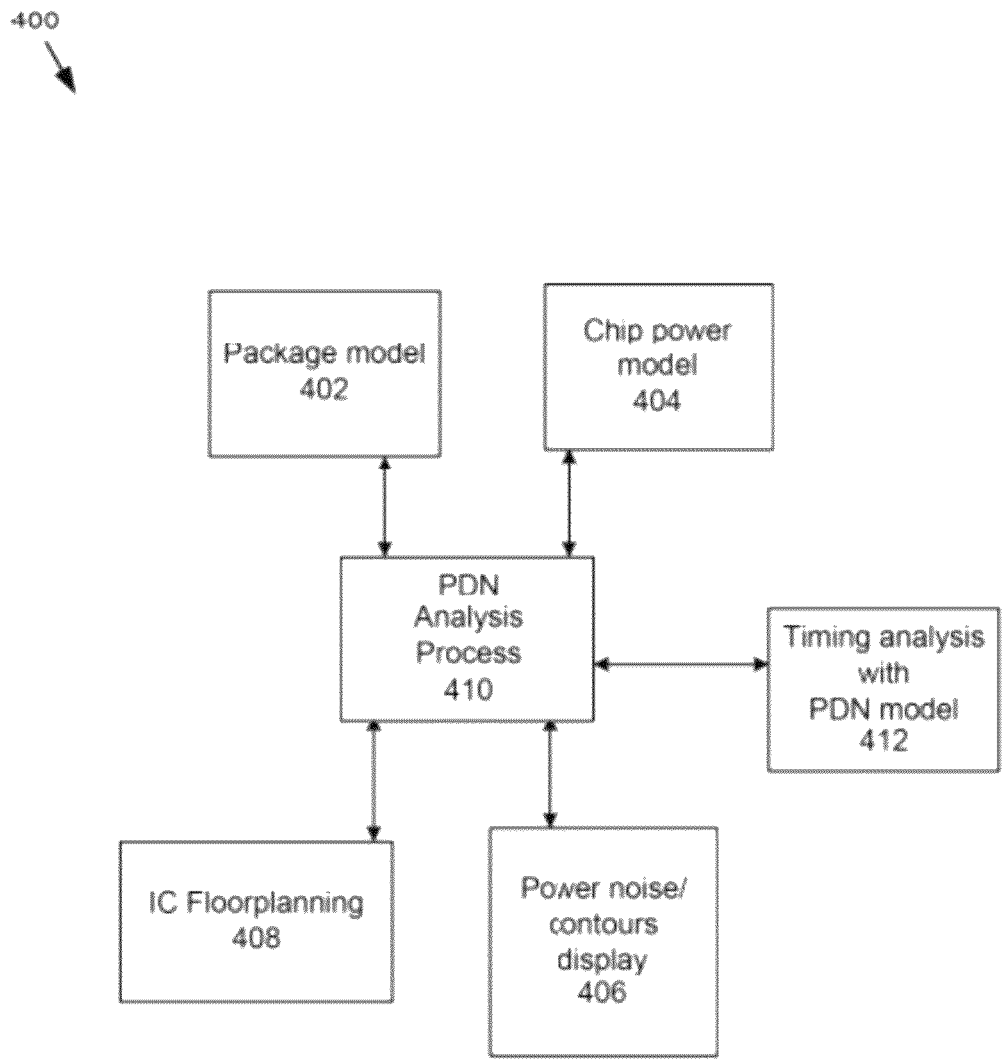
FIG. 4 is system diagram depicting a system in accordance with embodiments of the present disclosure.

Referring now to FIG. 4, an exemplary embodiment depicting system 400 in accordance with the present disclosure is provided. System 400 may allow for the analysis of a variety of different types of models and/or data sets. In this way system 400 may include, but is not limited to, package model 402, chip power model 404, power noise/contours display 406, IC floorplanning 408, and timing analysis with PDN model 412.

In some embodiments, system 400 may be configured to execute PDN analysis process 410, which may be configured to analyze the performance (including power integrity, static and dynamic IRDrop) of complex power delivery networks. For example, those having multiple power nets with some irregular shapes (e.g., splits, voids, cutouts) and stitched power, ground and signal vias, short lossy conductor traces and frequency dependent dielectric materials from various EDA databases.

Figure 39:
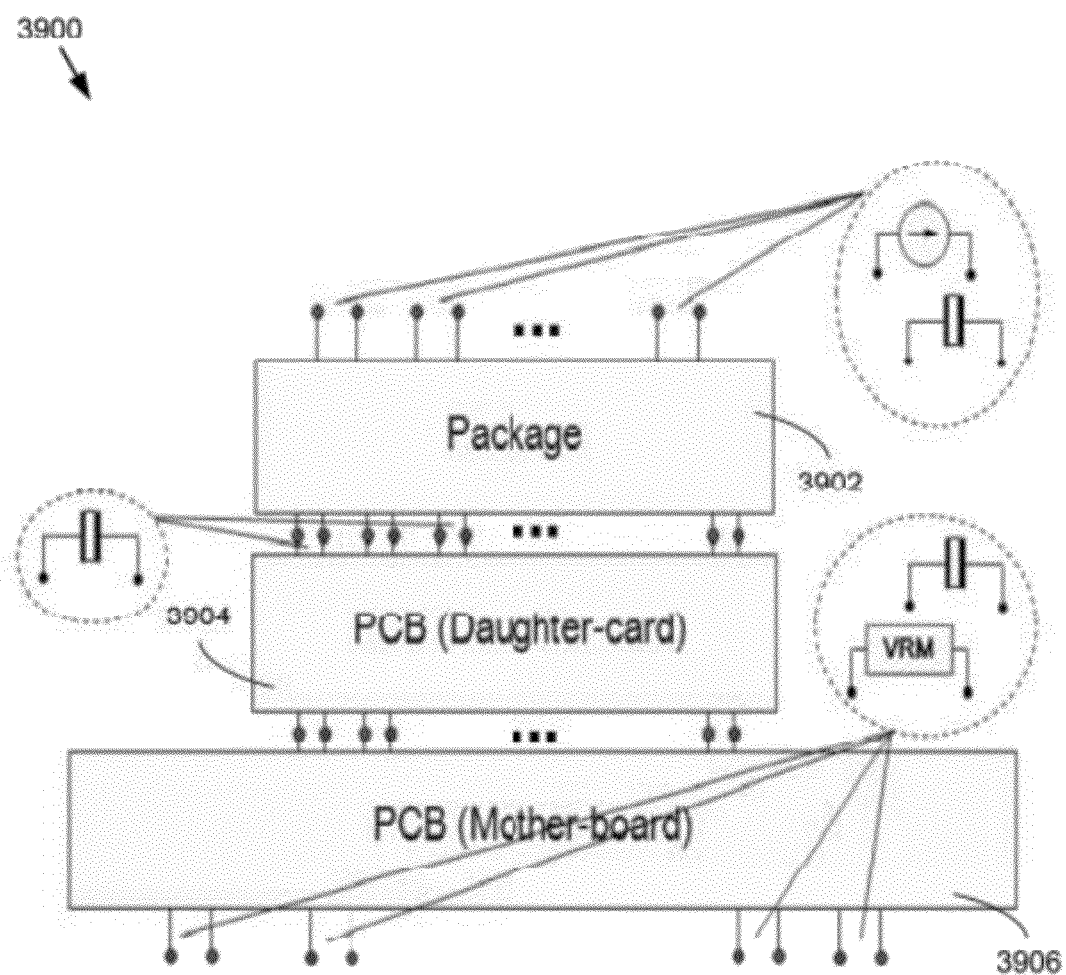
FIG. 39 is a system consistent with an embodiment of the power delivery analysis process of the present disclosure.

Referring again to FIG. 4, chip power model 404 (e.g., current profile and passive circuit netlist) may be obtained from one or more EDA databases and package power model 402 may be obtained from one or more EDA databases. The other board models (e.g., mother board/daughter card) may also be analyzed together through co-design flow as shown in FIG. 39. PDN Analysis 410 may allow for IRDrop analysis and PI analysis to obtain the impedance and voltage drop results at DIE side in the system. According to the analyzed results, the power performance may be improved by modifying stackup/IC component floor planning 408 and optimizing the decoupling capacitors. The term "stackup" as used herein is meant to refer to the arrangement and types of layers in a multi-layer board.

For the purposes of the present disclosure, a decoupling capacitor may refer to a capacitor used to decouple one part of an electrical network or circuit from another. Noise caused by other circuit elements may be shunted through the capacitor, thereby reducing the effect they have on the rest of the circuit. By co-simulation with the whole extracted power system models, the timing analysis, SSN/SSO/EMC/EMI analysis can be accurately simulated. This is discussed in further detail in FIGS. 39-43.

Figure 5:
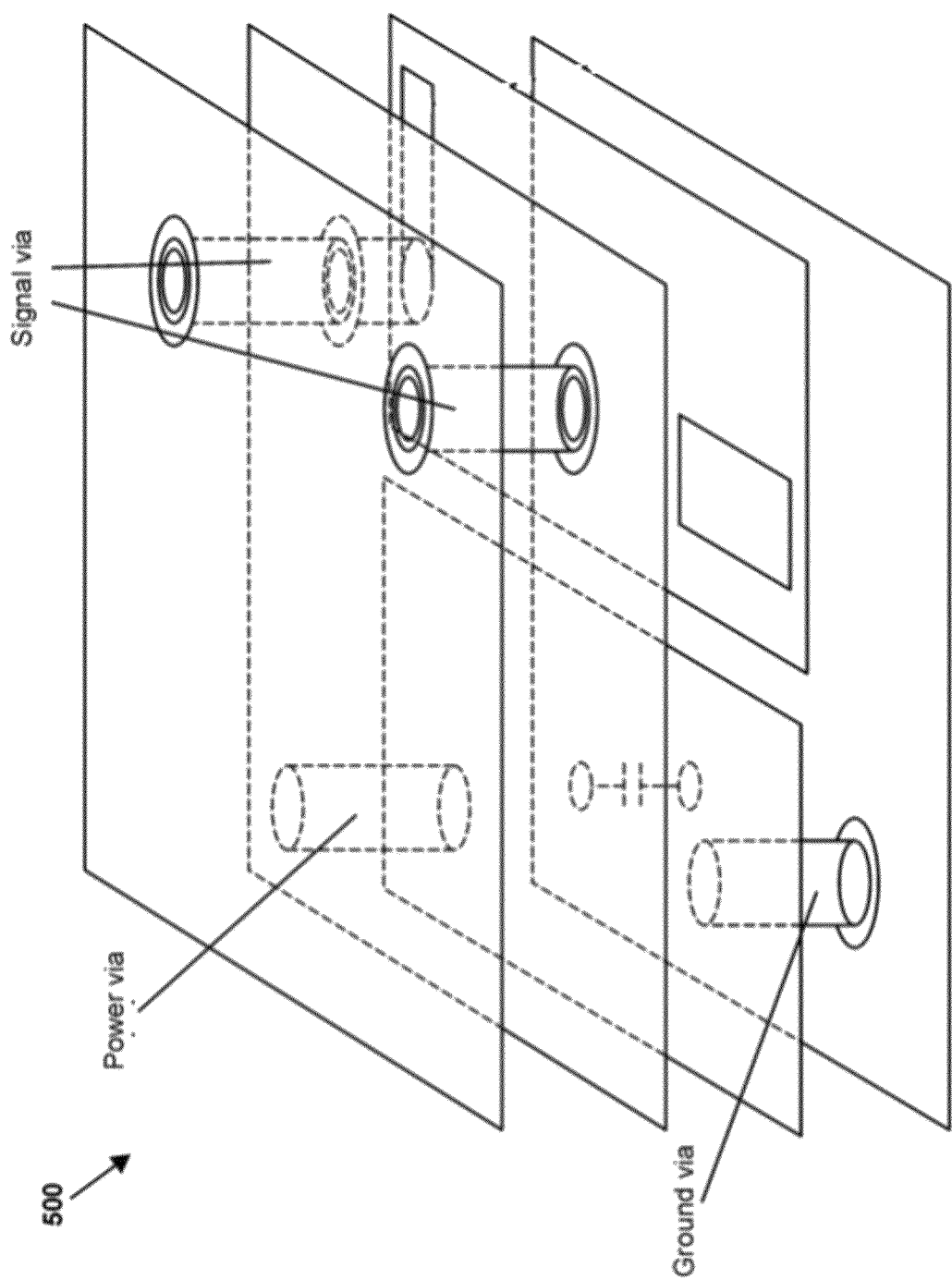
FIG. 5 is a diagram depicting a power ground plane pair in accordance with embodiments of the present disclosure.

Referring now to FIG. 5, a schematic diagram is provided depicting an exemplary complex PDN structure 500. Any given power delivery network may include a wide variety of shapes. For example, elements in a given PDN are often categorized as uniform (e.g. parallel plate waveguides, power/ground planes) and non-uniform (e.g. the discontinuity structures identified herein). In some embodiments, of the present disclosure, for each discontinuity structure the dyadic Green's function may be derived. Once this has been achieved the S/Y parameters may be extracted using a method of moments analysis. These S/Y parameter models may be implemented in a netlist and the entire PDN may be simulated using one or more circuit simulators.

Most electromagnetic problems can be stated in terms of an inhomogeneous equation:

$$LF=g \qquad \text{Equation (1)}$$

Where L is an operator which may be differential, integral or integro-differential, g is the known excitation or source function, and F is the unknown function to be determined. Generally, the method of moments is a procedure for solving Equation (1). The method owes its name to the process of taking method of moments by multiplying with appropriate weighting functions and integrating. The method of moments is essentially the method of weighted residuals. Therefore, the method is applicable for solving both differential and integral equations.

The procedure for applying Method of moments to solve Equation (1) may involve four steps:

1. Derivation of the appropriate integral equation (IE);
2. Conversion (discretization (of the IE into a matrix equation using basis (or expansion) functions and weighting (or testing) functions;
3. Evaluation of the matrix elements; and
4. Solving the matrix equation and obtaining the parameters of interest.

A method of moments approach may require calculating only boundary values, rather than values throughout the space, as a result, it may be significantly more efficient in terms of computational resources for problems with a small surface/volume ratio. Conceptually, method of moments approaches may involve constructing a "mesh" over the modeled surface. As discussed above, method of moments is applicable to problems for which Green's functions can be calculated. A Green's function generally refers to a type of function used to solve inhomogeneous differential equations subject to specific initial conditions or boundary conditions.

Referring again to FIG. 5, the power and ground nets may include complicated physical structures in contrast to those shown in FIG. 1A. For example, the power nets may have a split shape and may include, e.g., power vias, ground vias and signal vias. Additionally and/or alternatively, coupling effects may be generated from the split shape, power via, ground via, signal via, plane split, void, via antipad, plane edge, pin, through via, sandwich plane edge, plane pair, bottom shorted via, overlay split plane, and sandwich split plane. For the purposes of the present disclosure these may be included within the phrase "discontinuity models". Embodiments of the present disclosure provide for the geometric extraction of specific electromagnetic (EM) models for these discontinuity structures.

Figure 6:
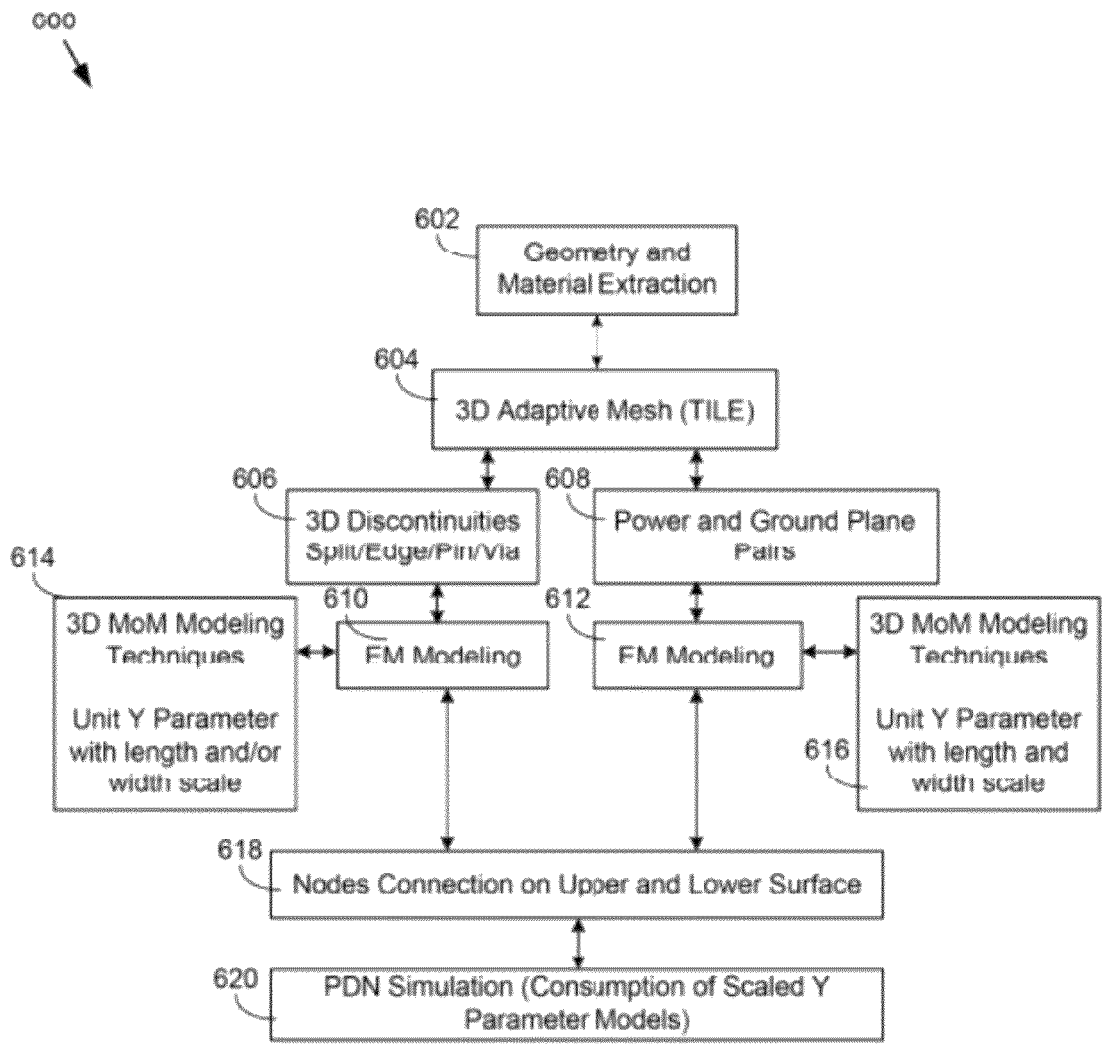
FIG. 6 is system diagram depicting a system in accordance with embodiments of the present disclosure.

Referring now to FIG. 6, a flowchart 600 depicting some exemplary operations consistent with the present disclosure is provided. Some operations may include geometric extraction 602 and generation of a three dimensional adaptive mesh 604. Operations may further include identifying the discontinuity models 606 as well as the power and ground plane pairs 608. Once these models have been identified they may be subsequently modeled 610, 612 using, e.g., three dimensional method of moments techniques and the Y-parameter approach 614, 616 as is discussed in further detail below. Operations may further include multi-node connections on the upper and lower surface of a particular conductor 618 and eventual PDN simulation 620.

Figure 7:
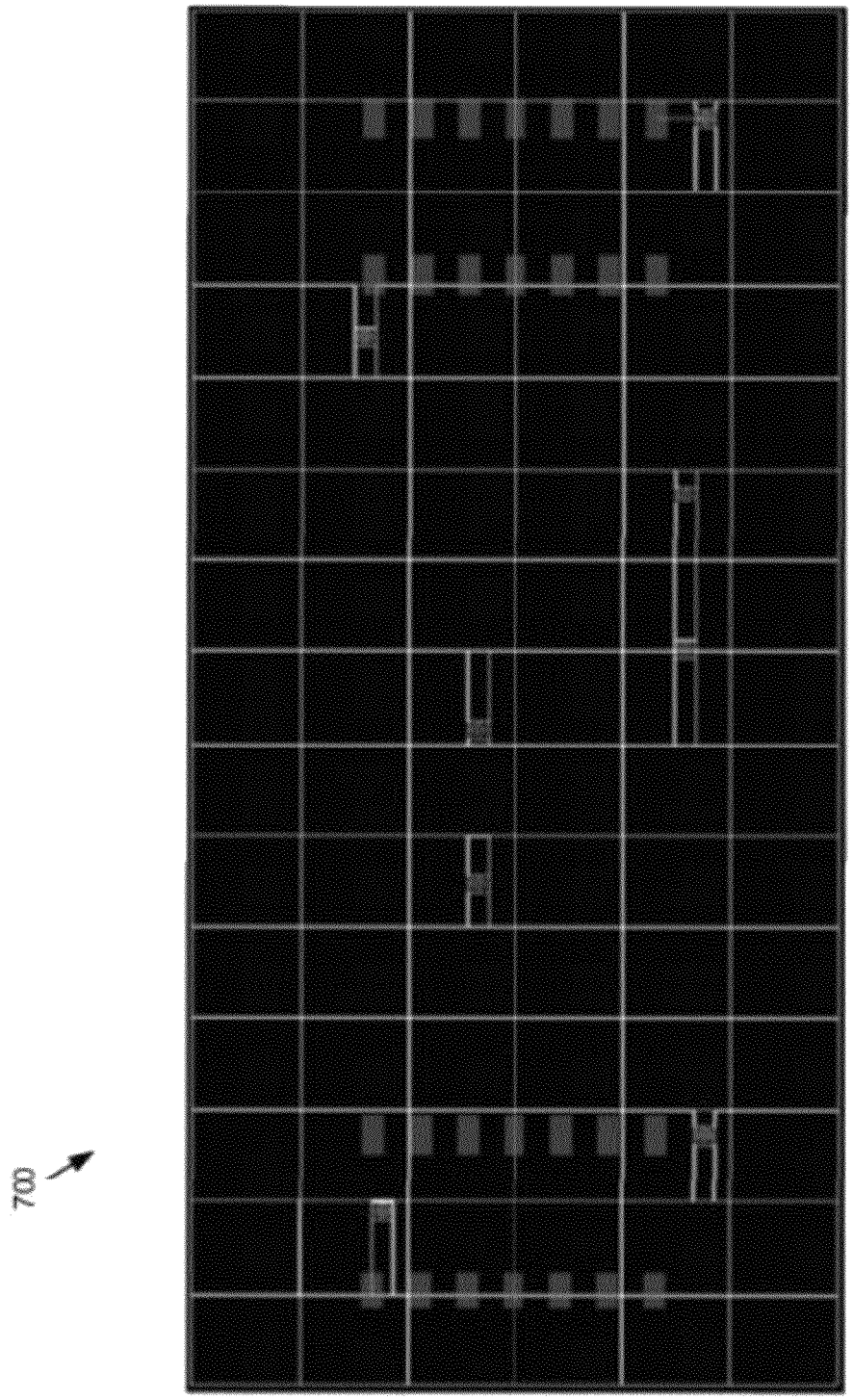
FIG. 7 is a diagram depicting results generated in accordance with the power delivery analysis process of the present disclosure.
Figure 8:
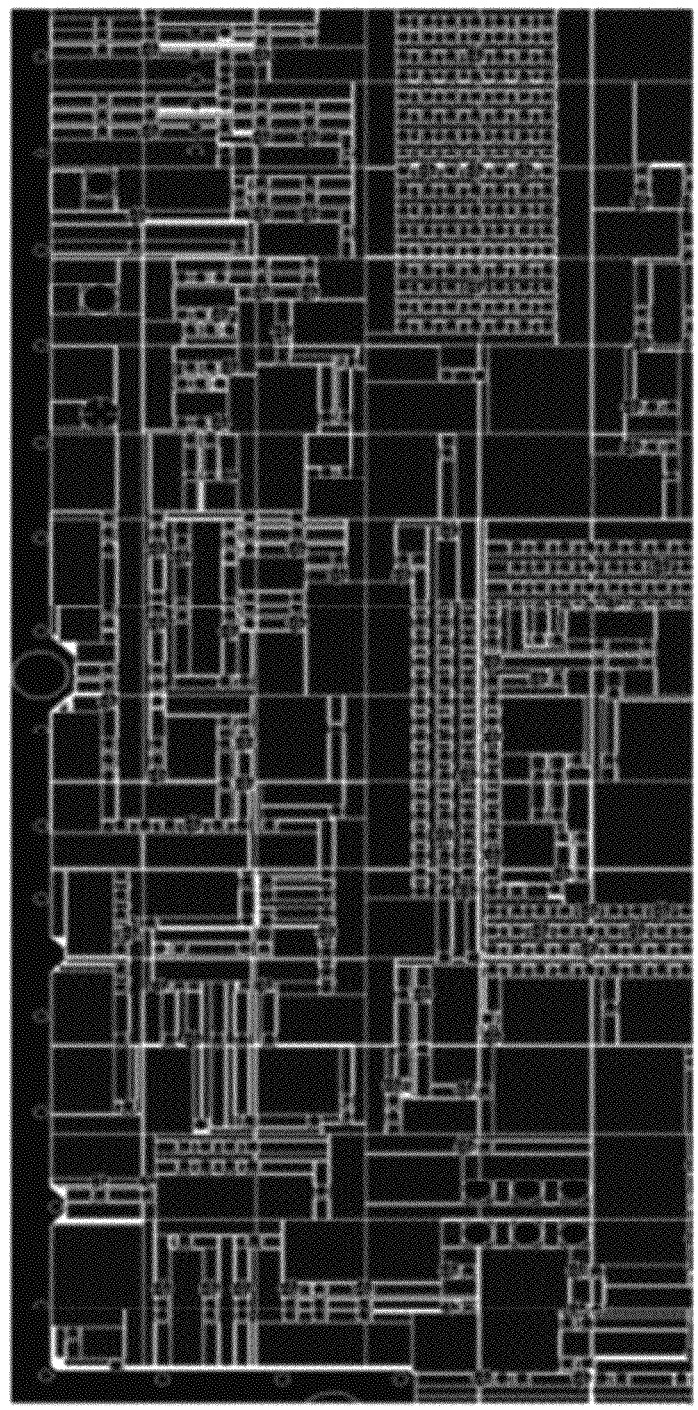
FIG. 8 is a diagram depicting results generated in accordance with the power delivery analysis process of the present disclosure.

Based upon the extracted geometry, the three dimensional adaptive rectangular mesh configuration shown in FIG. 7 may be generated depicting the multiple layers and shapes combined with splits, voids, antipads of vias, etc. For example, FIG. 8 depicts a three dimensional adaptive mesh where each layer has the same mesh while each mesh cell does not need to be aligned with each other at the four corner nodes. This may reduce the total number of cells thus improving the performance of the PDN analysis process.

Figure 9:
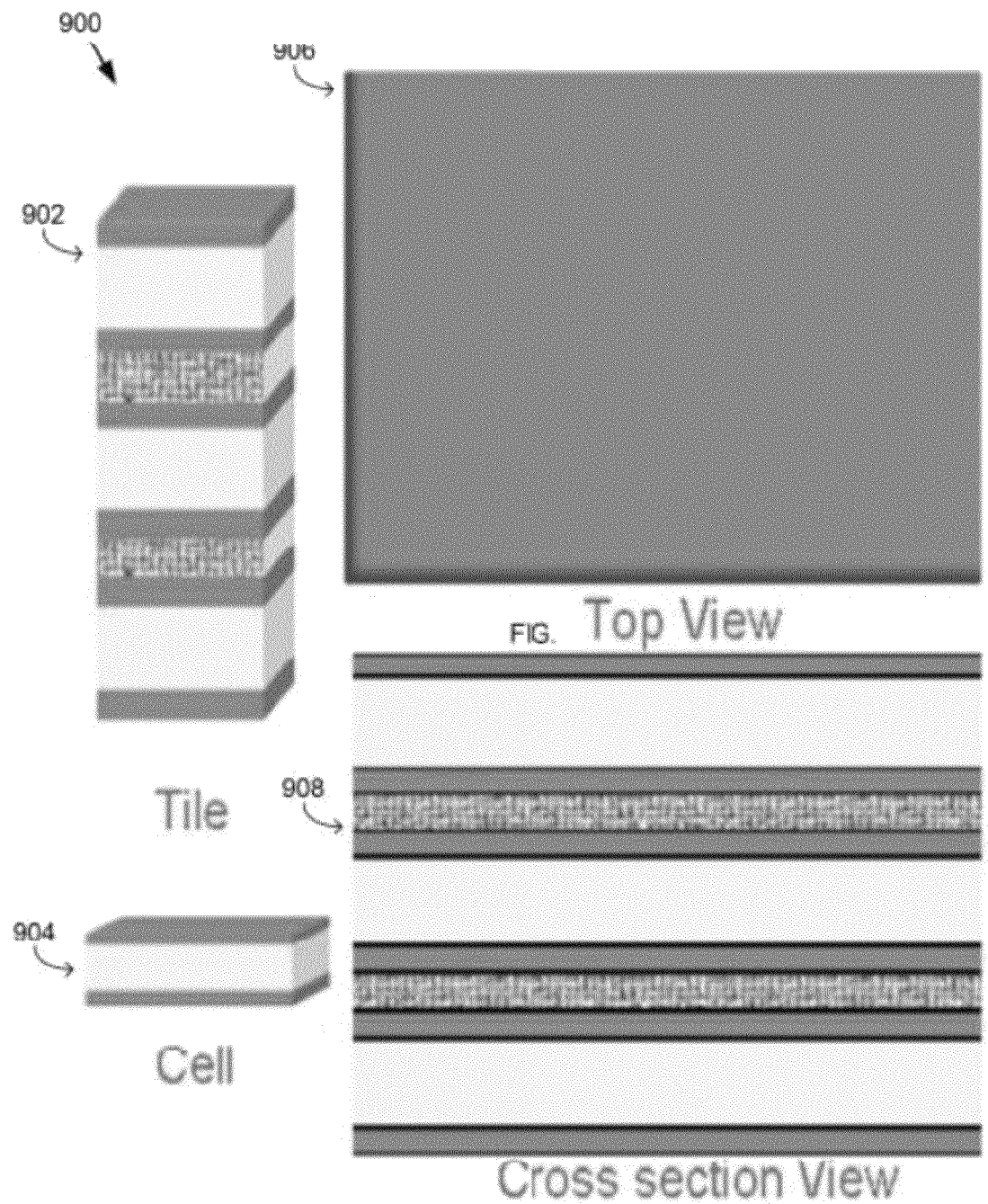
FIG. 9 is a diagram depicting models used in the power delivery analysis process in accordance with an embodiment of the present disclosure.

Referring now to FIG. 9, a diagram 900 depicting an exemplary embodiment of the present disclosure is provided. Diagram 900 shows a three dimensional mesh having TILE 902, CELL 904, as well as a top view of tile 906 and a cross sectional view of tile 908. For the purposes of this disclosure, each mesh is represented by the term "TILE" while each adjacent conductor embedded in the "TILE" is referred to as a "CELL". Power delivery network (PDN) analysis process may be used to generate the TILE and its related CELL structure. As is discussed in further detail below, an electromagnetic (EM) model (e.g., Unit Y parameter with length and width) may be extracted using a method of moments approach.

Figure 10:
FIG. 10 is a diagram depicting models used in the power delivery analysis process in accordance with an embodiment of the present disclosure.

Referring now to FIG. 10, an exemplary embodiment depicting diagram 1000 of the present disclosure is provided. Diagram 1000 depicts a tile structure 1002 having five conductive layers L1-L5. In contrast to traditional methodologies where each conductor only has one node at one X-Y location, the power delivery network analysis process described herein may include a method where each conductor has two nodes on its upper and lower surface, respectively. As shown in FIG. 10, the upper node is not connected to the lower node of one conductor (e.g. L1) because there is not any current passing from the upper node to the lower node because of skin effect at higher frequencies. For example, there are different nodes on each upper surface and each lower surface with 5 conductive layers in the tile. The exclusion is that the top and bottom layers of each tile may have only one node in its inner surface.

As illustrated in FIG. 10 and in accordance with embodiments of the present disclosure, virtual nodes, such as is representatively illustrated on the conductors of FIG. 10 may be utilized. As used herein, a "virtual node" is a location on a conductor as opposed to a physical node that forms a connection between conductive elements, such as a terminal of a physically realizable circuit element or a junction of conductive elements. A virtual node may be physically remote from connection with a physical circuit element, but may act as a physical node with regard to certain analysis techniques, such as forming interconnections of mesh of equivalent circuit models, as is described in exemplary embodiments herein. Any use of the term "node" herein may refer to a virtual node. A virtual node may also define a point at which mathematical operations may be evaluated in a numerical modeling process. For example, in addition to the equivalent circuit modeling described below, a configuration of virtual nodes constructed in accordance with the present disclosure may be used to evaluate the circuit designs herein by such numerical analysis techniques as finite-difference time domain modeling, the finite element method, and the method of moments.

In accordance with embodiments of the present disclosure, any number of the virtual nodes may be placed to conform to any arbitrary shape in a manner that reduces the number of mesh points required by conventional techniques. The adaptive mesh embodied in accordance with the present disclosure may decrease the amount of storage capacity, and also decrease the number of computations to analyze a particular circuit design. In certain embodiments of the present disclosure, the virtual nodes may be aligned in accordance with a coordinate system, such as a Cartesian system.

In certain embodiments of the present disclosure, the virtual nodes may be contained in an area defining a cell around each node, such as a cell. As used herein, a cell is a definition of a region that may be divided into other cells and/or joined with adjacent cells to form a single cell. The cell may be of any suitable shape.

Figure 11:
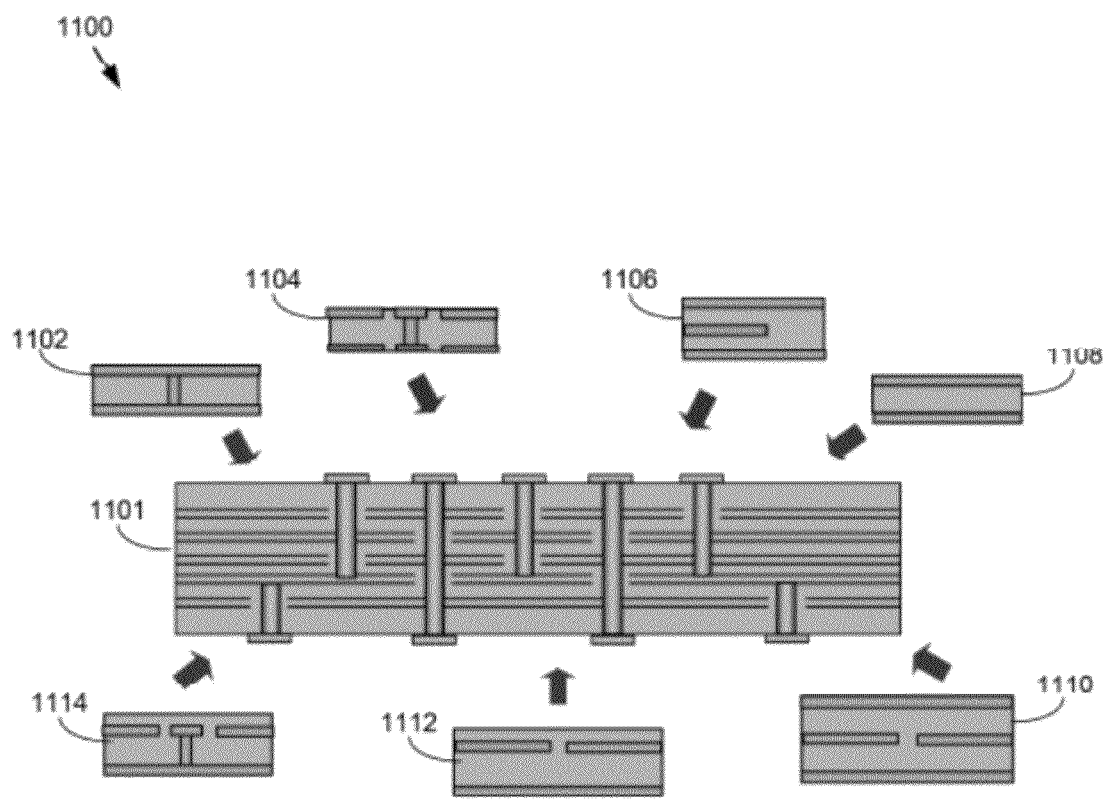
FIG. 11 is a diagram depicting some of the discontinuity models used in the power delivery analysis process in accordance with an embodiment of the present disclosure.

Referring now to FIG. 11, an exemplary embodiment depicting diagram 1100 of the present disclosure is provided. Diagram 1100 depicts a decomposition of a complex PDN structure 1101. Having obtained the model for each cell in one tile, the upper node cannot be connected to the lower node directly. Therefore, the discontinuity models from plane split and plane edge and via/pin may be extracted to link the upper and lower surface nodes. The discontinuity structures like the power, ground and signal vias (with one end shorting for different net connection, two end shorting for same net connection, two end opening among two planes), the over-layered plane split, the sandwich plane split, the sandwich plane and plane edge and truncated plane edge are shown in detail in FIG. 11. Specifically, PDN structure 1101 may be decomposed into pin 1102, through via 1104, sandwich plane edge 1106, plane pair 1108, sandwich split plane 1110, overlay split plane 1112, and bottom shorted via 1114. It should be noted that these discontinuity structures are merely provided for exemplary purposes as other embodiments are also within the scope of the present disclosure.

Figure 12:
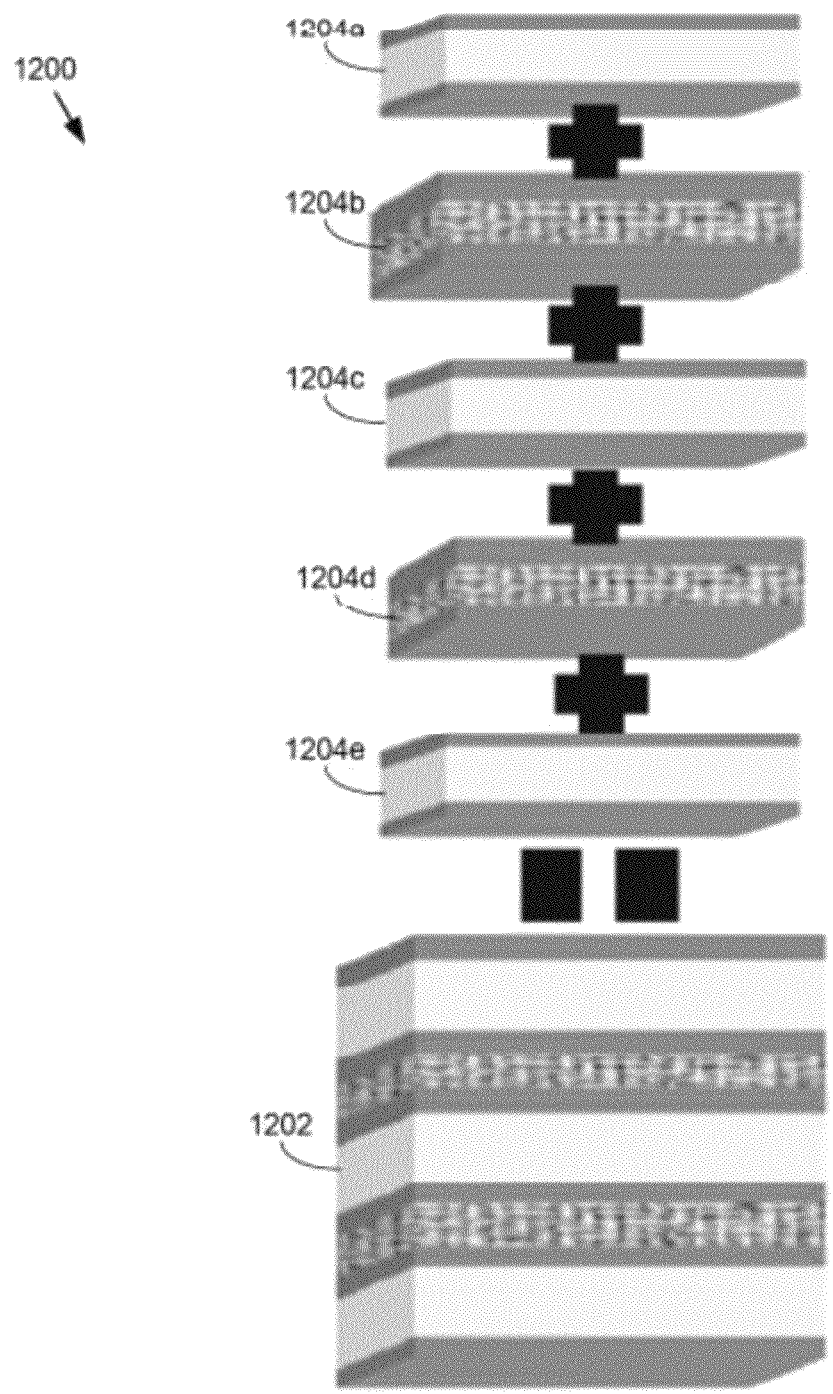
FIG. 12 is a diagram depicting models used in the power delivery analysis process in accordance with an embodiment of the present disclosure.

Referring now to FIG. 12, an exemplary embodiment depicting diagram 1200 of the present disclosure is provided. Diagram 1200 depicts one TILE 1202 composed of multiple CELLs 1204 a-e. In some embodiments, during the model extraction process, the plane model of each "CELL" may be extracted by method of moments if the layer stackup (e.g., thickness, conductivity of two conductors, dielectric material including thickness dielectric constant, loss tangent) of this specified cell has not been extracted as shown in FIG. 12.

Figure 14:
FIG. 14 is a diagram depicting models used in the power delivery analysis process in accordance with an embodiment of the present disclosure.

Referring now to FIG. 13, an exemplary embodiment depicting diagram 1300 of the present disclosure is provided. FIG. 13 shows one mesh CELL composed of four segments. It should be noted that CELLs having differing sizes (e.g., length and width) may have different S/Y/Z parameter models. For example, 4 Y parameter models 1302 may be employed to analyze the frequency dependent characteristics of the meshed rectangular cell 1304 during the design stage so that prudent design measures may be taken. FIG. 13 depicts a CELL model includes a plurality of 4 looped segment Y parameter models contained within a cell. Each segment may be modeled by using Method of moments with perfect magnetic condition boundaries on two sides as shown in FIG. 14.

Figure 15:
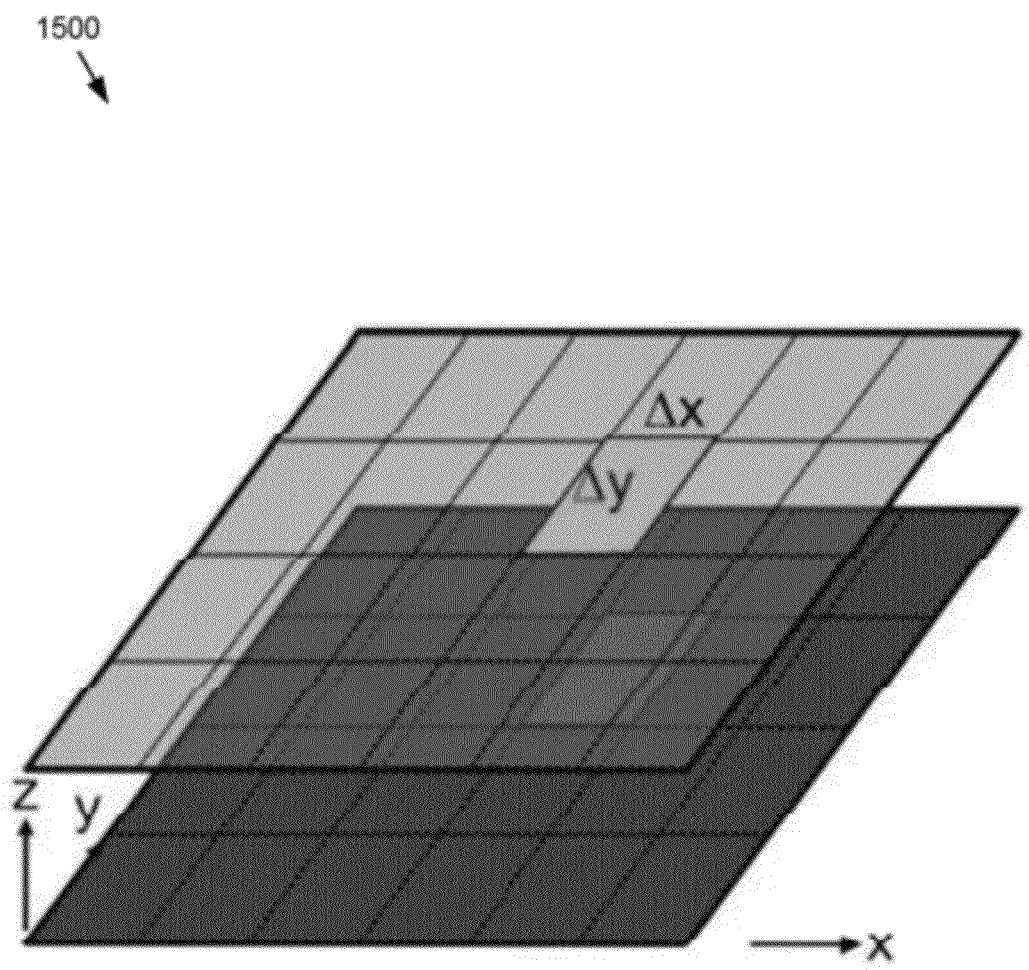
FIG. 15 is a diagram depicting models used in the power delivery analysis process in accordance with an embodiment of the present disclosure.

Referring now to FIG. 15, an exemplary embodiment depicting diagram 1500 of the present disclosure is provided. In the past, model extraction may take a great deal of time because of the presence of so many different cells even though they have the same layer stackup as shown in FIG. 15. The power delivery network (PDN) analysis process of the present disclosure may utilize a scaled Y parameter model with one cell unit length and width. This may be set by a programmer and may be used for cell model extraction. For the purposes of this disclosure this may be referred to herein as "CELLDEF". Using the CELLDEF, any cell instance having the same layer stack and different length/width may be obtained without requiring the performance of method of moments field solver repeat, which may improve the model extraction process significantly. The term "field solver" generally refers to a specialized program capable of solving one or more of Maxwell's equations.

Figure 16:
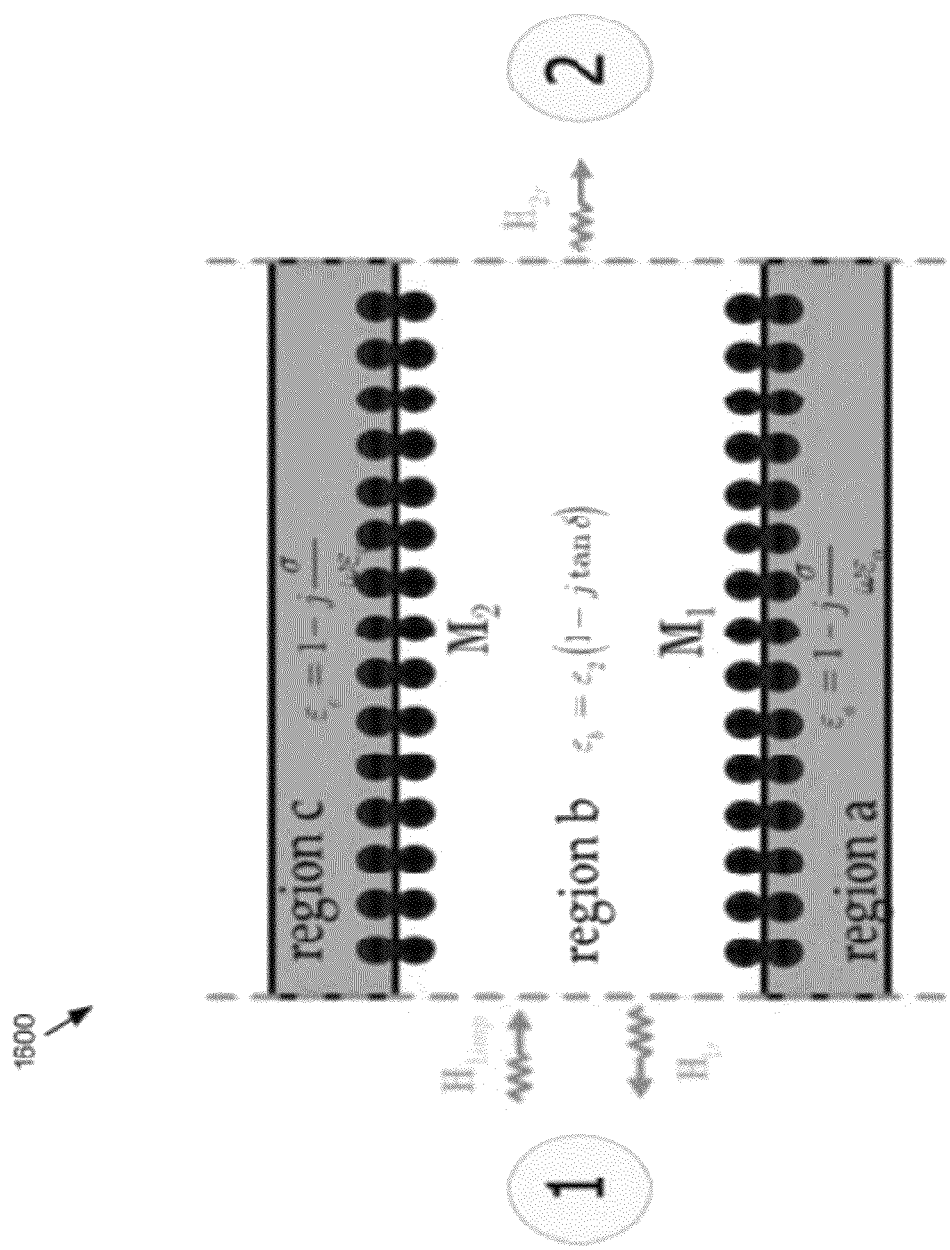
FIG. 16 is a diagram depicting models used in the power delivery analysis process in accordance with an embodiment of the present disclosure.

Referring now to FIG. 16, an exemplary embodiment depicting diagram 1600 of the present disclosure is provided. Diagram 1600 illustrates one embodiment utilizing a method of moments/CELLDEF approach for modeling a plane cell. In some embodiments, both the top and bottom conductor may be treated as normal lossy material, and the equivalent magnetic currents may be determined using the Method of moments method. The EM field in three regions (e.g. region a, region b, and region c) may be calculated by utilizing the Green's functions respectively. This may be achieved by impressing the TEM source at one port and calculating the reflected and transmitted EM field at two ports. The S/Y parameter may be calculated using this approach. After the unit cell model is extracted, the new Y cell model instance may not be generated at once. In this disclosure, the scaled Y parameter model having a set length and width is created for a plane cell instance. Even though the Y parameter model may be obtained through given length and width for each instance, the Y parameter model is not generated directly in this disclosure, but with two scaled parameters—length and width.

The following is one particular consumption example as provided in a circuit netlist: Y_instance n1L1 n2L1 n1L2 n2L2 file=cell.ynp width=2.1 length=4.2, where the file "cell.ynp" is the CELLDEF having a unit width=1 mm, length=1 mm, and n1L1, n2L1, n1L2, and n2L2 are the names of 4 Y parameter nodes. The width and length are the given dimensions from the meshed tile/cell or rectangular plane pair structure. Using the power delivery network (PDN) analysis process described herein, the storage and/or parsing process of reading/writing files for Y parameter model instances may be significantly reduced. With the unit Y parameter from CELLDEF, the simulator may reconstruct and modify the value according to its length and width parameters internally.

Figure 17:
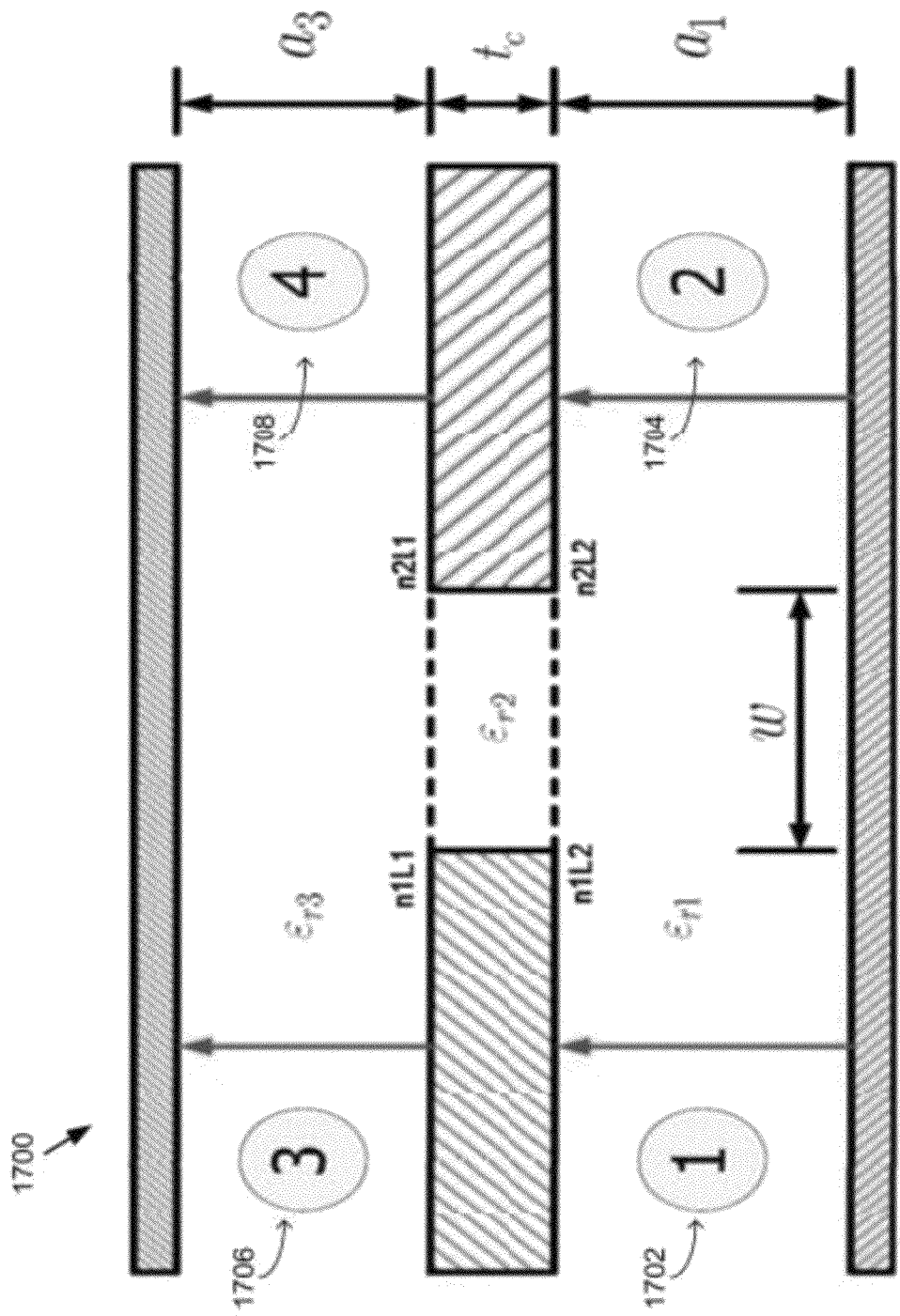
FIG. 17 is a diagram depicting models used in the power delivery analysis process in accordance with an embodiment of the present disclosure.

Referring now to FIG. 17, an exemplary embodiment depicting diagram 1700 of the present disclosure is provided. Diagram 1700 illustrates one embodiment depicting a cross-sectional view of a sandwich split-plane structure, which includes the plane split and plane edge discontinuity models. As mentioned above, the nodes on the upper surface and the lower surface of the CELL model may not be connected to each other directly, but through the plane and via discontinuity models. In FIG. 17, there is one split plane/gap which has thickness "$t_c$", width "w" and is embedded into two top and bottom planes. For the middle layer conductor, there are two nodes n1L1 and n1L2 on the left side and they belong to "cell 1" 1702 and "cell 3" 1706 respectively. The two nodes n1L1 and n1L2 are located on the left side and they correspond to "cell 2" 1704 and "cell 4" 1708 respectively. These four nodes may be connected through the split plane model with an 8 node Y parameter model. For simplification purposes, the 6 node plane discontinuity model may be adopted by assuming the n1L1 and n1L2 nodes are shorted at the split location and then connected to the plane split discontinuity model. From FIG. 17, the width of the split plane and its stackup are given and the length of this split is one variable. Therefore, the Y parameter for split plane and edge plane has only one variable parameter—the length. Here, the scale parameter is used. The following is a consumption example for the sandwich split plane in circuit netlist: Y_instance n1L1 n2L1 n1L2 n2L2 n1L3 n2L3 file=cell.ynp scale=2, where the file "cell.ynp" is the discontinuity model having a unit width=1 mm, and n1L1, n2L1, n1L2, n2L2, n1L3, and n2L3 are the names of the 6 Y parameter nodes of the sandwich split plane. The scale is the given dimension from the meshed split plane structure.

Figure 18:
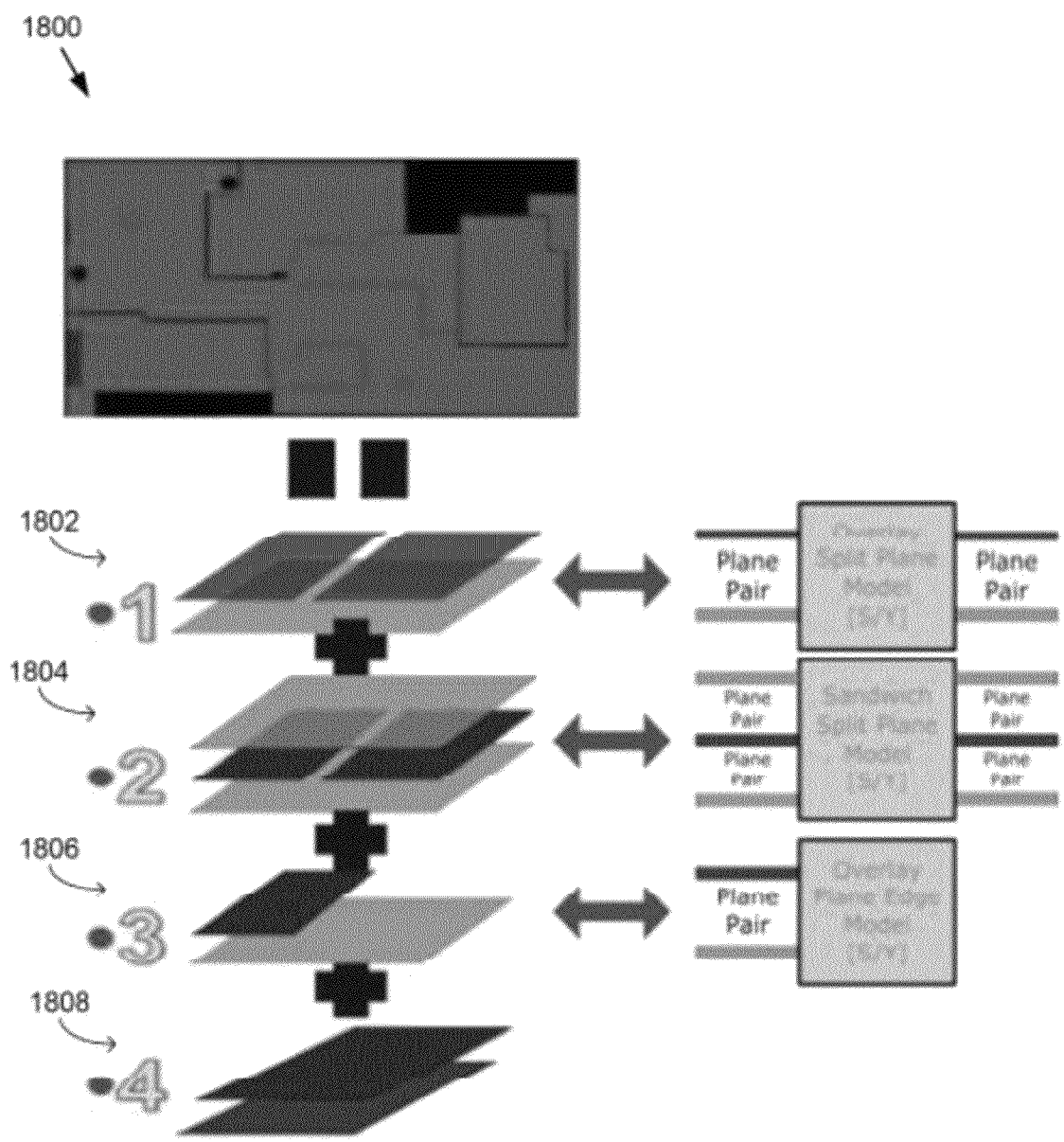
FIG. 18 is a diagram depicting models used in the power delivery analysis process in accordance with an embodiment of the present disclosure.

Referring now to FIG. 18, an exemplary embodiment depicting diagram 1800 of the present disclosure is provided. Diagram 1800 illustrates one embodiment depicting a plurality of additional plane discontinuity models. For example, diagram 1800 includes overlay split plane model 1802, sandwich split plane model 1804, overlay plane edge model 1806, and plane pair 1808. As shown in FIG. 18, the number of nodes required for the plane edge discontinuity model may be two while that of the split plane discontinuity model may be four, which is illustrated in further detail below. After the plane cell model and plane discontinuity models have been extracted, the via model may be extracted using a method of moments calculation and/or a frequency dependent skin effect function. In some embodiments, the via parameter model may not be scaled. Therefore, each different type of via stack and size may have a different Y parameter model. The via model may be subdivided into several types as shown in FIG. 19.

Figure 19:
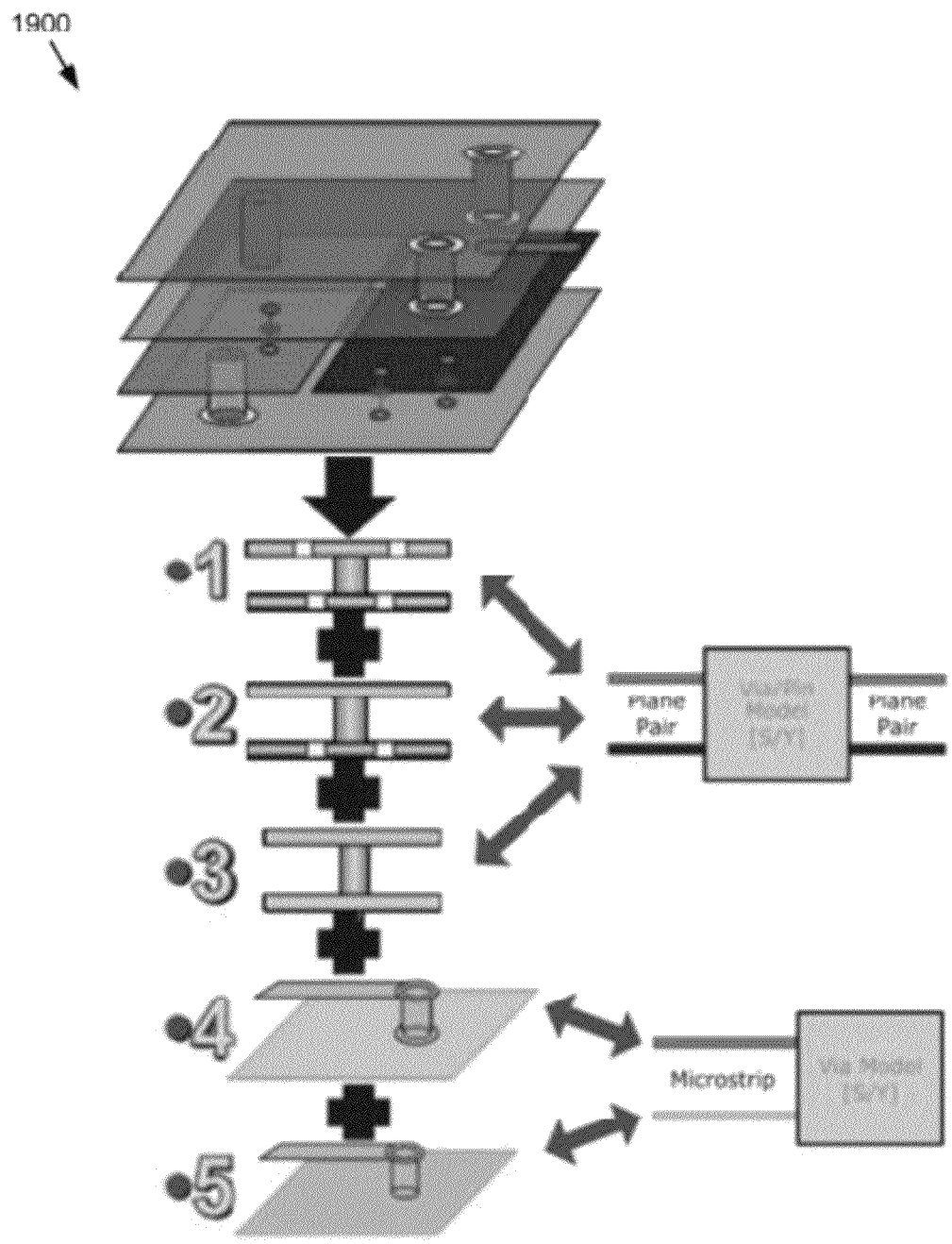
FIG. 19 is a diagram depicting models used in the power delivery analysis process in accordance with an embodiment of the present disclosure.

Referring now to FIG. 19, an exemplary embodiment depicting diagram 1900 of the present disclosure is provided. Diagram 1900 illustrates one embodiment depicting some of the different types of vias present in a power delivery network. In some embodiments, the via structures including power via, ground via and signal via between two planes may be accurately modeled by method of moments. As shown in FIG. 19, models 1-3 indicate plane pair and via/pin models and models 4-5 indicate via model with microstrip configurations.

Figure 20:
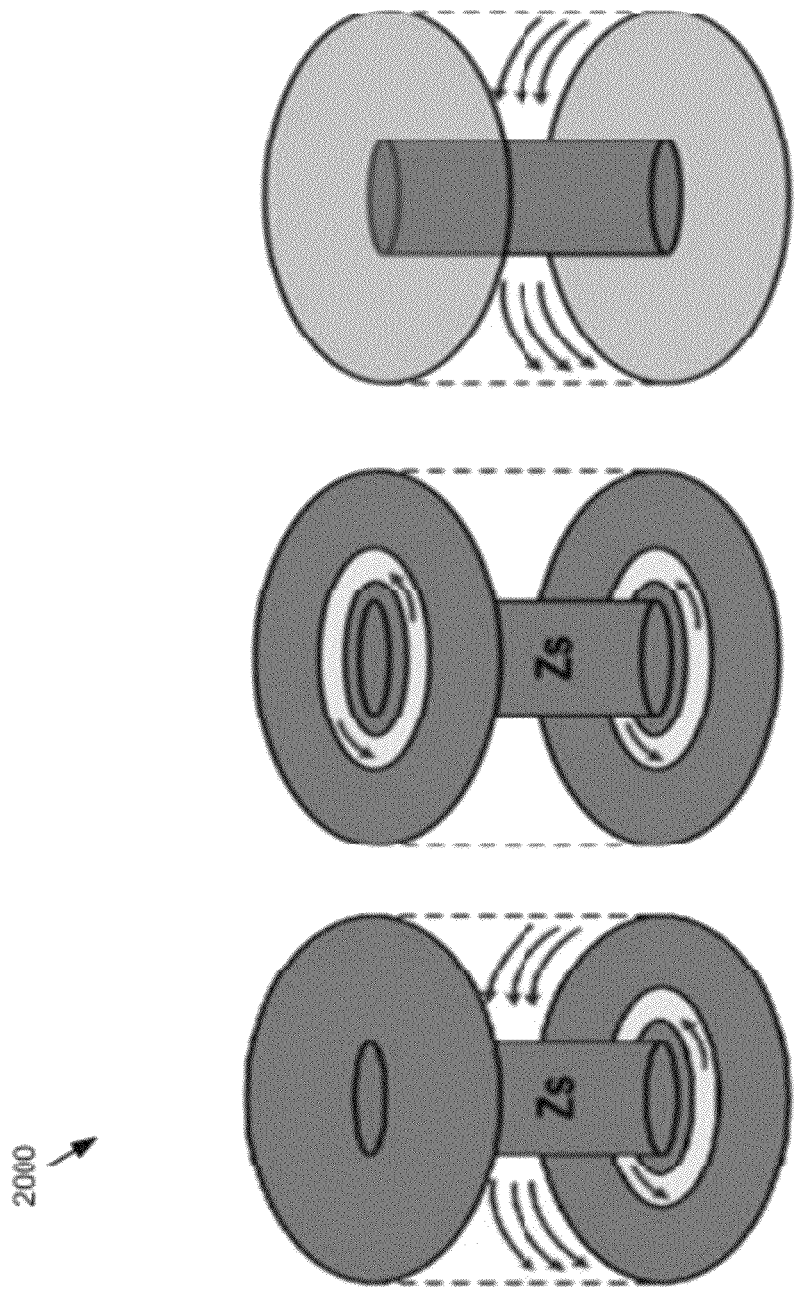
FIG. 20 is a diagram depicting models used in the power delivery analysis process in accordance with an embodiment of the present disclosure.
Figure 21:
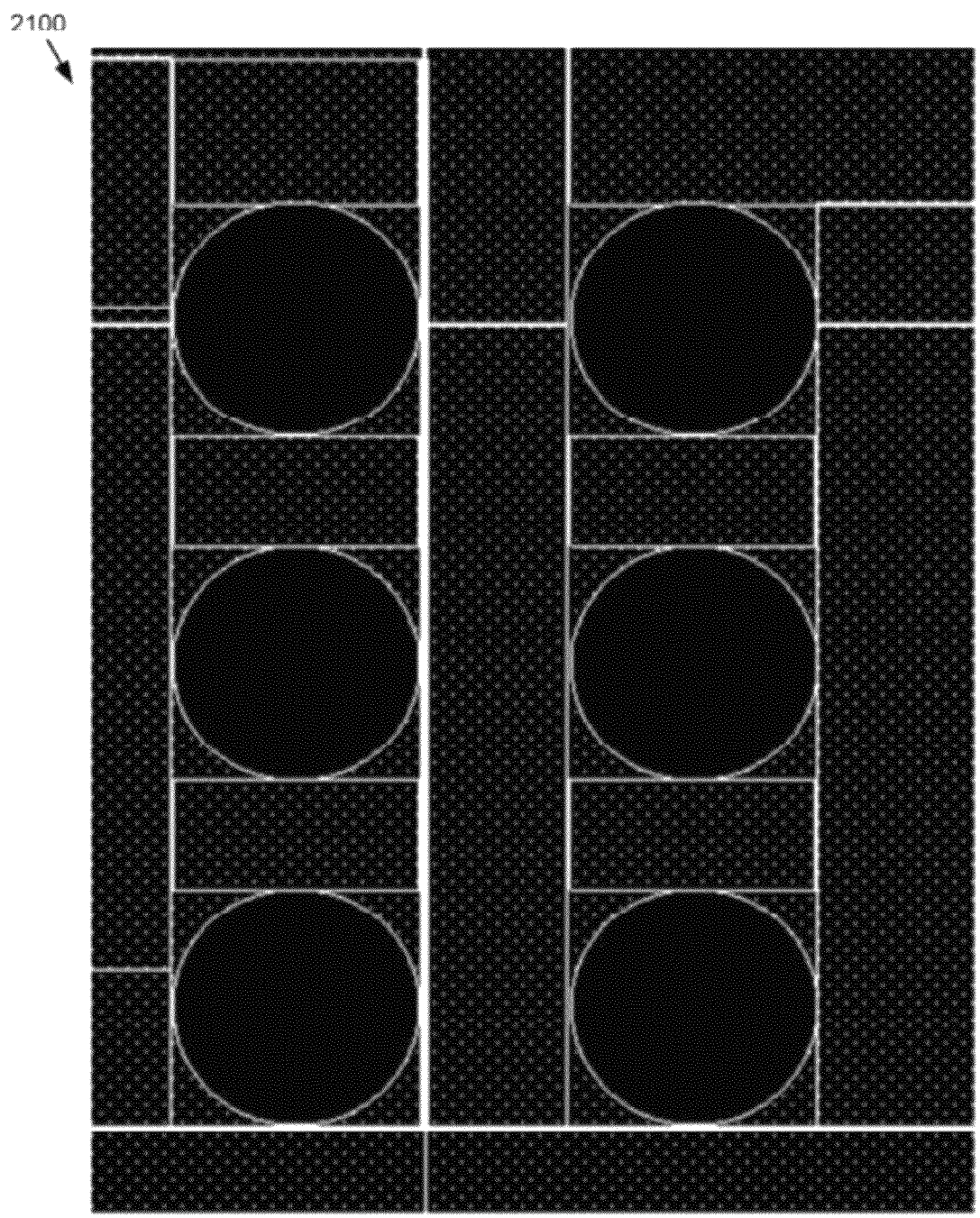
FIG. 21 is a diagram depicting results generated in accordance with the power delivery analysis process of the present disclosure.
Figure 22:
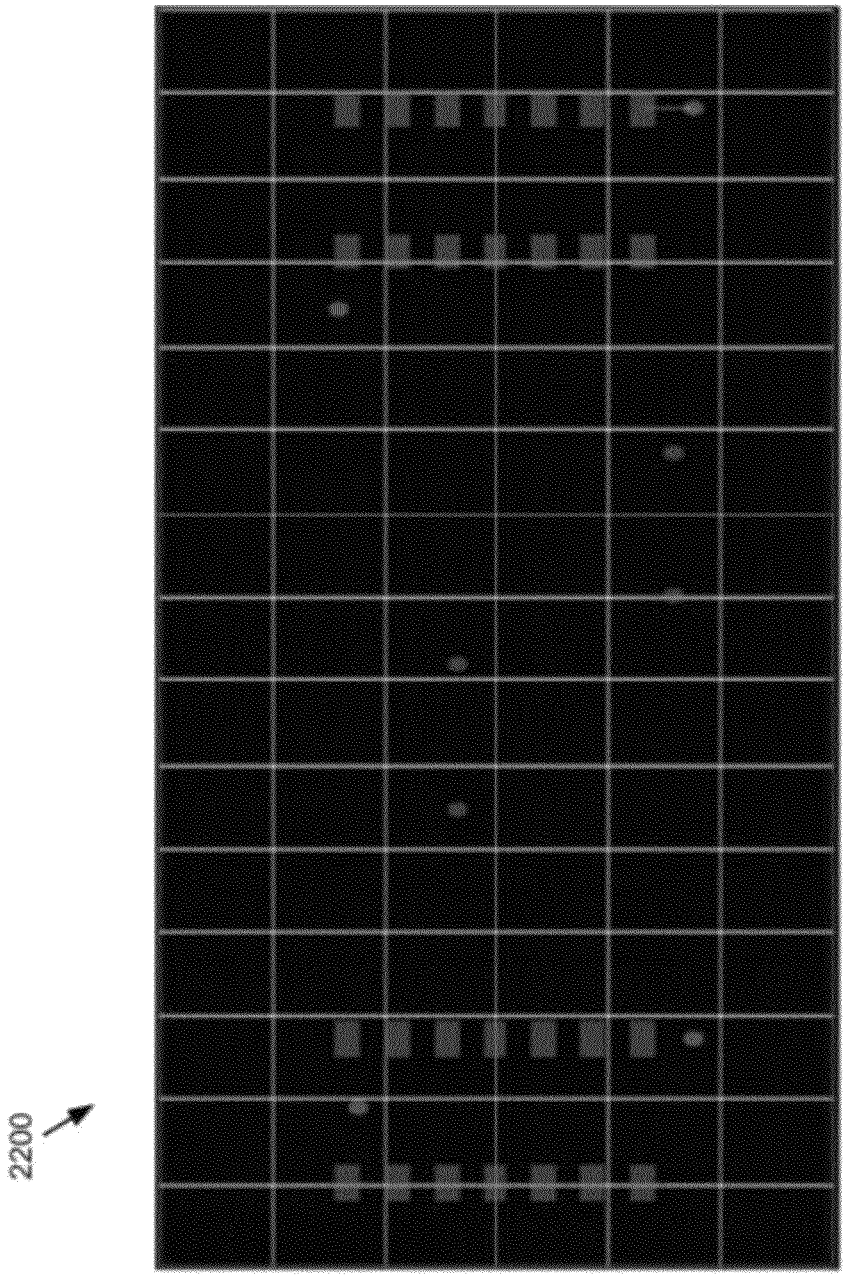
FIG. 22 is a diagram depicting results generated in accordance with the power delivery analysis process of the present disclosure.

Referring now to FIG. 20, an exemplary embodiment depicting diagram 2000 of the present disclosure is provided. Diagram 2000 illustrates one embodiment depicting a via cylinder port in accordance with the present disclosure. In this embodiment, the cylinder port, may include two nodes with one on the upper layer and other on the lower layer. The cylinder port may be defined and connected to the rectangular cells adjacent to it, which is illustrated in FIG. 21. In other words, the via nodes may be connected o the adjacent plane cell node. Furthermore, the upper node and lower node on one plane conductor in the created circuit netlist may be shorted together as shown in FIG. 22. FIG. 22 depicts one via passing through plane structure having one antipad when the antipad is small enough to be ignored during the mesh process for higher performance. The remaining part is the single plane mesh model without any other overlapped parts. This Y parameter model may be obtained using skin effect formula Zs. In some embodiments, the surface impedance between two nodes may be transferred into two node Y parameter model. Then the scaled Y parameter model "SKINDEF" may be used for modeling a single plane. It may have the same description except for the number of nodes may only be two.

In some embodiments, similar to the plane pair model, the skin model may be adopted to deal with the single plane/shape structure. At first, the shape may also be meshed by a rectangular mesh, as each mesh may be represented by four Y parameter skin models. For the purposes of the present disclosure, the Y parameter skin models may be derived from SKINDEF Y parameter model with one scale (width/length) value, where the SKINDEF model with one unit scale=1.0 is extracted by analytical full wave method as following equation (2):

$$Z_s = \frac{k}{\sigma} \frac{e^{kt} + e^{-kt}}{e^{kt} - e^{-kt}} \qquad (2)$$

Where the $$k = \frac{1+j}{\delta} = \sqrt{j\omega\sigma\mu}$$

and t is the thickness of single plane. With this SKINDEF model, the skin model with a different scale may be obtained with its actual width/length ratio, which may be similar to the CELLDEF examples provided above. After the unit skin model (SKINDEF) is extracted, the new Y skin model instance may be generated. For the purposes of the present disclosure, even though the Y parameter model may be obtained through a given width/length for each instance, the Y parameter model may be generated with scaled parameters—width/length, which may be created from a single plane cell instance. The following is a consumption example in circuit netlist: Y_instance n1L1 n2L1 file=skin.ynp scale=0.5, where the file "skin.ynp" is the SKINDEF with unit scale=1.0, and n1L1 and n2L1 are the names of 2 Y parameter nodes. The scale is the given dimensions (e.g., width/length) from the meshed rectangular single plane structure. Using this approach, the storage and parsing process of reading and/or writing files for Y parameter model instances may be largely reduced. With the unit Y parameter from SKINDEF, the simulator may reconstruct and modify the value according to its scale parameters internally.

Figure 23:
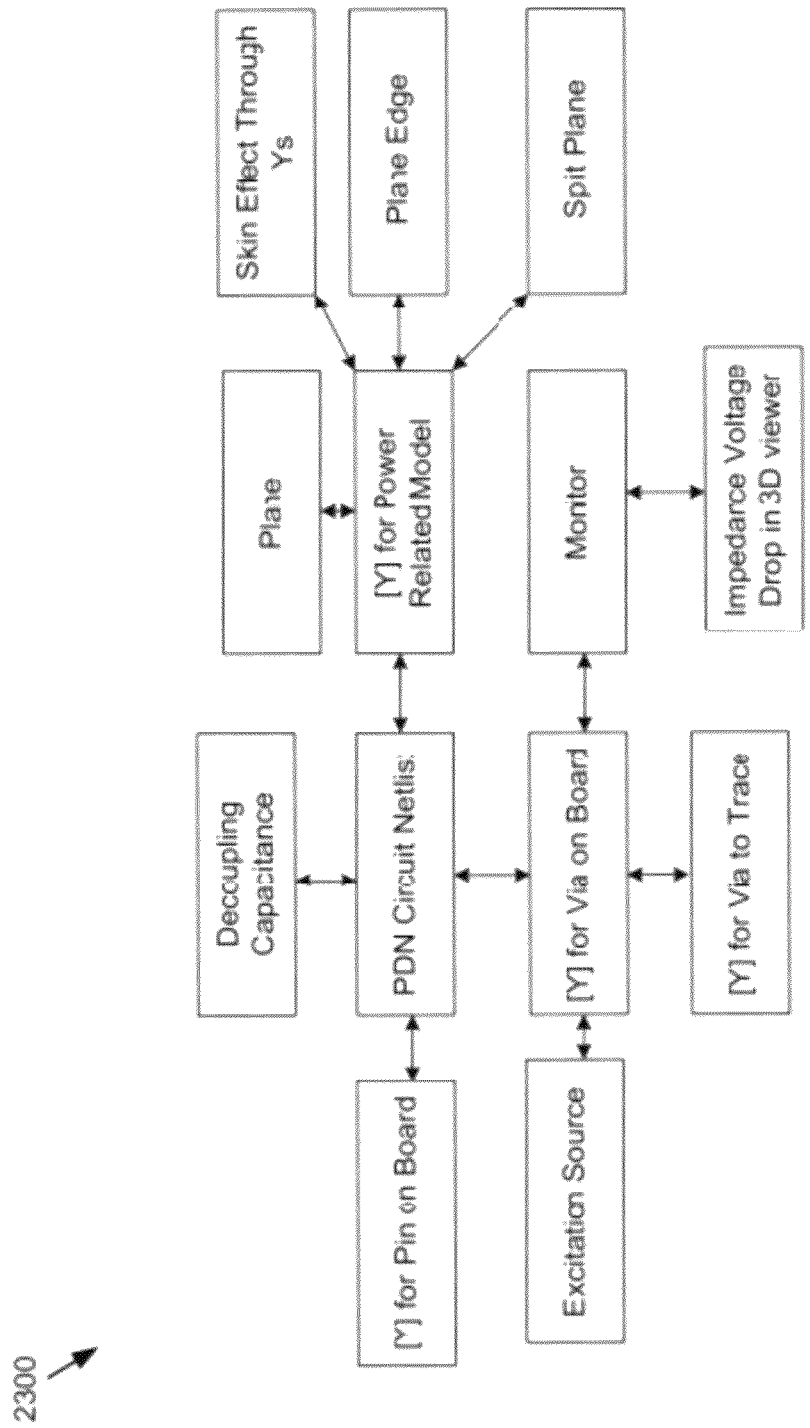
FIG. 23 is a flow diagram depicting a system in accordance with embodiments of the present disclosure.

Referring now to FIG. 23, an exemplary embodiment depicting diagram 2300 of the present disclosure is provided. Diagram 2300 illustrates one embodiment depicting the power delivery network analysis process described herein. Having obtained the Y parameter model for the plane pair, plane discontinuity, single plane with surface impedance, and via and pin structure, PDN analysis process may incorporate some or all of the components shown in FIG. 23. By inputting excitation sources on component pins, the voltage drop and impedance on any measurement pin may be monitored or viewed using a three dimensional viewer, as discussed in further detail below.

Figure 24:
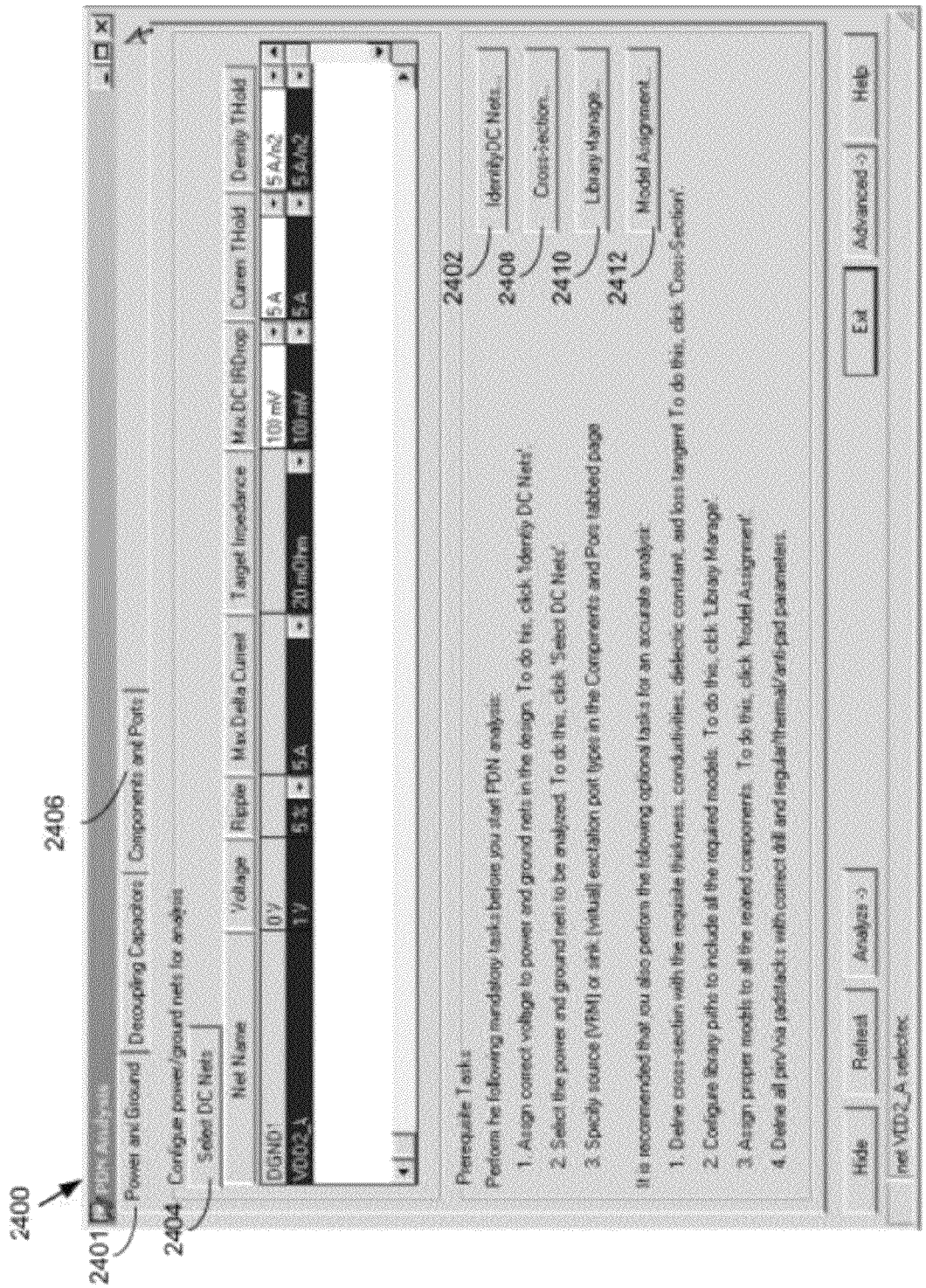
FIG. 24 is a diagram depicting a screenshot consistent with an embodiment of the power delivery analysis process of the present disclosure.

Referring now to FIG. 24, an exemplary embodiment depicting a user interface 2400 of the present disclosure is provided. User interface 2400 illustrates one embodiment that may be used in accordance with the power delivery network analysis process of the present disclosure. As shown in FIG. 24, user interface 2400 may allow a designer to configure the power and ground nets for analysis using power and ground tab 2401. UI 2400 may allow the designer to assign the correct voltage to the power and ground nets in the design. This may be accomplished utilizing the "Identify DC Nets" tab 2402. UI 2400 may also allow the designer to select the power and ground nets to be analyzed. This may be accomplished utilizing the "Select DC Nets" tab 2404. UI 2400 may also allow the designer to specify the source (VRM) or sink (virtual) excitation ports using "components and ports" tab 2406. UI 2400 may also allow the designer to define the cross-section with the requisite thickness, conductivities, dielectric constant, and loss tangent by utilizing "cross section" tab 2408. UI 2400 may further allow the designer to configure library paths to include all of the required models using the "library manage" tab 2410. UI 2400 may also allow the designer to assign proper models to all of the related components using the "model assignment" tab 2412. UI 2400 may also allow the designer to define all of the pin/via padstacks with the correct drill and regular/thermal/anti-pad parameters. Additional and/or alternative options are also within the scope of the present disclosure.

Figure 25:
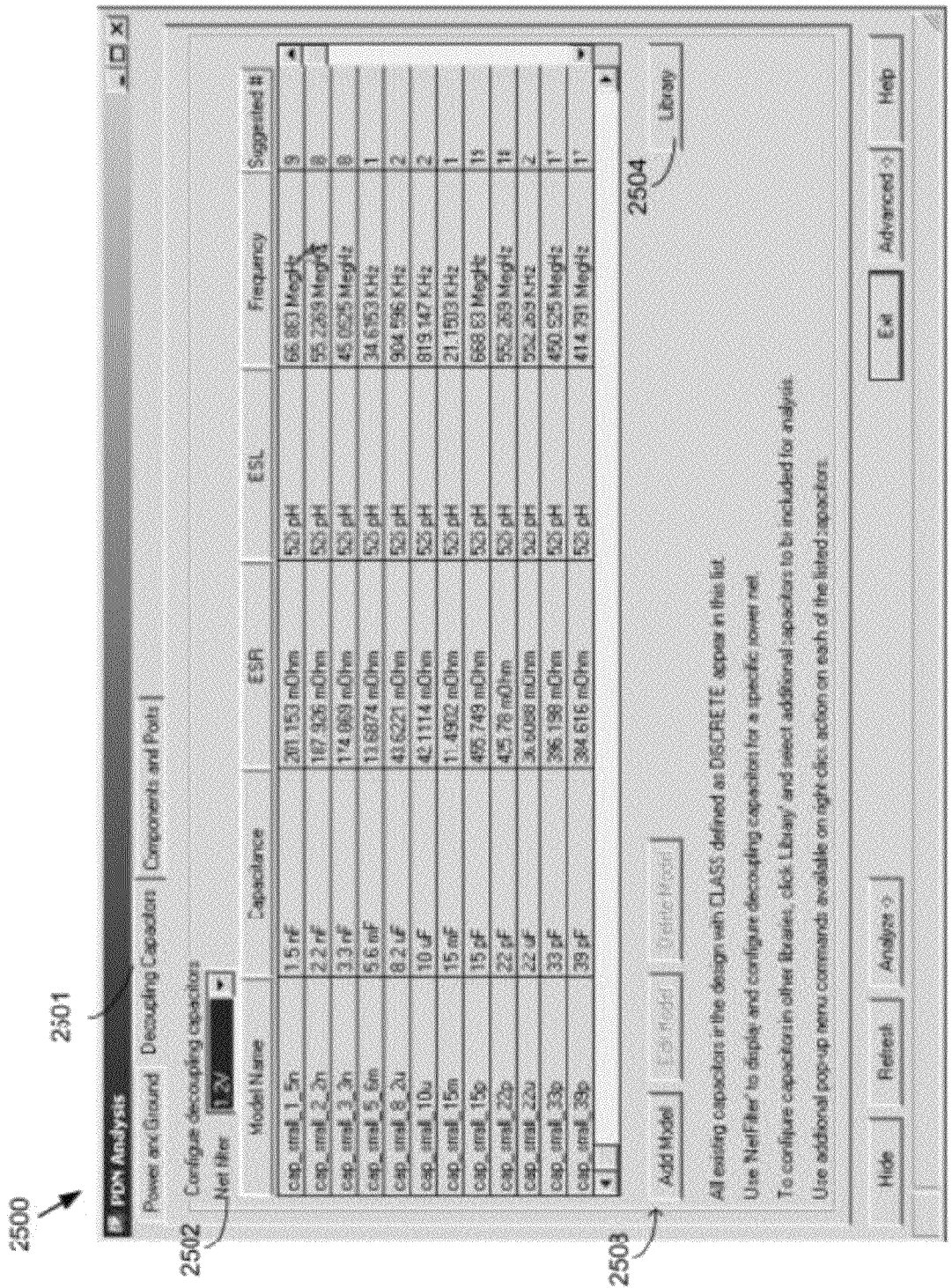
FIG. 25 is a diagram depicting a screenshot consistent with an embodiment of the power delivery analysis process of the present disclosure.

Referring now to FIG. 25, an exemplary embodiment depicting a user interface 2500 of the present disclosure is provided. User interface 2500 illustrates one embodiment that may be used in accordance with the power delivery network analysis process of the present disclosure. As shown in FIG. 25, user interface 2500 may allow a designer to configure one or more decoupling capacitors by selecting "decoupling capacitors" tab 2501. UI 2500 may provide the designer with all existing capacitors in the design. "Net filter" tab 2502 may be used to display and configure the decoupling capacitors for a specific power net. In order to configure capacitors in other libraries, "library tab" 2504 may be selected. Once activated, additional capacitors may be selected for analysis. Additional pop-up menu commands may be available using right-click activation on each capacitor. UI 2500 provides the designer with the ability to add, delete and edit the capacitor models as necessary using tabs 2508. Additional and/or alternative options are also within the scope of the present disclosure.

Figure 26:
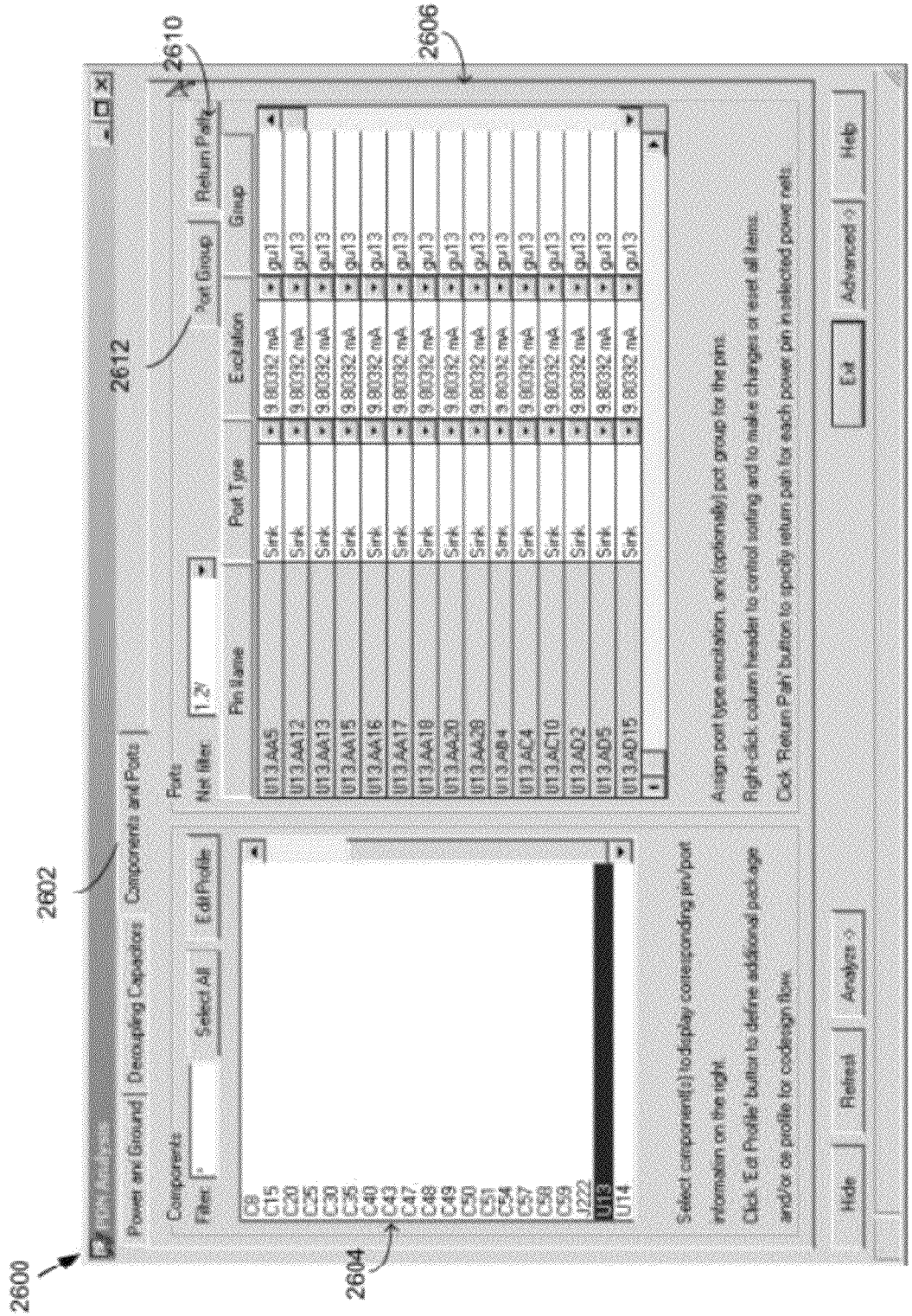
FIG. 26 is a diagram depicting a screenshot consistent with an embodiment of the power delivery analysis process of the present disclosure.

Referring now to FIG. 26, an exemplary embodiment depicting a user interface 2600 of the present disclosure is provided. User interface 2600 illustrates one embodiment that may be used in accordance with the power delivery network analysis process of the present disclosure. As shown in FIG. 26, user interface 2600 may allow a designer to configure the port information (e.g., port type, excitation, and group) for selected components using "components and ports" tab 2602. UI 2600 may include a component window 2604, which may allow the designer to select the component in order to display the corresponding pin/port information in display panel 2606. UI 2600 may include "edit profile" tab 2608, which may allow the designer to define an additional package and/or die profile for co-design flow. UI 2600 may further include "return path" tab 2610, which may allow the designer to specify the return path for each power pin in selected power nets. Additional and/or alternative options are also within the scope of the present disclosure.

Figure 27:
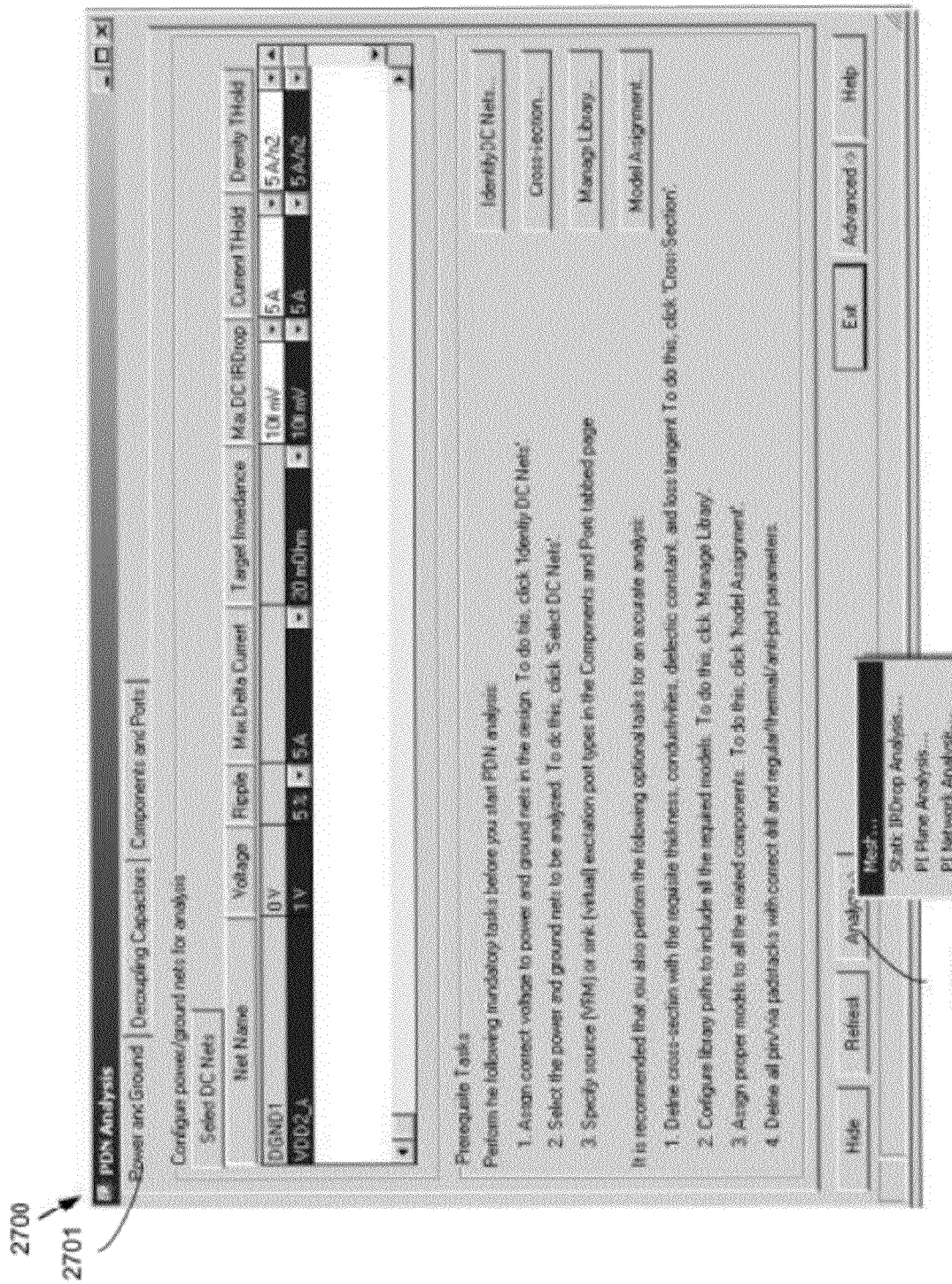
FIG. 27 is a diagram depicting a screenshot consistent with an embodiment of the power delivery analysis process of the present disclosure.

Referring now to FIG. 27, an exemplary embodiment depicting a user interface 2700 of the present disclosure is provided. User interface 2700 illustrates one embodiment that may be used in accordance with the power delivery network analysis process of the present disclosure. As shown in FIG. 27, user interface 2700 may include "analyze" tab 2702 under "power and ground" tab 2701. Analyze tab 2702 may include a variety of options, including but not limited to, mesh, static IRDrop, PI Plane, and PI network analysis. Additional and/or alternative options are also within the scope of the present disclosure.

Figure 28:
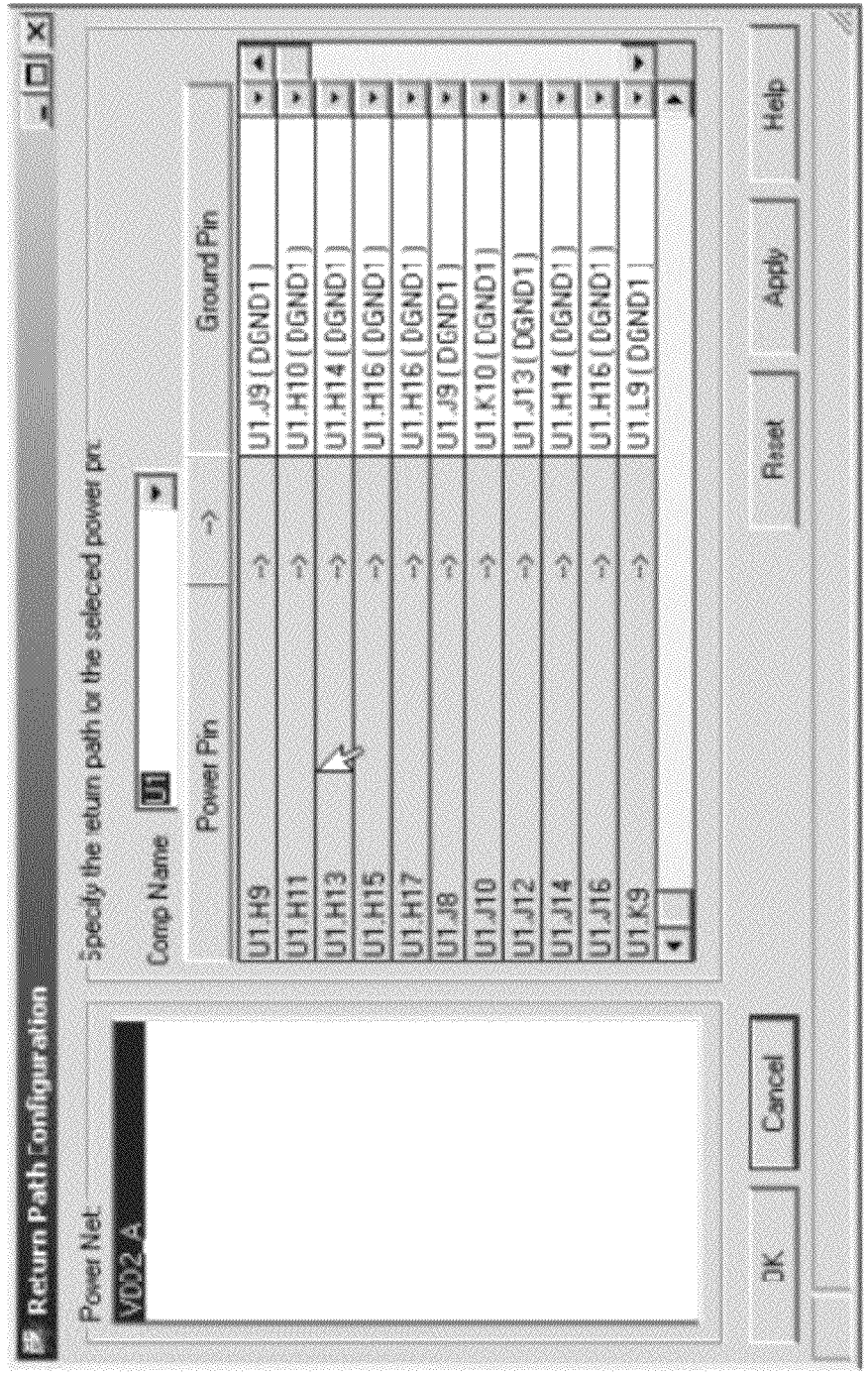
FIG. 28 is a diagram depicting a screenshot consistent with an embodiment of the power delivery analysis process of the present disclosure.

Referring now to FIG. 28, an exemplary embodiment depicting a user interface 2800 of the present disclosure is provided. User interface 2800 illustrates one embodiment that may be used in accordance with the power delivery network analysis process of the present disclosure. As shown in FIG. 28, user interface 2800 depicts the return path configuration, which may be displayed upon the activation of return path tab 2610 from FIG. 26. Additional and/or alternative options are also within the scope of the present disclosure.

Figure 29:
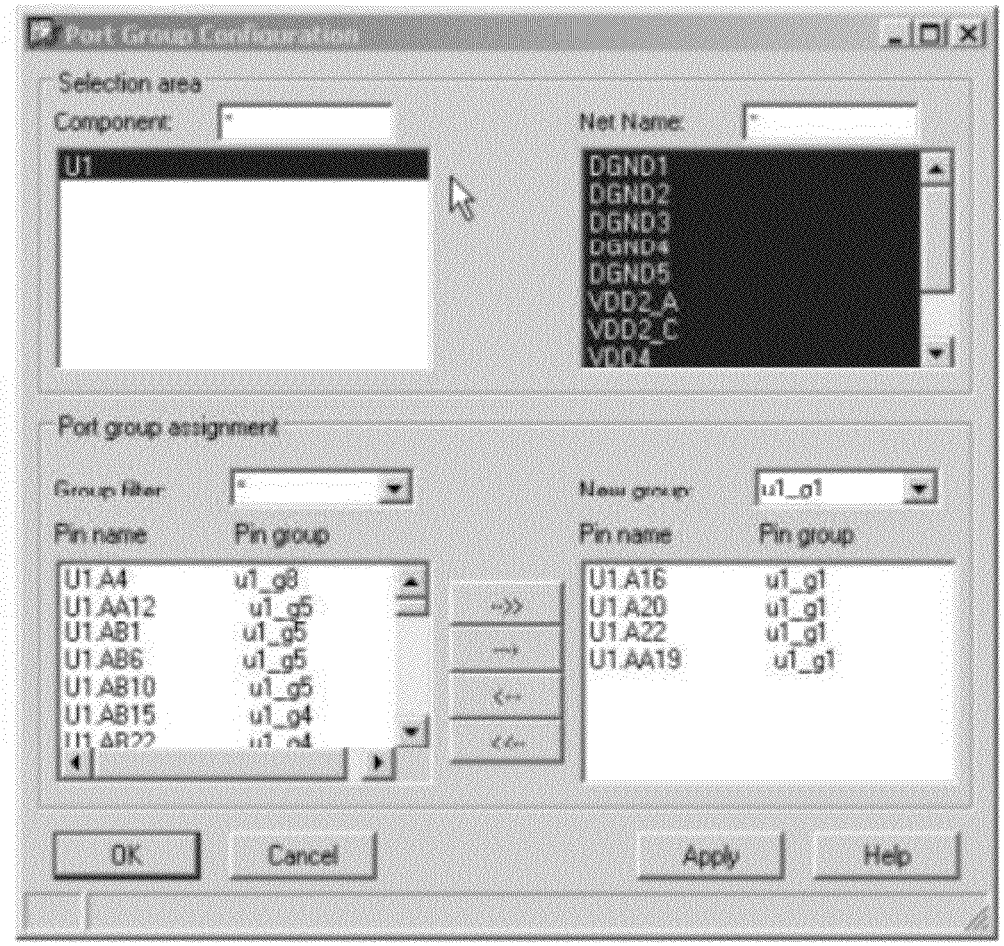
FIG. 29 is a diagram depicting a screenshot consistent with an embodiment of the power delivery analysis process of the present disclosure.

Referring now to FIG. 29, an exemplary embodiment depicting a user interface 2900 of the present disclosure is provided. User interface 2900 illustrates one embodiment that may be used in accordance with the power delivery network analysis process of the present disclosure. As shown in FIG. 29, user interface 2900 depicts the return path configuration, which may be displayed upon the activation of port group tab 2612 from FIG. 26. Additional and/or alternative options are also within the scope of the present disclosure.

Figure 30:
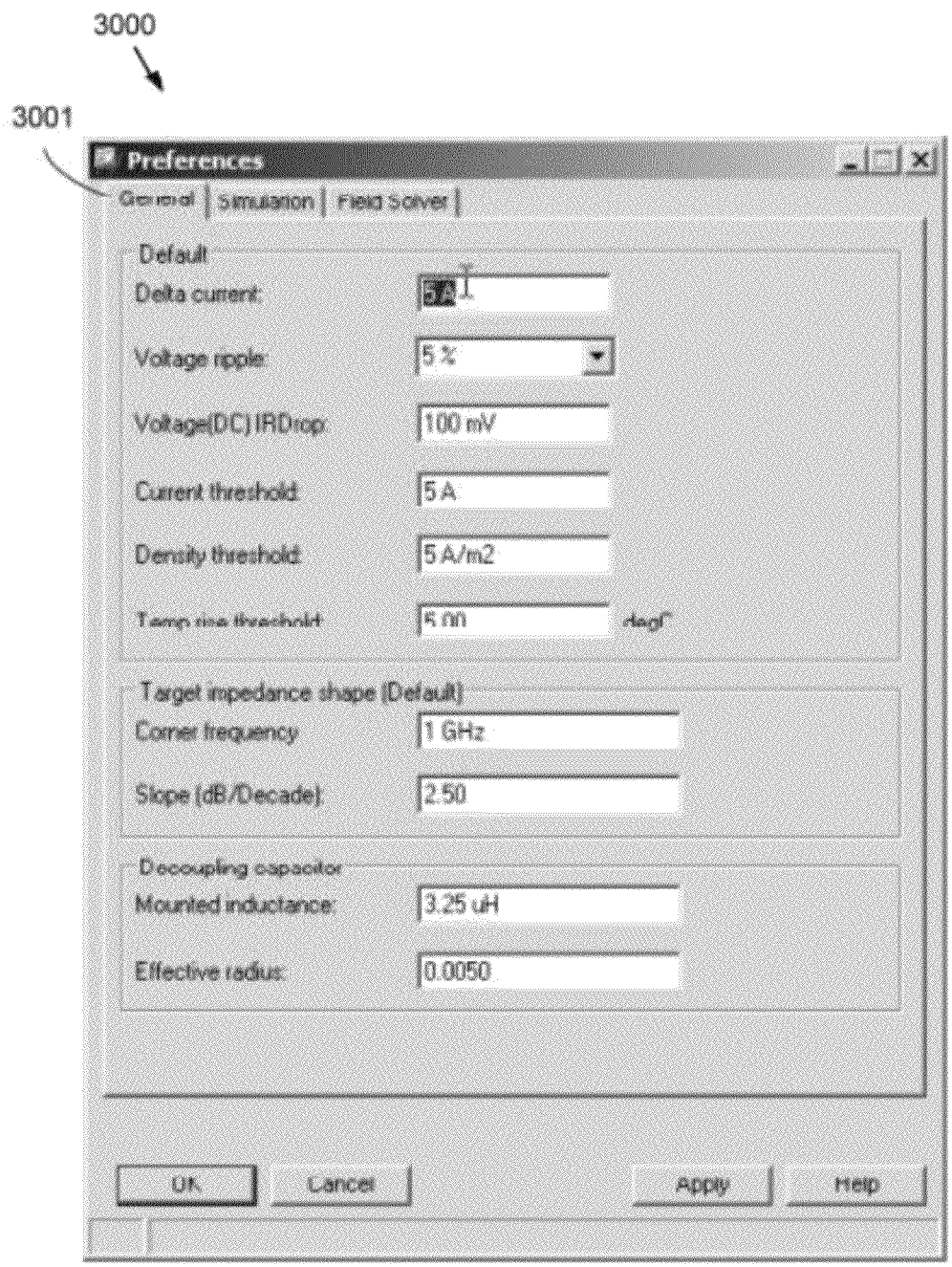
FIG. 30 is a diagram depicting a screenshot consistent with an embodiment of the power delivery analysis process of the present disclosure.

Referring now to FIG. 30, an exemplary embodiment depicting a user interface 3000 of the present disclosure is provided. User interface 3000 illustrates one embodiment that may be used in accordance with the power delivery network analysis process of the present disclosure. As shown in FIG. 30, user interface 3000 depicts the display upon activation of the "general" tab 3001 of the "preferences" display. UI 3000 may include a number of user-editable fields, some of which may include, but are not limited to, delta current, voltage ripple, voltage (DC) IRDrop, current threshold, density threshold, temperature rise threshold, target impedance shape(default): corner frequency and slope (dB/decade), decoupling capacitor: mounted inductance and effective radius. Additional and/or alternative options are also within the scope of the present disclosure.

Figure 31:
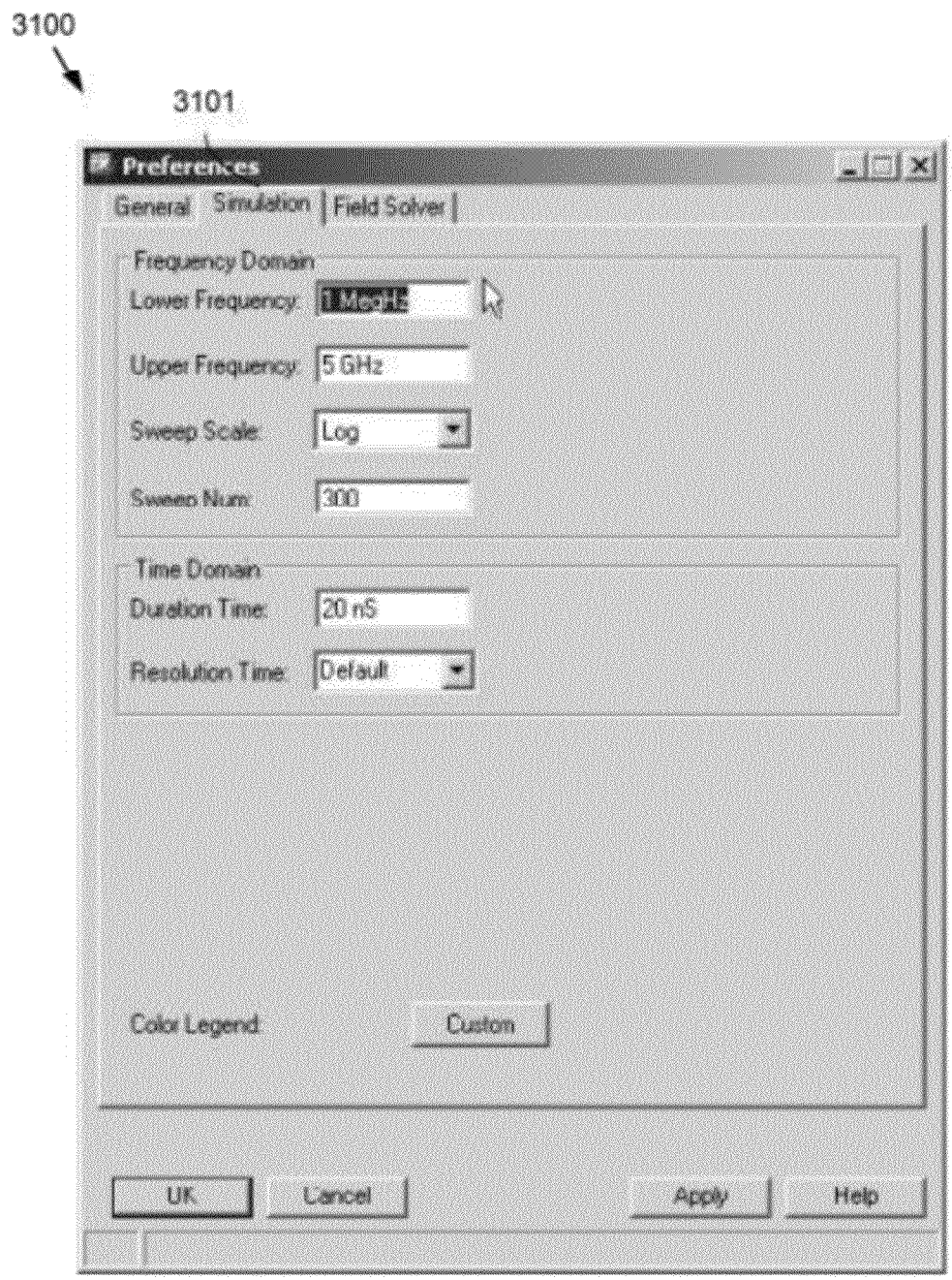
FIG. 31 is a diagram depicting a screenshot consistent with an embodiment of the power delivery analysis process of the present disclosure.

Referring now to FIG. 31, an exemplary embodiment depicting a user interface 3100 of the present disclosure is provided. User interface 3100 illustrates one embodiment that may be used in accordance with the power delivery network analysis process of the present disclosure. As shown in FIG. 31, user interface 3100 depicts the display upon activation of the "simulation" tab 3101 of the "preferences" display. UI 3100 may include a number of user-editable fields, some of which may include, but are not limited to, lower frequency, upper frequency, sweep scale, and sweep number in the frequency domain and duration time and resolution time in the time domain. Additional and/or alternative options are also within the scope of the present disclosure.

Figure 32:
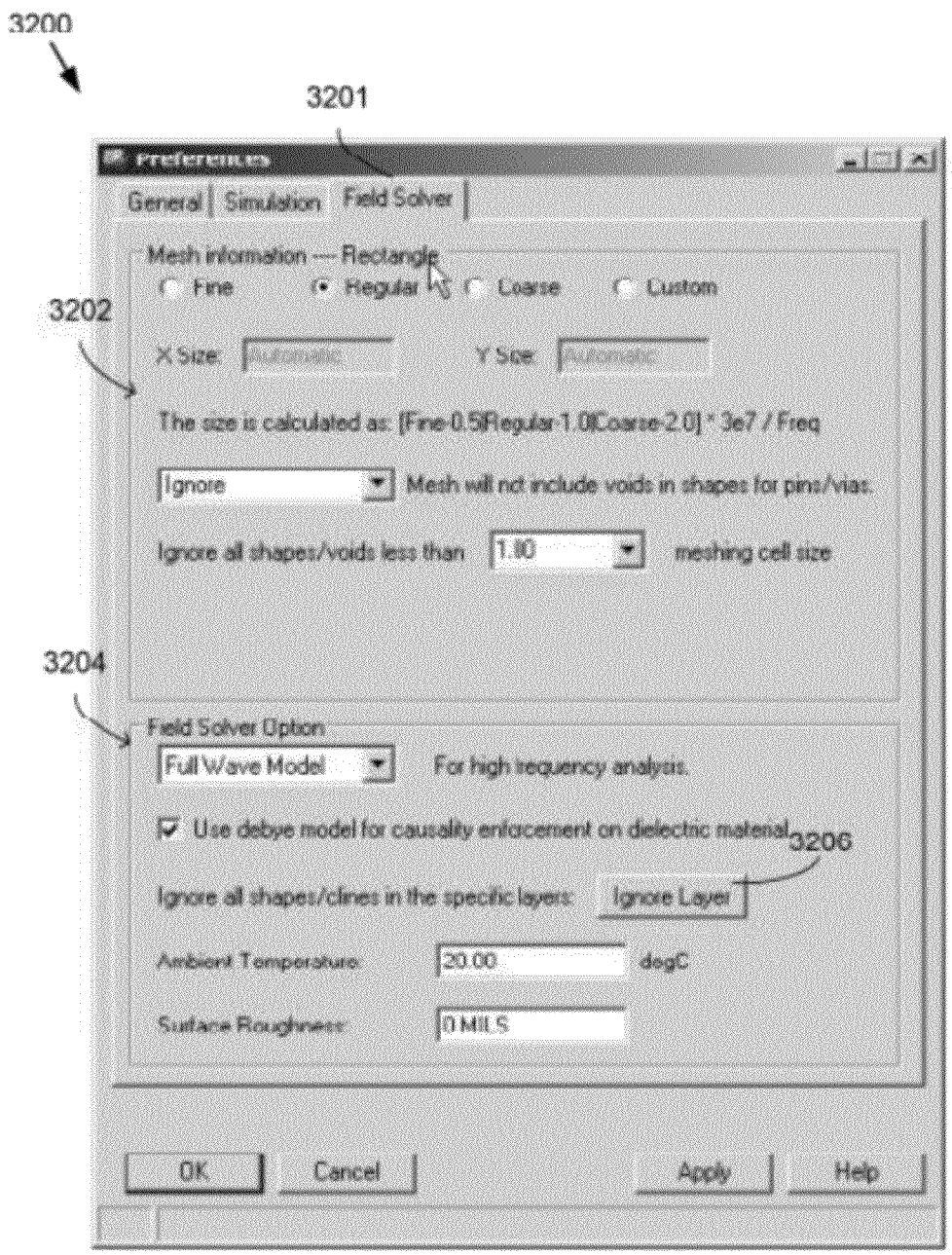
FIG. 32 is a diagram depicting a screenshot consistent with an embodiment of the power delivery analysis process of the present disclosure.

Referring now to FIG. 32, an exemplary embodiment depicting a user interface 3200 of the present disclosure is provided. User interface 3200 illustrates one embodiment that may be used in accordance with the power delivery network analysis process of the present disclosure. As shown in FIG. 32, user interface 3200 depicts the display upon activation of the "field solver" tab 3201 of the "preferences" display. UI 3200 may include a number of user-editable fields, some of which may include, but are not limited to, mesh information 3202 and field solver information 3204. UI 3200 may allow the designer the option to take into account voids in shapes for pins/vias when calculating mesh information 3202 as well as providing fine, regular, coarse and custom options. For field solver 3204 a full wave model option may be provided as well as an editable ambient temperature and surface roughness fields. Additional and/or alternative options are also within the scope of the present disclosure.

Figure 33:
FIG. 33 is a diagram depicting a screenshot consistent with an embodiment of the power delivery analysis process of the present disclosure.

Referring now to FIG. 33, an exemplary embodiment depicting a user interface 3300 of the present disclosure is provided. User interface 3300 illustrates one embodiment that may be used in accordance with the power delivery network analysis process of the present disclosure. As shown in FIG. 33, user interface 3300 depicts the display upon activation of the "ignore layer" tab 3206 of the "field solver" display 3201. UI 3300 may provide the designer with the option of selecting which layers to be ignored during simulation. Once a given layer is selected all shapes and paths in the selected layer may be ignored in the simulation. As shown in FIG. 33, other options such as the layer name and type may also be provided. Additional and/or alternative options are also within the scope of the present disclosure.

Figure 34:
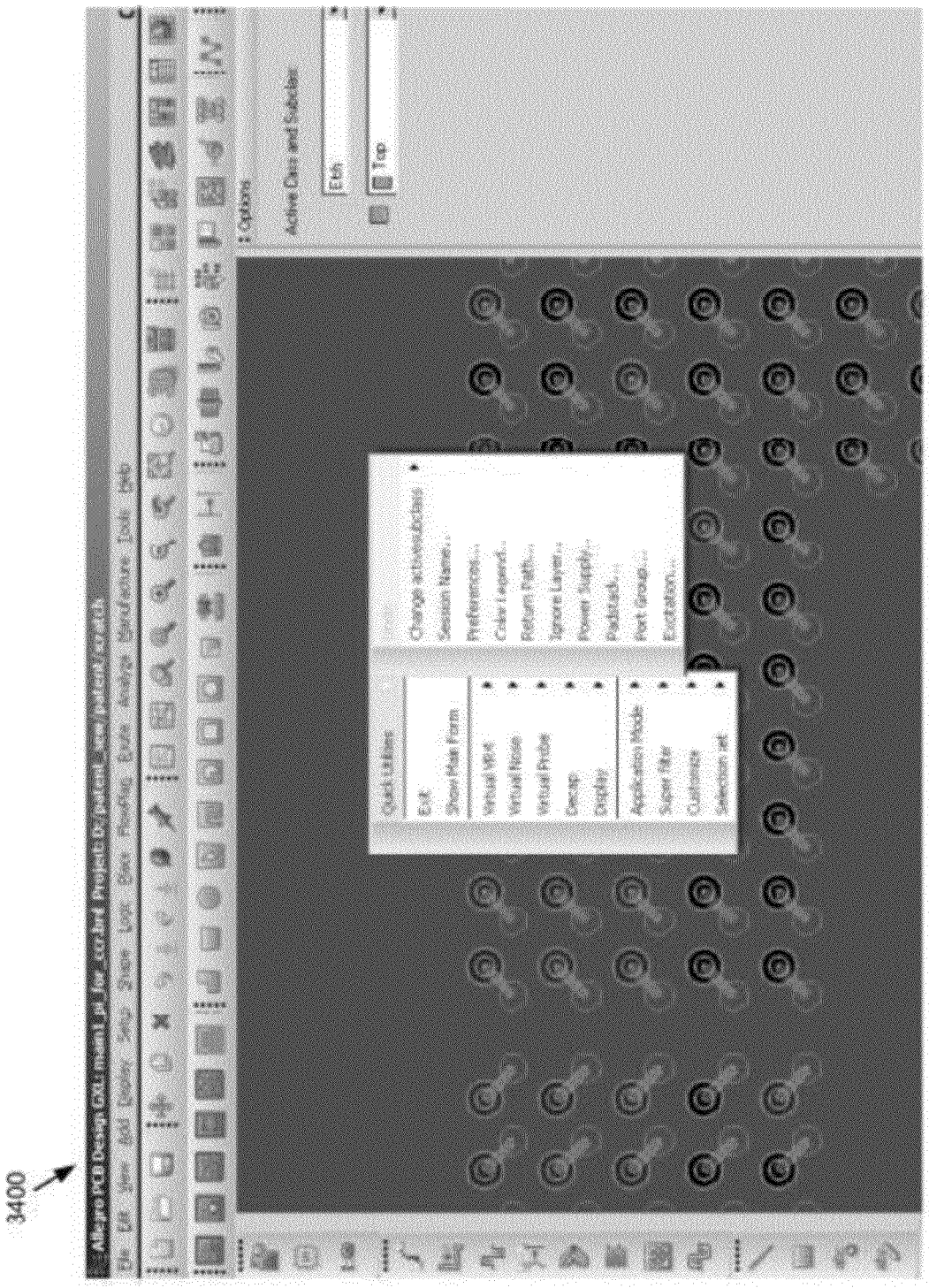
FIG. 34 is a diagram depicting a screenshot consistent with an embodiment of the power delivery analysis process of the present disclosure.

Referring now to FIG. 34, an exemplary embodiment depicting a user interface 3400 of the present disclosure is provided. User interface 3400 illustrates one embodiment that may be used in accordance with the power delivery network analysis process of the present disclosure. As shown in FIG. 34, user interface 3400 depicts the options available to a designer upon activation (e.g. right-click of mouse button, etc.). Selection of the individual options provided in FIG. 34 may result in the generation of one or more of the user interfaces described herein. Additional and/or alternative options are also within the scope of the present disclosure.

Figure 35:
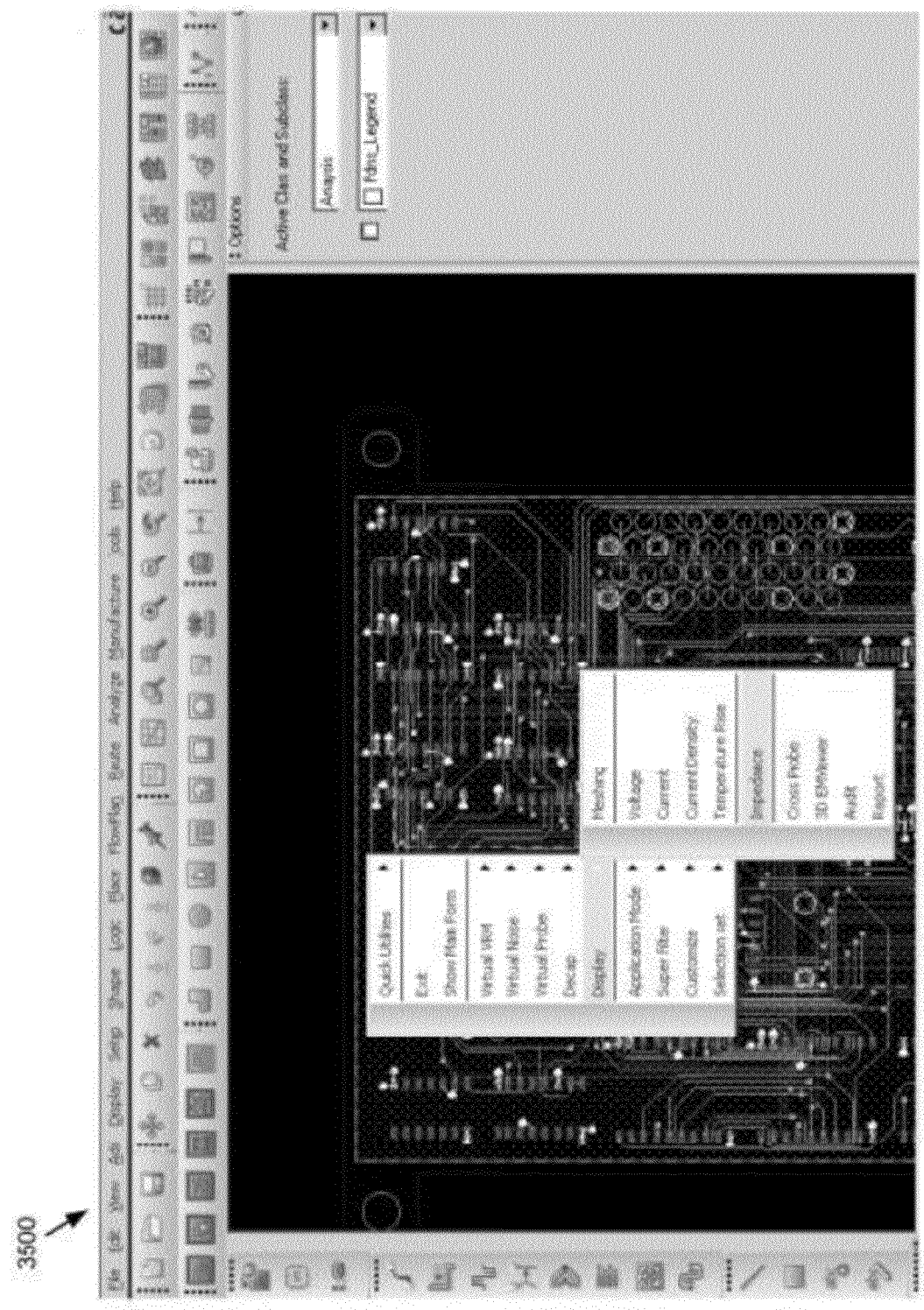
FIG. 35 is a diagram depicting a screenshot consistent with an embodiment of the power delivery analysis process of the present disclosure.

Referring now to FIG. 35, an exemplary embodiment depicting a user interface 3500 of the present disclosure is provided. User interface 3500 illustrates one embodiment that may be used in accordance with the power delivery network analysis process of the present disclosure. As shown in FIG. 35, user interface 3500 depicts the options available to a designer upon activation (e.g. right-click of mouse button, etc.). Selection of the individual options provided in FIG. 35 may result in the generation of one or more of the user interfaces described herein. Additional and/or alternative options are also within the scope of the present disclosure.

Figure 36:
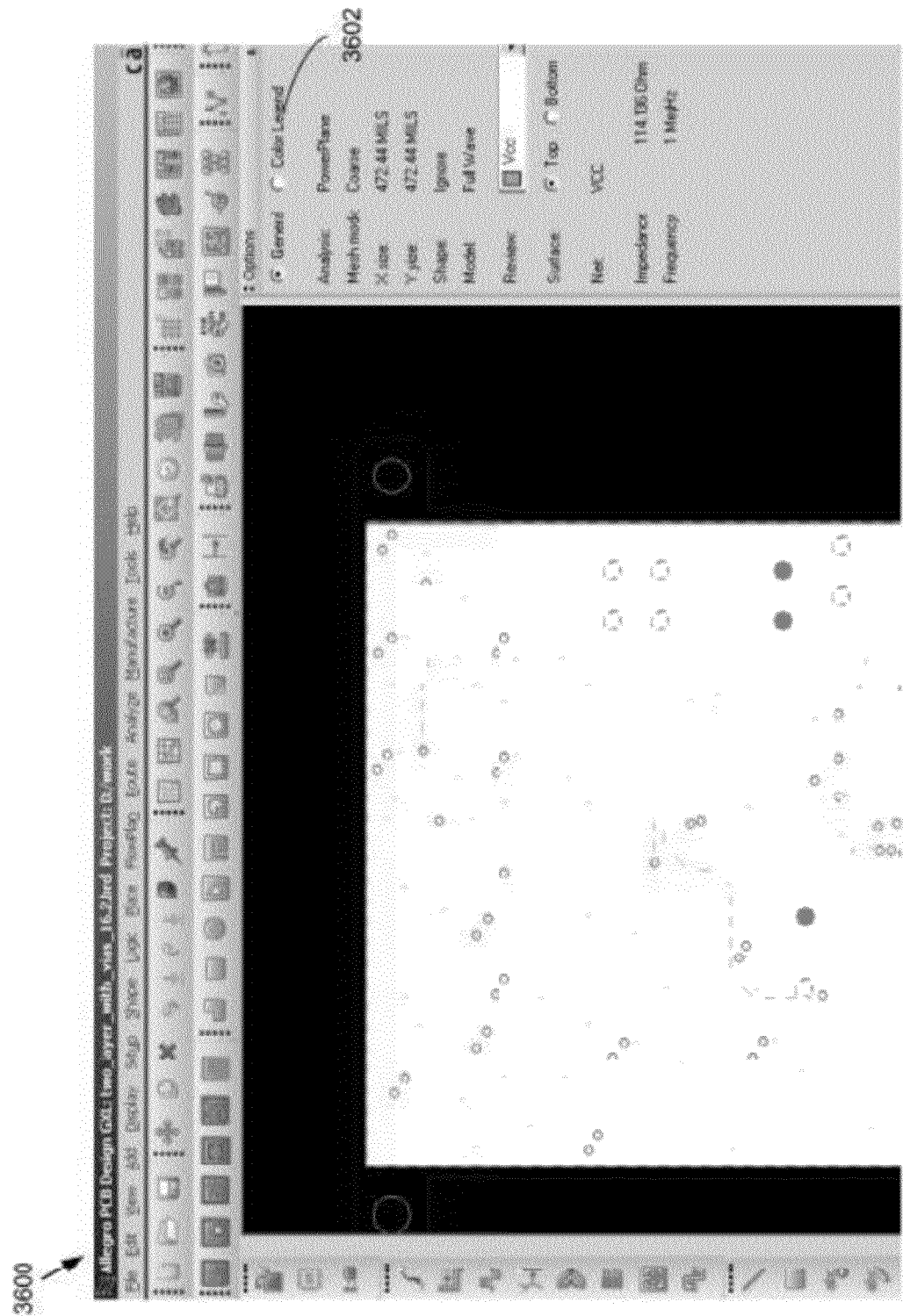
FIG. 36 is a diagram depicting a screenshot consistent with an embodiment of the power delivery analysis process of the present disclosure.

Referring now to FIG. 36, an exemplary embodiment depicting a user interface 3600 of the present disclosure is provided. User interface 3600 illustrates one embodiment that may be used in accordance with the power delivery network analysis process of the present disclosure. As shown in FIG. 36, user interface 3600 depicts the display after the impedance option has been selected. More specifically, UI 3600 shows the impedance at the top and bottom surface on one power shape. Additional and/or alternative options are also within the scope of the present disclosure.

Figure 37:
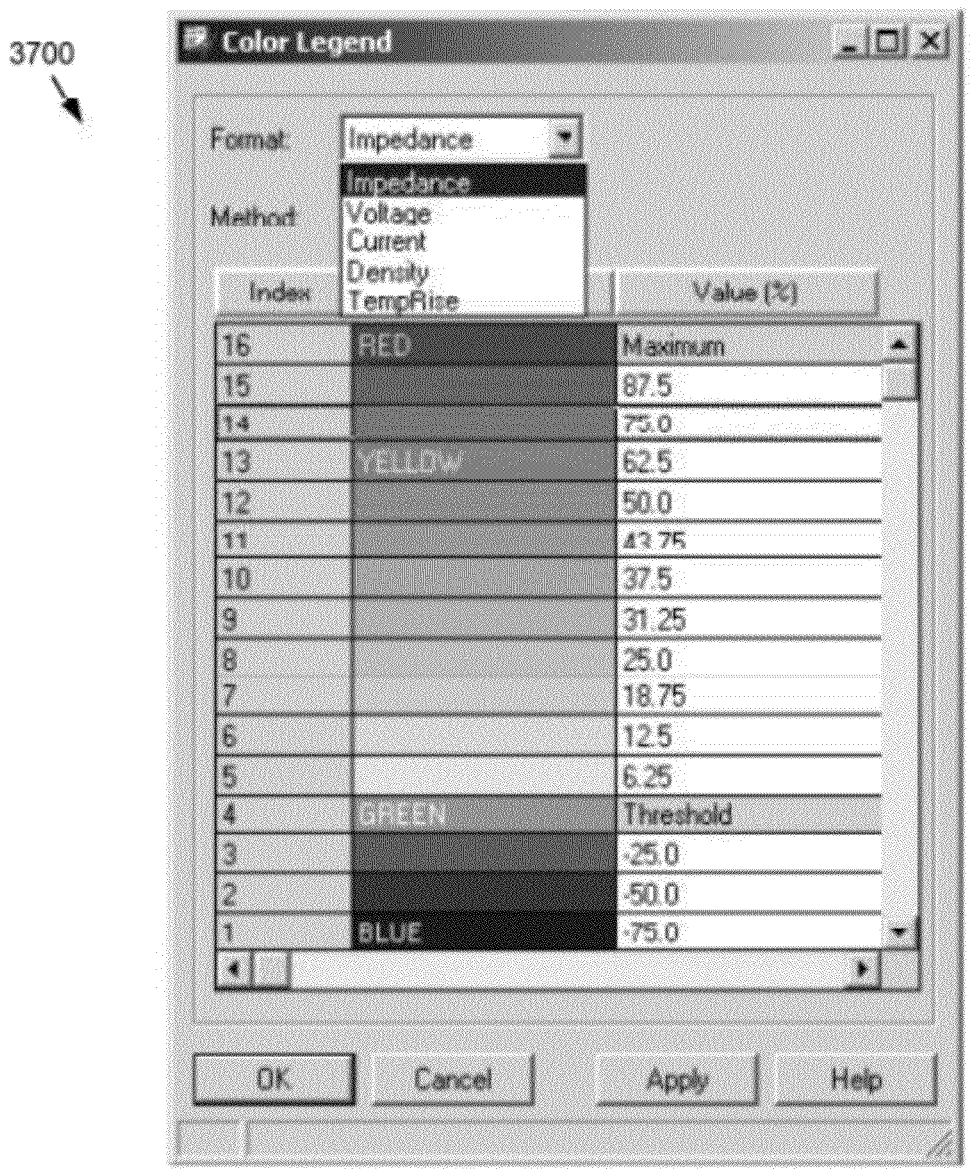
FIG. 37 is a diagram depicting a screenshot consistent with an embodiment of the power delivery analysis process of the present disclosure.

Referring now to FIG. 37, an exemplary embodiment depicting a user interface 3700 of the present disclosure is provided. User interface 3700 illustrates one embodiment that may be used in accordance with the power delivery network analysis process of the present disclosure. As shown in FIG. 37, user interface 3700 depicts the display after color legend option 3602 of FIG. 36 has been selected. As shown in FIG. 37, the designer may select from impedance, voltage, current, density, and temperature rise formats. Specific numerical values may be assigned to individual colors in the color legend. Additional and/or alternative options are also within the scope of the present disclosure.

Figure 38:
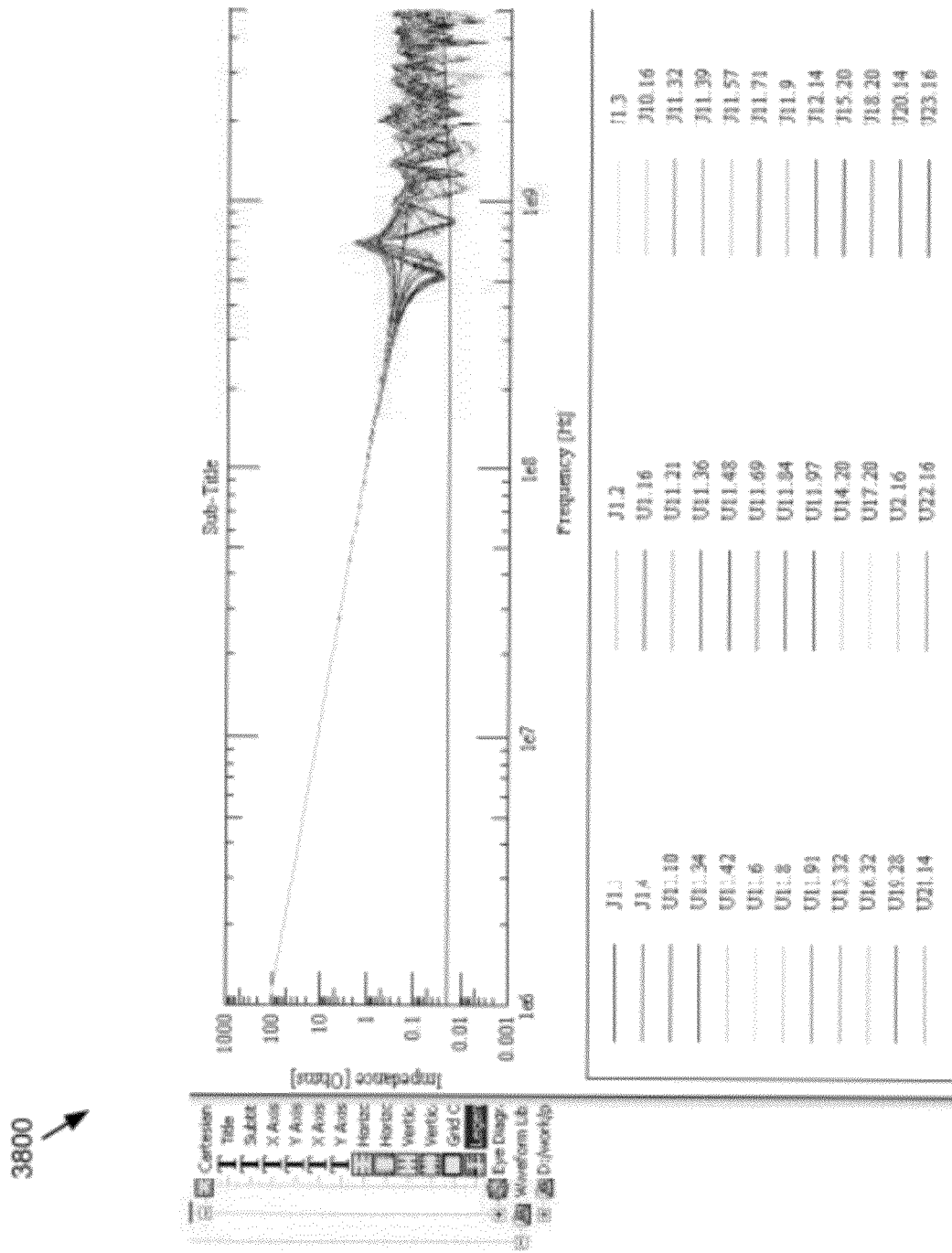
FIG. 38 is a diagram depicting a results display consistent with an embodiment of the power delivery analysis process of the present disclosure.

Referring now to FIG. 38, an exemplary embodiment depicting a result set 3800 of the present disclosure is provided. Result set 3800 illustrates an impedance curve shown for each component pin of the simulation. Result set 3800 may be generated based upon, at least in part, the information provided in user interface 3700 of FIG. 37. Numerous additional results may be graphically displayed upon the selection of other options from UI 3700.

Referring now to FIG. 39, an exemplary embodiment of the present disclosure depicting a chip-package-board configuration 3900 is provided. The configuration provided in FIG. 39 depicts package 3902, PCB (daughter-card) 3904, and PCB (mother-board) 3906. Along with the PDN model at the board level, the package and chip power model and other linked board PDN models may be connected for system power co-design flow using one or more mapping files. As discussed previously with reference to FIG. 4, chip power model 404 (e.g., current profile and passive circuit netlist) from one or more EDA applications, package power model 402 from one or more EDA applications, the other board models (e.g., mother board/daughter card) may also be analyzed together through co-design flow as shown in FIG. 39. PDN Analysis 410 may allow for IRDrop analysis and PI analysis to obtain the impedance and voltage drop results at DIE side in the system. According to the analyzed results, the power performance may be improved by modifying stackup/IC component floor planning 408 and optimizing the decoupling capacitors. By co-simulation with the whole extracted power system models, the timing analysis may be accurately simulated (e.g., Simultaneous Switching Noise (SSN), Simultaneous Switching Output (SSO), Electro Magnetic Compatibility (EMC) and Electromagnetic Interference (EMI)).

Figure 40:
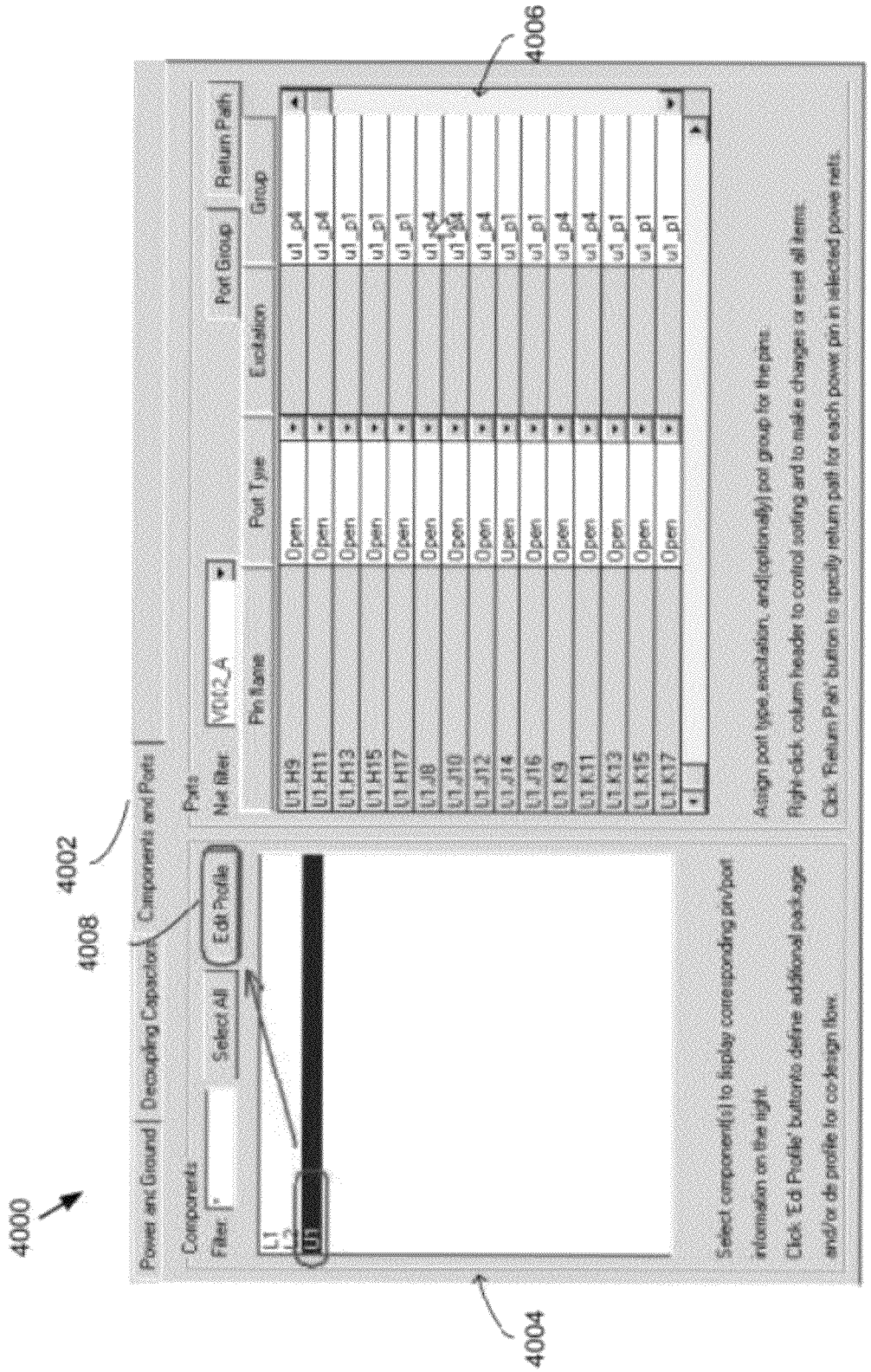
FIG. 40 is a diagram depicting a screenshot consistent with an embodiment of the power delivery analysis process of the present disclosure.

Referring now to FIG. 40, an exemplary embodiment depicting a user interface 4000 of the present disclosure is provided. User interface 4000 illustrates one embodiment that may be used in accordance with the power delivery network analysis process of the present disclosure. As shown in FIG. 40, user interface 4000 may allow a designer to configure the port information (e.g., port type, excitation, and group) for selected components using "components and ports" tab 4002. UI 4000 may include a component window 4004, which may allow the designer to select the component in order to display the corresponding pin/port information in display panel 4006. UI 4000 may include "edit profile" tab 4008, which may allow the designer to define an additional package and/or die profile for co-design flow. Additional and/or alternative options are also within the scope of the present disclosure.

Figure 41:
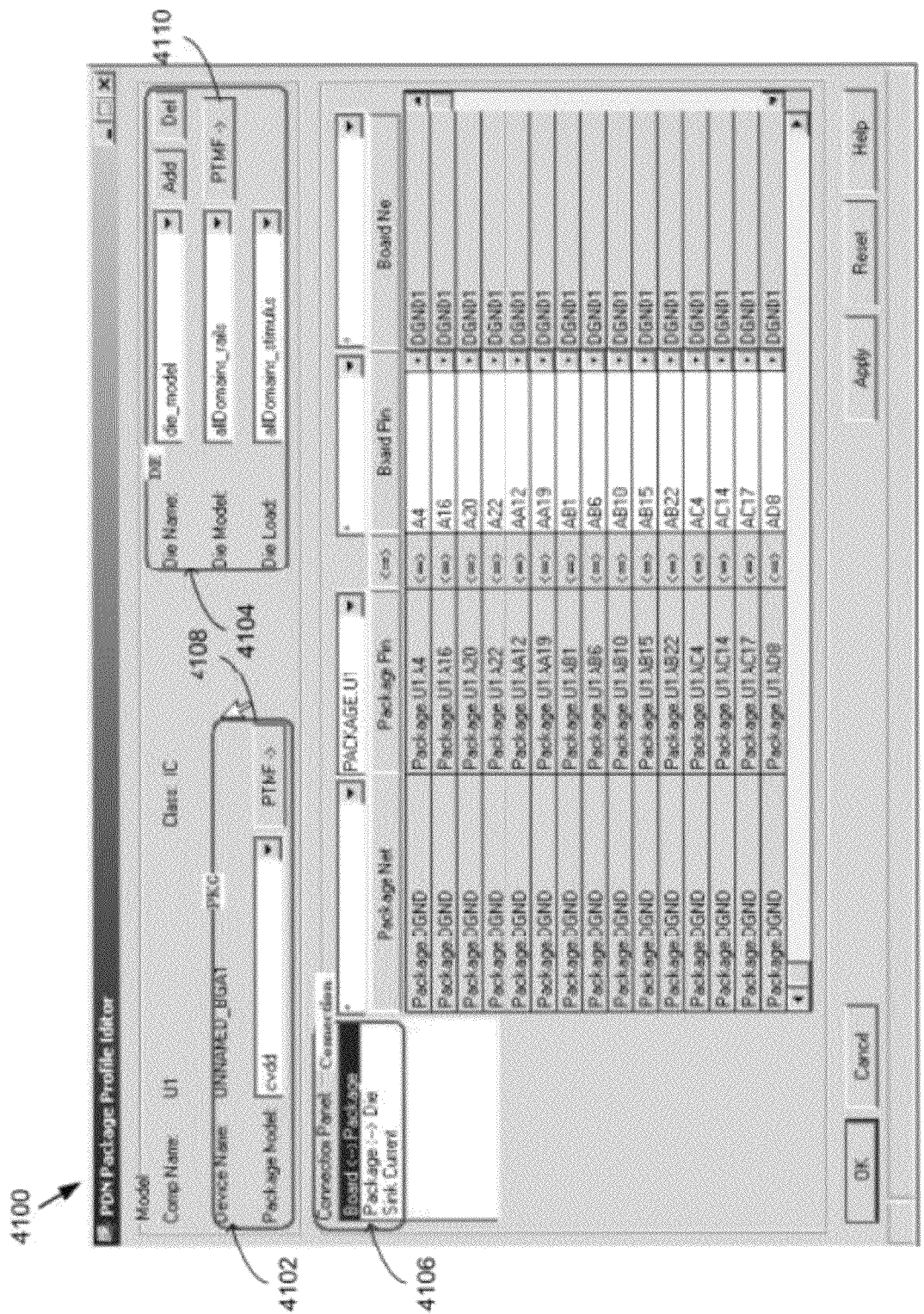
FIG. 41 is a diagram depicting a screenshot consistent with an embodiment of the power delivery analysis process of the present disclosure.

Referring now to FIG. 41, an exemplary embodiment depicting a user interface 4100 of the present disclosure is provided. User interface 4100 illustrates one embodiment that may be used in accordance with the power delivery network analysis process of the present disclosure. As shown in FIG. 41, user interface 4100 shows one embodiment of a possible display generated upon activation of edit profile tab 4008 of FIG. 40. As shown in FIG. 41, UI 4100 may include package model information 4102, die model information 4104, and connection panel information 4106. The package model information 4102 may include, but is not limited to, device name, package model identification and a PTMF tab 4108. Die model information 4104 may include but is not limited to, die name, die model, die load, and a PTMF tab 4110. Connection panel 4106 may include, at least, a board to package connection option, a package to die connection option, and a sink current option. Additional and/or alternative options are also within the scope of the present disclosure.

Figure 42:
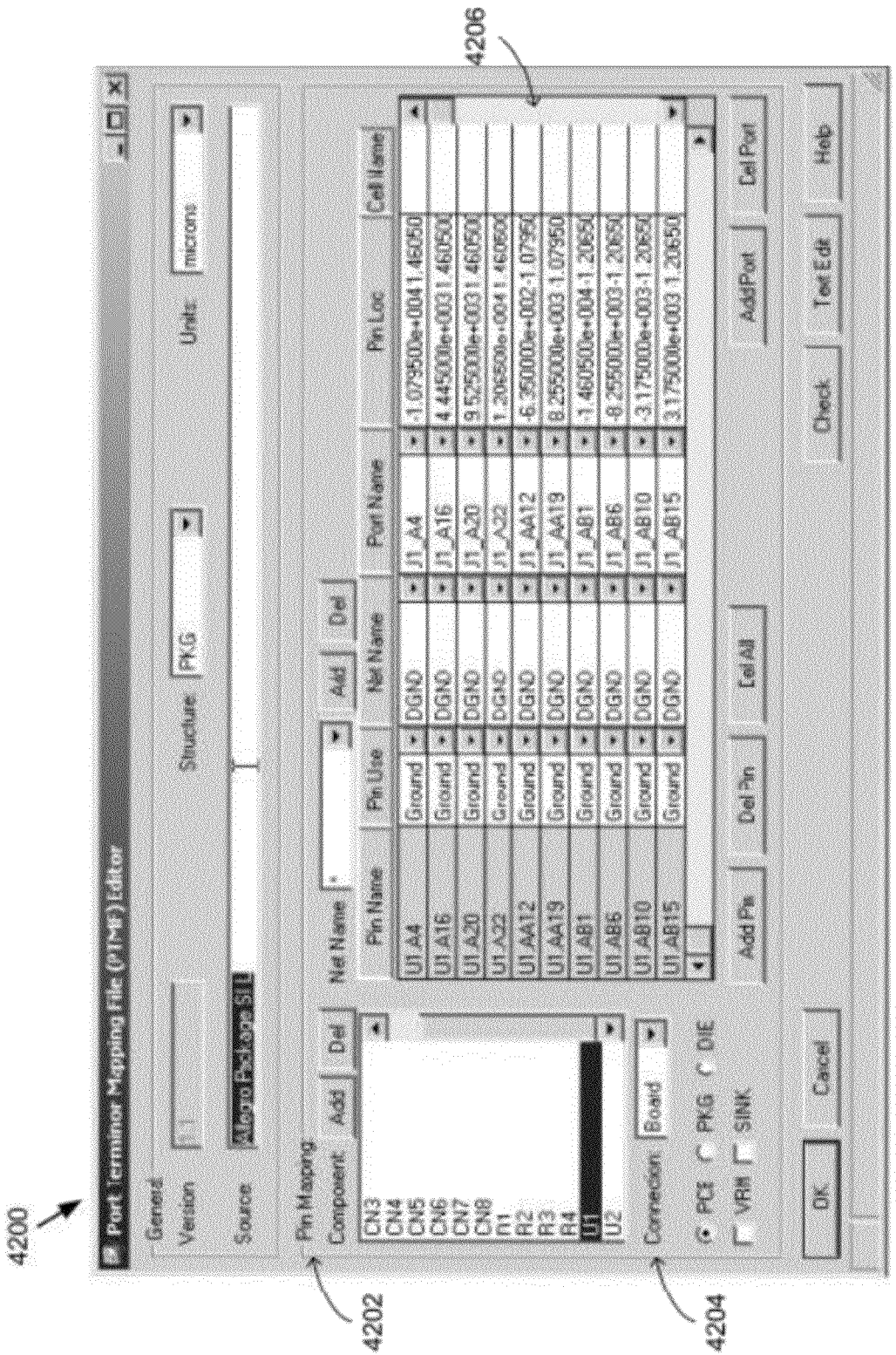
FIG. 42 is a diagram depicting a screenshot consistent with an embodiment of the power delivery analysis process of the present disclosure.

Referring now to FIG. 42, an exemplary embodiment depicting a user interface 4200 of the present disclosure is provided. User interface 4200 illustrates one embodiment that may be used in accordance with the power delivery network analysis process of the present disclosure. As shown in FIG. 42, user interface 4200 depicts a display generated upon activation of package PTMF tab 4108 shown in FIG. 41. UI 4200 includes pin mapping interface 4202, which may allow for the addition and/or deletion of certain components of the design. UI 4200 may further include a selectable connection option 4204, in this particular example, the "Board" option has been selected. As shown in FIG. 42, once a particular component has been selected, e.g. "U1", the corresponding pins are provided in pin display section 4206. Pin display section 4206 may include a number of fields, including but not limited to, pin name, pin use, net name, port name, pin location, and cell name. UI 4200 may further include the option to add and/or subtract individual pins and ports.

Figure 43:
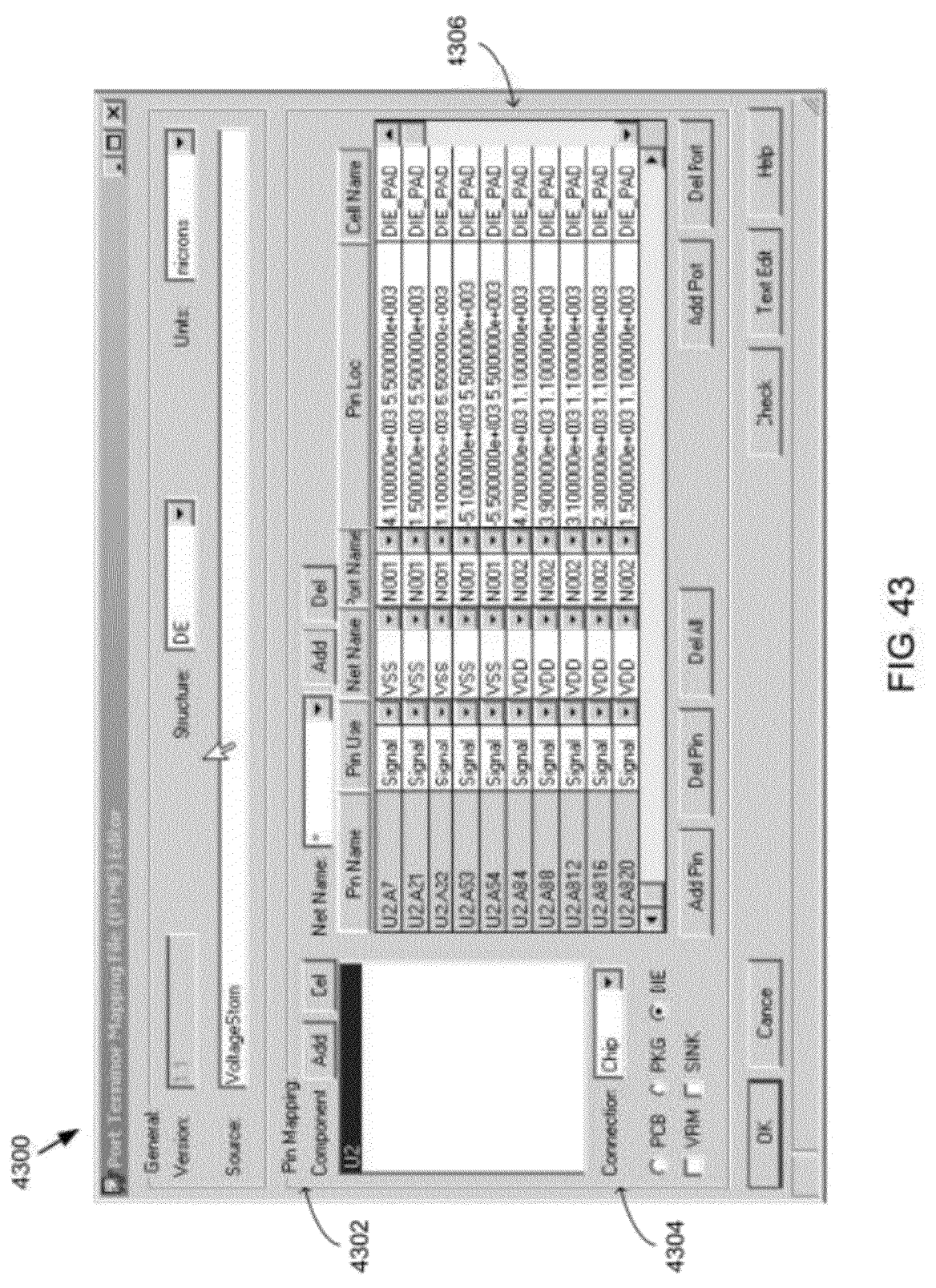

Referring now to FIG. 43, an exemplary embodiment depicting a user interface 4300 of the present disclosure is provided. User interface 4300 illustrates one embodiment that may be used in accordance with the power delivery network analysis process of the present disclosure. As shown in FIG. 43, user interface 4300 depicts a display generated upon activation of package PTMF tab 4110 shown in FIG. 41. UI 4300 includes pin mapping interface 4302, which may allow for the addition and/or deletion of certain components of the design. UI 4300 may further include a selectable connection option 4304, in this particular example, the "Chip" option has been selected. As shown in FIG. 43, once a particular component has been selected, e.g. "U2", the corresponding pins are provided in pin display section 4306. Pin display section 4306 may include a number of fields such as those described above with reference to FIG. 42. Similarly, UI 4300 may also include the option to add and/or subtract individual pins and ports.

In some embodiments, a port or pin terminal mapping file (PTMF) refers to one type of mapping file that may be used in accordance with the present disclosure. An example of a portion of a PTMF is provided below.

Figure 44:
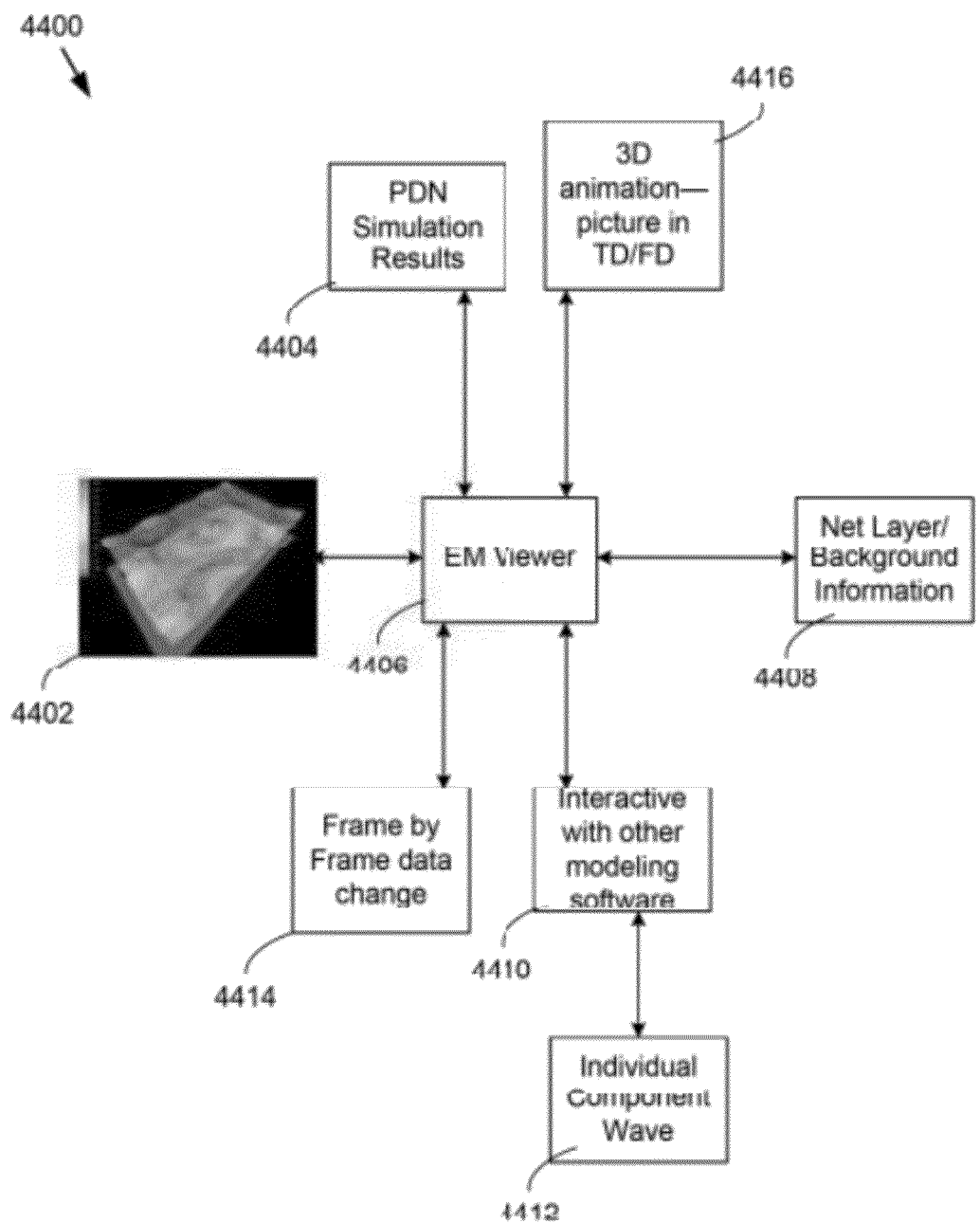
FIG. 44 is a diagram depicting a system consistent with an embodiment of the power delivery analysis process of the present disclosure.

[Connection] board U1 151
[Connection Type] PCB
[Power Nets]
U16 U1_U16 CVDD 4.445000e+003 −5.715000e+003
U14 U1_U14 CVDD 1.905000e+003 −5.715000e+003
U12 U1_U12 CVDD −6.350000e+002 −5.715000e+003
U10 U1_U10 CVDD −3.175000e+003 −5.715000e+003
[Connection] chip U2 298
[Connection Type] DIE
[Power Nets]
V48 U2_V48 CVDD −4.100000e+003 1.900000e+003 DIE_PAD
V44 U2_V44 CVDD −3.300000e+003 1.900000e+003 DIE_PAD
V40 U2_V40 CVDD −2.500000e+003 1.900000e+003 DIE_PAD Referring now to FIG. 44, an exemplary embodiment depicting a system diagram 4400 of the present disclosure is provided. Diagram 4400 illustrates one embodiment that may be used in accordance with the power delivery network analysis process of the present disclosure. As shown in FIG. 44, embodiments described herein may allow for the display of one or more results of the power delivery network (PDN) analysis. In some embodiments, a three dimensional image 4402 may be displayed depicting one or more of the results 4404 of the PDN analysis using electromagnetic viewer 4406. In some embodiments, EM viewer 4406 may receive net layer and/or background information 4408 and may be interactive with numerous other types of software, including other types of EDA software 4410.

Figure 45:
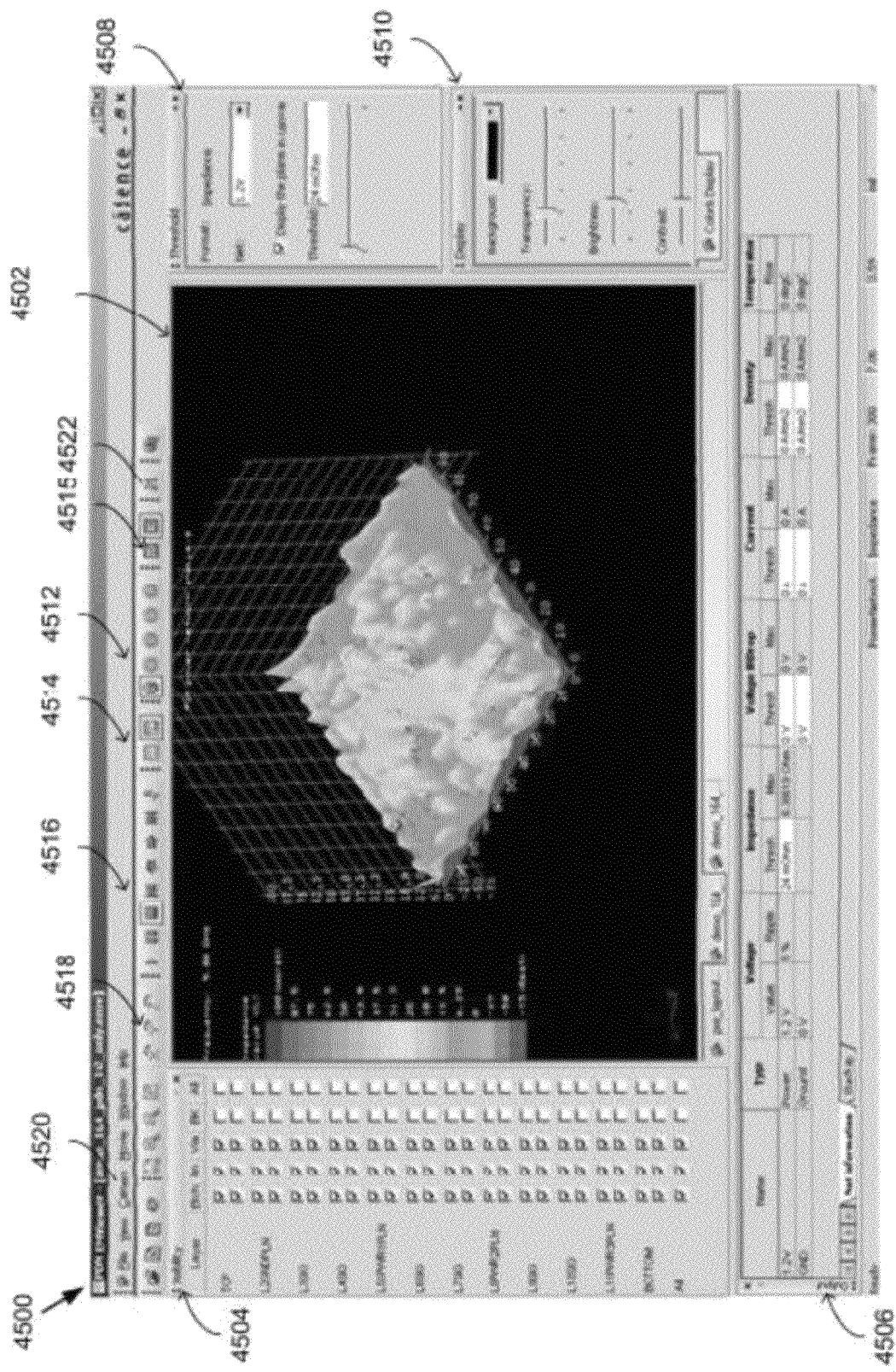
FIG. 45 is a diagram depicting a screenshot consistent with an embodiment of the power delivery analysis process of the present disclosure.

Referring now to FIG. 45, an exemplary embodiment of a user interface 4500 consistent with the present disclosure is shown. UI 4500 may be configured to display one or more three dimensional images based upon, at least in part, the results from the power delivery network analysis process described herein. UI 4500 may include three dimensional display panel 4502, which may be configured to display the actual image. UI 4500 may further include a number of additional menus, some of which may include, but are not limited to, visibility menu 4504, output menu 4506, threshold menu, 4508, and display menu 4510.

In some embodiments, UI 4500 may be configured to generate a three dimensional animation in either the time domain and/or the frequency domain. UI 4500 may include data format indicator 4512, which may allow a designer to choose between voltage, current, density and temperature in the time domain or impedance in the frequency domain. Power delivery network analysis process may use this selection in order to generate an image for display in display panel 4502. UI 4500 may further include display pattern indicators 4514, which may allow a designer to select between a grid pattern and a fill pattern. UI 4500 may also include the option of selecting between two dimensional and three dimensional animation using 2D/3D selection tabs 4515. Additionally and/or alternatively, the designer may be provided with additional options, some of which may include but are not limited to playing, stopping, fast-forwarding, and rewinding the animation as depicted by control tabs 4516. In some embodiments, PDN analysis process may allow for the adjustment of the movie speed, e.g., via a user-editable field that may set the movie speed in frames/second. In some embodiments, PDN analysis process may allow for rotation of the displayed image using rotation tabs 4518. For example, the process may allow the designer to rotate the three dimensional results by either selecting the rotation tabs 4518 or alternatively by holding the "ctrl" key and utilizing a peripheral device such as a mouse.

In some embodiments, UI 4500 may include a camera option such as camera drop down menu 4520. Camera drop down menu 4520 may provide a designer with the option of directing the camera position at the top, bottom, front, back, left, and right positions. Additionally and/or alternatively, UI 4500 may provide zoom-out and zoom-in capabilities as well as the ability to move the image within display panel 4502.

In some embodiments, UI 4500 may include a worst case functionality such as worst case tab 4522. At any given location, the impedance may be changed according to the change of frequency points, the worst case may correspond to the largest impedance value at the whole frequency range. UI 4500 may be configured to generate this value upon activation of worst case tab 4522. For the time domain, the voltage, current, current density value may be changed according to the time, the worst case may correspond to the largest value over the threshold for all of the time step. It should be noted that the functionality described herein may be applied during either animation mode (three dimensional) or picture mode (two dimensional).

Referring now to FIG. 46, an embodiment of the present disclosure depicting output menu 4600 is provided. In this particular embodiment, output menu 4600 is shown having the net information displayed. This may be displayed upon selection of net information tab 4602. As shown in FIG. 46, some possible examples of net information may include but are not limited to voltage, impedance, IRDrop, current, density, and temperature. The net information display may allow a designer the option of changing the threshold value of each type of information in order to yield a more optimal value.

Referring now to FIG. 47, an embodiment of the present disclosure depicting output menu 4700 is provided. In this particular embodiment, output menu 4700 is shown having the stack-up information displayed. This may be displayed upon selection of stack-up tab 4702. As shown in FIG. 47, some possible examples of stack-up information may include but are not limited to layer name, type, material, thickness, conductivity, dielectric and loss. Some of the fields may include color-coded type displays, which may be set using the color legend in FIG. 49, described in further detail below. In some embodiments, the power delivery network analysis process of the present disclosure may allow a designer to import one or more background files as well.

Figure 48:
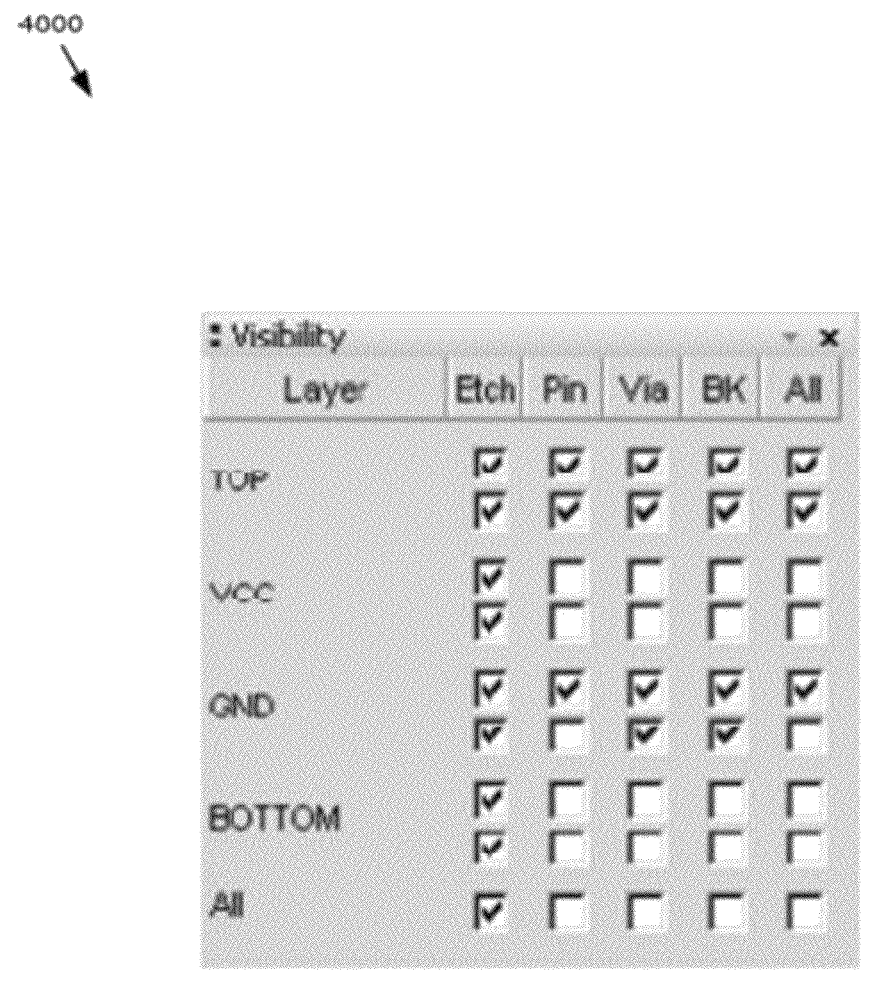

Referring now to FIG. 48, an embodiment of the present disclosure depicting visibility menu 4800 is provided. Visibility menu 4800 may include a display indicating some or all of the layers of the design. Visibility menu 4800 may allow the designer to show or hide layer information. For example, and as shown in FIG. 48, visibility menu may include etch, pin, via, background, and all options, which may be hidden or shown depending upon the designer's preference.

Figure 49:
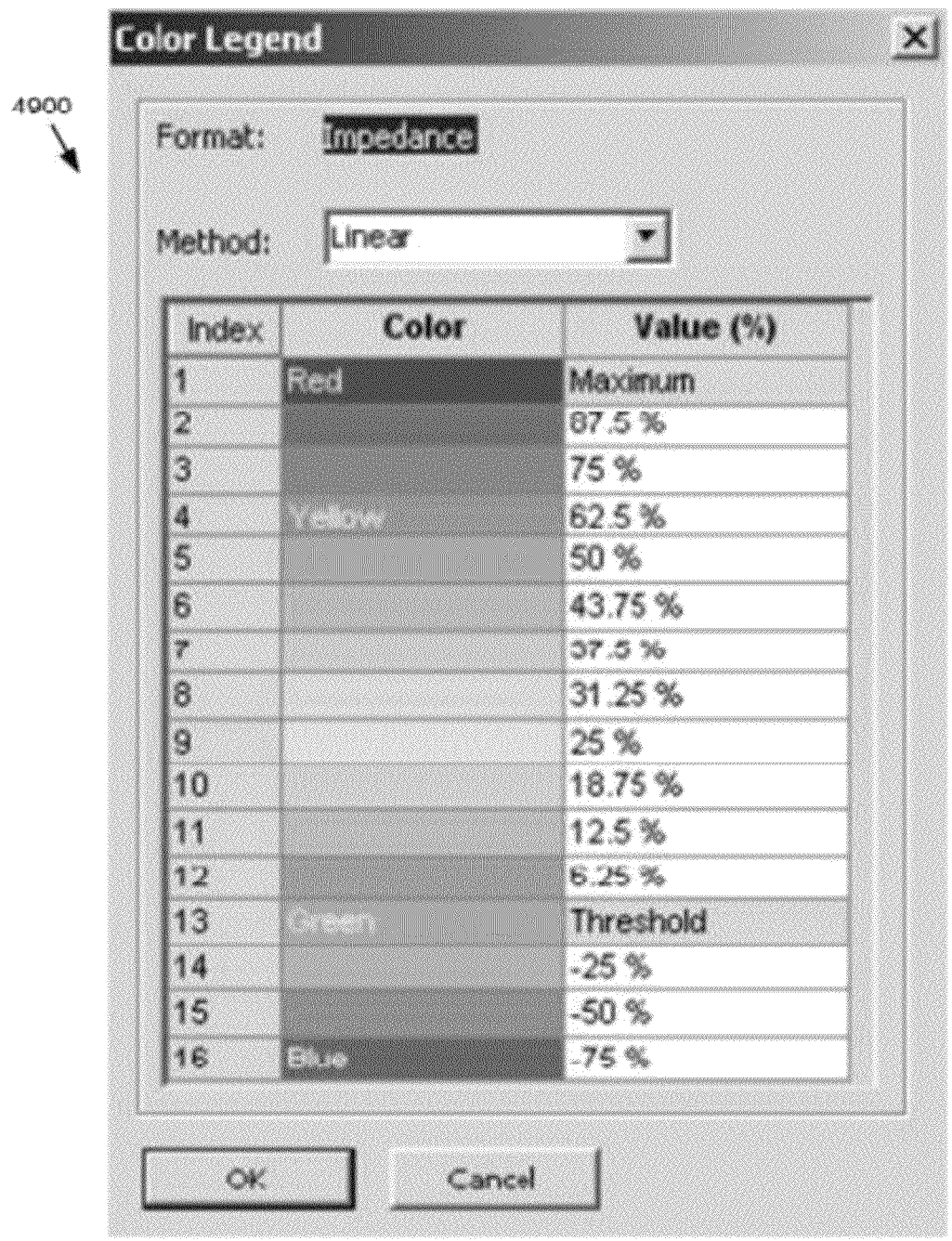
FIG. 49 is a diagram depicting a screenshot consistent with an embodiment of the power delivery analysis process of the present disclosure.

Referring now to FIG. 49, an embodiment of the present disclosure depicting color legend 4900 is provided. Color legend 4900 may allow a designer to assign one or more colors to a particular value as shown in FIG. 49. The format and method may be altered as necessary in order to perform a more accurate comparison with a target value.

Figure 50:
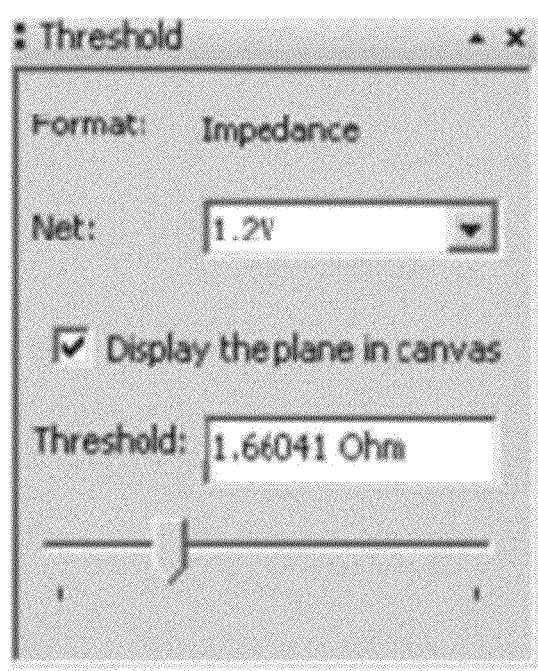
FIG. 50 is a diagram depicting a screenshot consistent with an embodiment of the power delivery analysis process of the present disclosure.

Referring now to FIG. 50, an embodiment of the present disclosure depicting threshold display 5000 is provided. Threshold display 5000 may include format, net, and threshold information. Threshold display 5000 may further include the option of displaying the plane in canvas(i.e., to show or hide the threshold plane in three-dimensional mode). Threshold display 5000 may allow a designer to alter the threshold value in order to change the position of the threshold plane.

Figure 51:
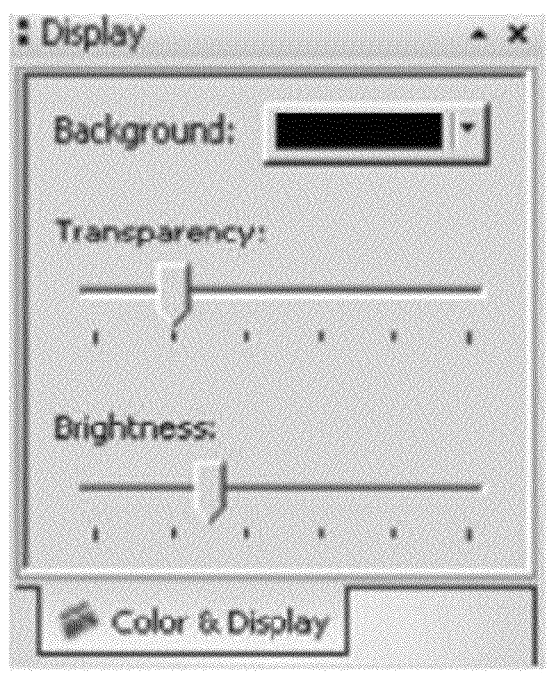
FIG. 51 is a diagram depicting a screenshot consistent with an embodiment of the power delivery analysis process of the present disclosure.

Referring now to FIG. 51, an embodiment of the present disclosure depicting display menu 5100 is provided. Display menu 5100 may include background, transparency and brightness options. Display menu 5100 may allow a designer to update workspace background color and the target object's transparency and/or brightness to obtain an desired display result.

In some embodiments, the three dimensional viewer described herein may allow for interoperability with a wide variety of EDA products. For example, the three dimensional viewer may permit the easy transfer of data from any or all of the products available from the assignee of the present disclosure. This data may be transferred directly from other EDA tools directly into the three dimensional viewer described herein.

Additionally and/or alternatively, in some embodiments, the three dimensional viewer may allow a designer to select one individual component wave by double-clicking (or otherwise activating) the object wave. As a result, the select component wave may be shown in a single window. The designer may then focus on the detailed information of the component wave without being disturbed by having other waves in the display window.

Figure 52:
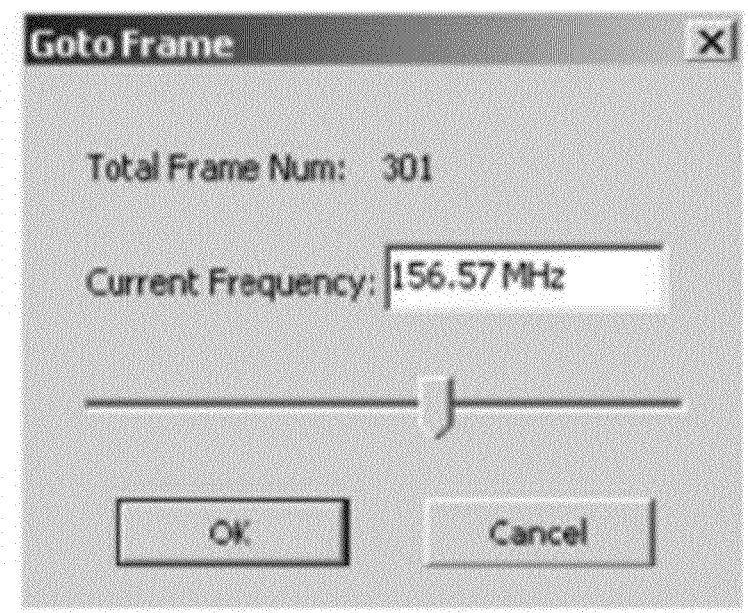
FIG. 52 is a diagram depicting a screenshot consistent with an embodiment of the power delivery analysis process of the present disclosure.

Referring now to FIG. 52, an embodiment of the present disclosure depicting frame menu 5200 is provided. Frame menu 5200, and/or control tabs 4516 shown in FIG. 45, may provide the designer with the option of viewing the data change in animation mode or picture mode. Additionally and/or alternatively, frame menu 5200 may allow the designer to locate a particular frame. In some embodiments, the images generated by three-dimensional viewer may be exported in either animation mode or picture mode.

Figure 53:
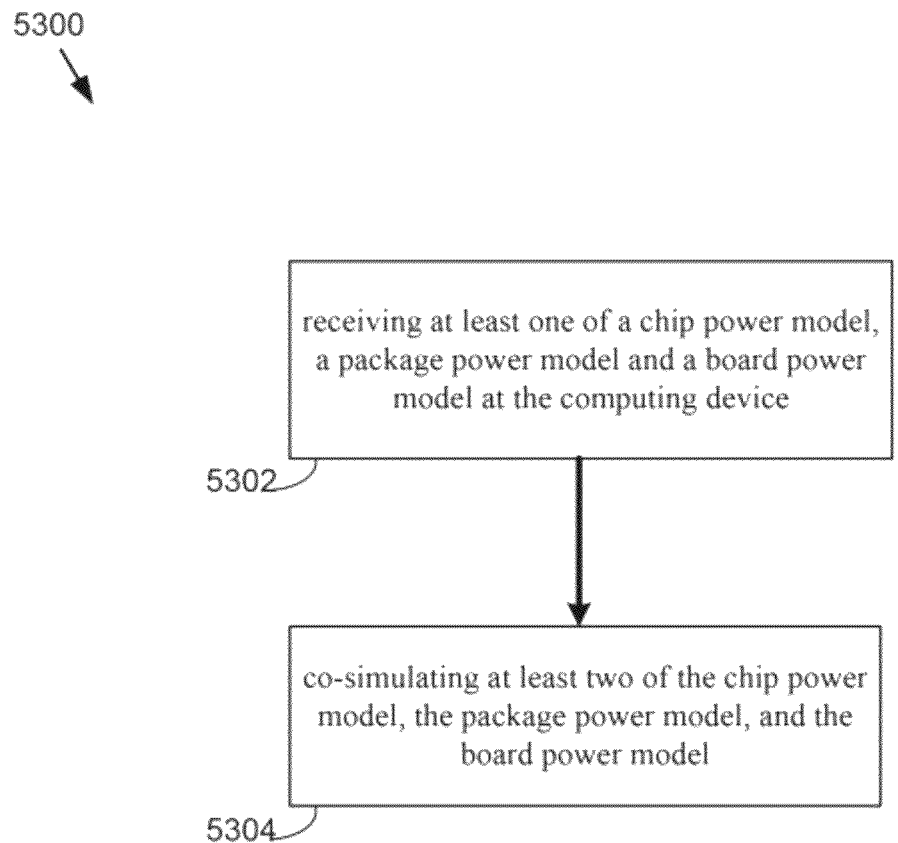
FIG. 53 is a flowchart depicting operations consistent with an embodiment of the power delivery analysis process of the present disclosure.

Referring now to FIG. 53, a flowchart 5300 is provided depicting operations consistent with the power delivery network analysis process of the present disclosure. PDN process may include receiving at least one of a chip power model, a package power model and a board power model at the computing device (5302) and co-simulating at least two of the chip power model, the package power model, and the board power model (5304). Numerous other operations are also within the scope of the present disclosure.

In some embodiments of the present disclosure a power delivery network analysis process is provided. Based upon the physical layout of specified power and ground nets, three dimensional adaptive spatial resolution of rectangular mesh nodes in simulating electric circuits is utilized to mesh the specified power and ground nets. This may be achieved while accounting for discontinuity structures, which may include but are not limited to the voids including antipads of power, ground and signal vias, cutouts, splits, etc.

In some embodiments, and according to the three dimensional adaptive mesh results, a power delivery network analysis process may include a full wave—method of moments field solver, which may be optimized to extract and model the via and meshed plane and plane discontinuities with high efficiency.

In some embodiments, in order to speed up the model extraction and PDN simulation, the scaled Y parameter model with length and width parameters may be used to improve efficiency for the plane, plane split and plane edge model having different dimensions. Moreover, the power delivery network analysis process may utilize the unique upper and lower plane surface nodes for meshed plane, as described herein, to connect through via and plane discontinuity models.

In some embodiments, the results from the power delivery network analysis process may be intuitively displayed in a three dimensional electromagnetic (EM) viewer having a physical layout background and cross-probe function. The teachings of the present disclosure may be used to simulate various power delivery networks (PDN) to provide the impedance and voltage drop analysis efficiently. The power delivery network analysis process described herein may also provide a high capacity and high accuracy for board-package-chip/board-board circuit design and verification processes.

It will be apparent to those skilled in the art that various modifications and variations can be made in the embodiments of the present disclosure without departing from the spirit or scope of the present disclosure. Thus, it is intended that embodiments of the present disclosure cover the modifications and variations provided they come within the scope of the appended claims and their equivalents.

What is claimed is:

1. A computer-implemented method for analyzing a power delivery network (PDN) system comprising:
- receiving a chip power model, a package power model and a board power model at the computing device;
- providing a user selectable connection interface, wherein the connection interface allows for selection of a board, package and chip connection;
- receiving a selection of at least one of the board, package, and chip connection;
- providing a user selectable pin-mapping file at a graphical user interface, wherein the graphical user interface is configured to display a pin-mapping interface upon selection of the pin-mapping file, the pin-mapping interface allowing for user-selection of a particular component and subsequent display of a plurality of pin names and pin locations for the particular component; and
- co-simulating the chip power model, the package power model, and the board power model, wherein co-simulating utilizes, at least in part, a pin-mapping associated with the pin-mapping file.

2. The computer-implemented method of claim 1 further comprising performing an IRDrop analysis.

3. The computer-implemented method of claim 1 further comprising performing a power integrity (PI) analysis.

4. The computer-implemented method of claim 1 wherein the board model includes at least one of a motherboard model and a daughter-card model.

5. The computer-implemented method of claim 1 further comprising generating at least one result set based upon, at least in part, the co-simulation.

6. The computer-implemented method of claim 5 wherein the result set includes an impedance measurement and a voltage drop.

7. The computer-implemented method of claim 5 further comprising modifying stackup based upon, at least in part, the result set.

8. The computer-implemented method of claim 5 further comprising optimizing the PDN system by altering a presence of one or more decoupling capacitors.

9. A non-transitory computer readable storage medium having a plurality of instructions stored thereon, which, when executed by a processor, cause the processor to perform operations comprising:
- receiving a chip power model, a package power model and a board power model at the computing device;
- providing a user selectable connection interface, wherein the connection interface allows for selection of a board, package and chip connection;
- receiving a selection of at least one of the board, package, and chip connection;
- providing a user selectable pin-mapping file at a graphical user interface, wherein the graphical user interface is configured to display a pin-mapping interface upon selection of the pin-mapping file, the pin-mapping interface allowing for user-selection of a particular component and subsequent display of a plurality of pin names and pin locations for the particular component; and
- co-simulating the chip power model, the package power model, and the board power model, wherein co-simulating utilizes, at least in part, a pin-mapping associated with the pin-mapping file.

10. The computer-readable storage medium of claim 9 wherein operations further comprise performing an IRDrop analysis.

11. The computer-readable storage medium of claim 9 wherein operations further comprise performing a power integrity (PI) analysis.

12. The computer-readable storage medium of claim 9 wherein the board model includes at least one of a motherboard model and a daughter-card model.

13. The computer-readable storage medium of claim 9 wherein operations further comprise generating at least one result set based upon, at least in part, the co-simulation.

14. A computing system for displaying one or more results of a power delivery network (PDN) analysis associated with an electronic circuit design comprising:
- at least one processor;
- at least one memory architecture operatively connected with the at least one processor;
- a first software module executed by the at least one processor, wherein the first software module is configured to receive a chip power model, a package power model and a board power model at the computing device;
- a second software module executed by the at least one processor, wherein the second software module is configured to provide a user selectable connection interface, wherein the connection interface allows for selection of a board, package and chip connection;
- a third software module executed by the at least one processor, wherein the third software module is configured to receive a selection of at least one of the board, package, and chip connection;
- a fourth software module executed by the at least one processor, wherein the fourth software module is configured to provide a user selectable pin-mapping file at a graphical user interface, wherein the graphical user interface is configured to display a pin-mapping interface upon selection of the pin-mapping file, the pin-mapping interface allowing for user-selection of a particular component and subsequent display of a plurality of pin names and pin locations for the particular component; and
- a fifth software module executed by the at least one processor, wherein the fifth software module is configured to co-simulate the chip power model, the package power model, and the board power model, wherein co-simulating utilizes, at least in part, a pin-mapping associated with the pin-mapping file.

15. The computing system of claim 14 further comprising a sixth software module configured to perform an IRDrop analysis.

16. The computing system of claim 14 further comprising a seventh software module configured to perform a power integrity (PI) analysis.

17. The computing system of claim 14 wherein the board model includes at least one of a motherboard model and a daughter-card model.

18. The computing system of claim 14 further comprising an eighth software module configured to generate at least one result set based upon, at least in part, the co-simulation.

* * * * *